(12) United States Patent
Fujisawa et al.

(10) Patent No.: US 8,602,895 B2
(45) Date of Patent: Dec. 10, 2013

(54) GAMING TERMINAL WITH ROTATABLE LEVER HANDLE

(75) Inventors: Masumi Fujisawa, Tokyo (JP); Takehisa Itagaki, Tokyo (JP); Kensaku Yoshikawa, Tokyo (JP); Daisyun Okamoto, Tokyo (JP); Hiroki Munakata, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 0 days.

(21) Appl. No.: 13/609,587

(22) Filed: Sep. 11, 2012

(65) Prior Publication Data

US 2013/0084983 A1 Apr. 4, 2013

(30) Foreign Application Priority Data

Sep. 30, 2011 (JP) ................................ 2011-218539

(51) Int. Cl.
*A63F 13/00* (2006.01)

(52) U.S. Cl.
USPC ........................................................... 463/37

(58) Field of Classification Search
USPC ........................................ 463/16–25, 37, 42
See application file for complete search history.

(56) References Cited

U.S. PATENT DOCUMENTS

| | | | |
|---|---|---|---|
| 6,722,976 B2 | 4/2004 | Adams | |
| 8,109,821 B2* | 2/2012 | Kovacs et al. | 463/16 |
| 8,123,612 B2* | 2/2012 | Yoshizawa | 463/20 |
| 8,262,456 B2* | 9/2012 | Englman et al. | 463/20 |
| 8,382,572 B2* | 2/2013 | Hoffman et al. | 463/20 |
| 8,403,740 B2* | 3/2013 | Kovacs et al. | 463/16 |
| 2006/0009283 A1 | 1/2006 | Englman et al. | |
| 2013/0040723 A1* | 2/2013 | Fujisawa et al. | 463/20 |

\* cited by examiner

*Primary Examiner* — Ronald Laneau
(74) *Attorney, Agent, or Firm* — Lexyoume IP Meister, PLLC.

(57) ABSTRACT

By rotating a lever, the upper limit of the angle of inclination and the lower limit of the angle of inclination of a movable range are detected by an inclination detection mechanism, and the upper limit of the angle of inclination and the lower limit of the angle of inclination are stored in a storage unit as the upper limit and the lower limit of the movable range. While a game is being run, the angle of inclination of the lever is detected when the lever is rotated. Whether the angle of inclination falls within the movable range is determined. When the angle is larger than the movable range, the upper limit of the angle of inclination is updated with the angle of inclination. When the angle is smaller than the movable range, the lower limit of the angle of inclination is updated with the angle of inclination.

18 Claims, 57 Drawing Sheets

FIG.20

BASE GAME SYMBOL TABLE

| CODE NUMBERS | RANDOM NUMBERS | FIRST COLUMN SYMBOLS | SECOND COLUMN SYMBOLS | THIRD COLUMN SYMBOLS | FOURTH COLUMN SYMBOLS | FIFTH COLUMN SYMBOLS |
|---|---|---|---|---|---|---|
| 0 | 0-3277 | J | SPECIFIC SYMBOL | A | Q | J |
| 1 | 3278-6555 | Q | A | J | J | A |
| 2 | 6556-9833 | ANGELFISH | Q | ANGELFISH | ANGELFISH | ANGELFISH |
| 3 | 9834-13111 | J | CLOWNFISH | TUNA | Q | J |
| 4 | 13112-16389 | Q | TUNA | COELACANTH | K | A |
| 5 | 16390-19667 | COELACANTH | SPECIFIC SYMBOL | ANGELFISH | ANGELFISH | ANGELFISH |
| 6 | 19668-22945 | A | ANGELFISH | SPECIFIC SYMBOL | A | COELACANTH |
| 7 | 22946-26223 | CLOWNFISH | COELACANTH | J | K | SPECIFIC SYMBOL |
| 8 | 26224-29501 | TUNA | K | CLOWNFISH | CLOWNFISH | K |
| 9 | 29502-32779 | CLOWNFISH | CLOWNFISH | A | Q | CLOWNFISH |
| 10 | 32780-36057 | A | SPECIFIC SYMBOL | Q | CLOWNFISH | Q |
| 11 | 36058-39335 | Q | A | CLOWNFISH | TUNA | ANGELFISH |
| 12 | 39336-42613 | TUNA | CLOWNFISH | CLOWNFISH | SPECIFIC SYMBOL | K |
| 13 | 42614-45891 | COELACANTH | CLOWNFISH | K | K | CLOWNFISH |
| 14 | 45892-49169 | K | J | Q | TUNA | TUNA |
| 15 | 49170-52447 | A | TUNA | Q | CLOWNFISH | J |
| 16 | 52448-55725 | CLOWNFISH | TUNA | SPECIFIC SYMBOL | A | SPECIFIC SYMBOL |
| 17 | 55726-59003 | J | ANGELFISH | A | CLOWNFISH | CLOWNFISH |
| 18 | 59004-62281 | Q | SPECIFIC SYMBOL | CLOWNFISH | ANGELFISH | TUNA |
| 19 | 62282-65535 | ANGELFISH | SPECIFIC SYMBOL | TUNA | COELACANTH | Q |

RANGE OF RANDOM NUMBERS: 0-65535

FIG.21

BASE GAME QUALIFICATION TIME AWARDING TABLE

| PAYOUT RATES | NUMBER OF ACTIVATED PAYLINES | | | | |
|---|---|---|---|---|---|
| | 1 | 2 | 3 | 5 | 10 |
| 1 | 6 | 1 | 1 | 1 | 1 |
| 2 | 0 | 4 | 2 | 1 | 1 |
| 3 | 0 | 1 | 3 | 1 | 1 |
| 4 | 0 | 0 | 1 | 1 | 1 |
| 5 | 0 | 0 | 0 | 4 | 2 |
| 6 | 0 | 0 | 0 | 0 | 1 |
| 7 | 0 | 0 | 0 | 0 | 1 |
| 8 | 0 | 0 | 0 | 0 | 1 |
| 9 | 0 | 0 | 0 | 0 | 1 |
| 10 | 0 | 0 | 0 | 0 | 1 |

FIG.22

COMMON GAME QUALIFICATION TIME MANAGEMENT TABLE

| PAYOUT RATES | GAMING TERMINAL | | | | | |
|---|---|---|---|---|---|---|
| | 10a | 10b | 10c | 10d | 10e | 10f |
| 1 | 6 | 30 | 0 | 6 | 41 | 1 |
| 2 | 12 | 2 | 0 | 0 | 20 | 1 |
| 3 | 18 | 1 | 0 | 0 | 3 | 3 |
| 4 | 6 | 0 | 0 | 0 | 6 | 4 |
| 5 | 0 | 0 | 0 | 0 | 2 | 2 |
| 6 | 0 | 0 | 0 | 0 | 7 | 14 |
| 7 | 0 | 0 | 0 | 0 | 9 | 10 |
| 8 | 0 | 0 | 0 | 0 | 12 | 2 |
| 9 | 0 | 0 | 0 | 0 | 2 | 0 |
| 10 | 0 | 0 | 0 | 0 | 6 | 0 |
| ... | ... | ... | ... | ... | ... | ... |

FIG.23

MAXIMUM QUALIFICATION TIME TABLE

| PAYOUT RATES | UPPER LIMIT OF ACCUMULATION |
|---|---|
| 1 | 45 |
| 2 | 44 |
| 3 | 43 |
| 4 | 42 |
| 5 | 41 |
| 6 | 40 |
| 7 | 39 |
| 8 | 38 |
| 9 | 37 |
| 10 | 36 |
| ... | ... |
| 98 | 2 |
| 99 | 2 |

FIG.24

ACCUMULATION CALCULATION TABLE

| | | 5 | 4 | 3 | 2 | 1 |
|---|---|---|---|---|---|---|
| PAYOUT RATES | ... | 5 | 4 | 3 | 2 | 1 |
| BEFORE-AWARDED COMMON GAME QUALIFICATION TIME | ... | 0 | 6 | 18 | 12 | 6 |
| TO-BE-AWARDED COMMON GAME QUALIFICATION TIME | ... | 0 | 1 | 3 | 2 | 1 |
| AWARDED COMMON GAME QUALIFICATION TIME | ... | 0 | 7 | 21 | 14 | 7 |
| ACCUMULATION $Y_N$ OF AWARDED COMMON GAME QUALIFICATION TIME | ... | 0 | 7 | 28 | 42 | 49 |
| ACCUMULATION UPPER LIMIT $X_N$ OF QUALIFICATION TIMES | ... | 41 | 42 | 43 | 44 | 45 |
| CALCULATED ACCUMULATION $Y_N$ (WHEN $Y_N > X_N$, $Y_N = X_N$ AND $Y_{N+1} = Y_{N+1} + Y_N - X_N$ ) | ... | 0 | 7 | 30 | 44 | 45 |
| COMMON GAME QUALIFICATION TIME $Z_N = Y_N - Y_{N+1}$ | ... | 0 | 7 | 23 | 14 | 1 |

FIG.27

INDEPENDENT SPECIAL GAME QUALIFICATION TIME AWARDING TABLE

| PAYOUT RATES | NUMBER OF ACTIVATED PAYLINES | | | | |
|---|---|---|---|---|---|
| | 1 | 2 | 3 | 5 | 10 |
| 1 | 29 | 0 | 0 | 0 | 0 |
| 2 | 5 | 30 | 0 | 0 | 0 |
| 3 | 0 | 4 | 29 | 0 | 0 |
| 4 | 0 | 0 | 3 | 0 | 0 |
| 5 | 0 | 0 | 0 | 30 | 0 |
| 6 | 0 | 0 | 0 | 0 | 0 |
| 7 | 0 | 0 | 0 | 0 | 0 |
| 8 | 0 | 0 | 0 | 0 | 0 |
| 9 | 0 | 0 | 0 | 0 | 0 |
| 10 | 0 | 0 | 0 | 0 | 27 |

FIG.29

BONUS TYPE TABLE

| BONUS TYPES | UNIT PAYOUT AMOUNTS | RANKS |
|---|---|---|
| BLUE MARLIN | 10000 | 1 |
| BLUE FIN TUNA | 5000 | 2 |
| DOLPHIN FISH | 4000 | 2 |
| NAPOLEON FISH | 3000 | 2 |
| YELLOW FIN TUNA | 2000 | 3 |
| WAHOO | 1500 | 3 |
| BLACK SEA BASS | 1500 | 3 |
| HALIBUT | 1000 | 4 |
| ... | ... | ... |

FIG.30

INDEPENDENT SPECIAL GAME PROBABILITY TABLE

| RANDOM NUMBERS | WINNING BONUS TYPES |
|---|---|
| 0-9 | BLUE MARLIN |
| 10-19 | BLUE FIN TUNA |
| 20-22 | DOLPHIN FISH |
| 23-25 | NAPOLEON FISH, BLACK SEA BASS |
| 26-48 | YELLOW FIN TUNA, HALIBUT |
| 49-116 | WAHOO, BLACK SEA BASS |
| 117-210 | BLACK SEA BASS, HALIBUT |
| 211-293 | WAHOO, BLACK SEA BASS, HALIBUT |
| ... | ... |

RANGE OF RANDOM NUMBERS: 0-65535

FIG.32

MYSTERY BONUS START RANDOM DETERMINATION TABLE

| MYSTERY BONUS | NUMBER OF ACTIVATED PAYLINES | | | | |
|---|---|---|---|---|---|
| | 1 | 2 | 3 | 5 | 10 |
| OCCURRENCE | 0-1 | 0-2 | 0-3 | 0-4 | 0-5 |
| EFFECT ONLY | 2-5 | 3-8 | 4-11 | 5-14 | 6-17 |
| NON-OCCURRENCE | 6-299 | 9-299 | 12-299 | 15-299 | 18-299 |

RANGE OF RANDOM NUMBERS: 0-299

FIG.33

MYSTERY BONUS PROBABILITY TABLE

| RANDOM NUMBERS | WINNING BONUS TYPES |
| --- | --- |
| 0-1 | BLUE MARLIN |
| 2-5 | BLUE FIN TUNA |
| 6-11 | DOLPHIN FISH |
| 12-19 | NAPOLEON FISH |
| 20-29 | YELLOW FIN TUNA |
| 30-40 | WAHOO |
| 41-53 | BLACK SEA BASS |
| 54-67 | HALIBUT |
| ... | ... |

RANGE OF RANDOM NUMBERS: 0-5000

FIG.35

COMMON GAME START RANDOM
DETERMINATION TABLE

| OCCURRENCE | 0-1 |
|---|---|
| EFFECT ONLY | 2-3 |
| NON-OCCURRENCE | 4-1214 |

RANGE OF RANDOM NUMBERS: 0-1214

FIG.36

COMMON GAME TYPE RANDOM DETERMINATION TABLE

| FIRST COMMON GAME | 0-31 |
|---|---|
| SECOND COMMON GAME | 32-63 |
| THIRD COMMON GAME | 64-83 |
| FIRST COMMON GAME + THIRD COMMON GAME | 84-91 |
| SECOND COMMON GAME + THIRD COMMON GAME | 92-99 |

RANGE OF RANDOM NUMBERS: 0-99

FIG.40

FIRST COMMON GAME PROBABILITY TABLE

| RANDOM NUMBERS | WINNING BONUS TYPES |
|---|---|
| 0-9 | BLUE MARLIN, BLACK SEA BASS, HALIBUT |
| 10-19 | BLUE FIN TUNA, WAHOO, HALIBUT |
| 19-22 | DOLPHIN FISH, BLACK SEA BASS, HALIBUT |
| 23-25 | NAPOLEON FISH, BLACK SEA BASS, HALIBUT |
| 26-48 | YELLOW FIN TUNA, WAHOO, HALIBUT, HALIBUT |
| 49-116 | WAHOO, BLACK SEA BASS, HALIBUT, HALIBUT |
| 117-210 | BLACK SEA BASS, HALIBUT, HALIBUT |
| 211-293 | WAHOO, WAHOO, BLACK SEA BASS, HALIBUT |
| ... | ... |

RANGE OF RANDOM NUMBERS: 0-65535

FIG.45

THIRD COMMON GAME PROBABILITY
TABLE

| RANDOM NUMBERS | WINNING BONUS TYPES |
|---|---|
| 0-19 | BLUE MARLIN |
| 20-76 | BLUE FIN TUNA |
| 77-399 | DOLPHIN FISH |

RANGE OF RANDOM NUMBERS: 0-399

FIG.46

MOVEMENT PATTERN TABLE

| IDENTIFICATION INFORMATION | MOVEMENT PATTERNS |
|---|---|
| 0001 | HIGH DEGREE OF VIBRATION |
| 0002 | HIGH DEGREE OF ROTATION |
| 0003 | HIGH DEGREE OF VIBRATION, HIGH DEGREE OF ROTATION |
| ... | ... |

FIG.47

DISPLAY PATTERN TABLE

| IDENTIFICATION INFORMATION | DISPLAY PATTERNS |
|---|---|
| 0001 | LARGE FISH TOOK BAIT |
| 0002 | FISH IS BEING LIFTED |
| 0003 | LARGE FISH IS BEING LIFTED |
| ... | ... |

FIG.58

BASE GAME QUALIFICATION TIME AWARDING TABLE

| PAYOUT RATES | NUMBER OF ACTIVATED PAYLINES | | | | |
|---|---|---|---|---|---|
| | 1 | 2 | 3 | 5 | 10 |
| 1 | 5 | 0 | 0 | 0 | 0 |
| 2 | 0 | 5 | 0 | 0 | 0 |
| 3 | 0 | 0 | 5 | 0 | 0 |
| 4 | 0 | 0 | 0 | 0 | 0 |
| 5 | 0 | 0 | 0 | 5 | 0 |
| 6 | 0 | 0 | 0 | 0 | 0 |
| 7 | 0 | 0 | 0 | 0 | 0 |
| 8 | 0 | 0 | 0 | 0 | 0 |
| 9 | 0 | 0 | 0 | 0 | 0 |
| 10 | 0 | 0 | 0 | 0 | 5 |

GAMING TERMINAL WITH ROTATABLE LEVER HANDLE

CROSS REFERENCE TO RELATED APPLICATION

The present application claims priority from Japanese Patent Application No. 2011-218539, which was filed on Sep. 30, 2011, the disclosure of which is herein incorporated by reference in its entirety.

BACKGROUND OF THE INVENTION

1. Field of the Invention

The present invention relates to a gaming terminal which outputs a predetermined sound and/or gives a visual indication based on an angle of inclination of a lever-type operation device.

2. Description of Related Art

There has been widely known a conventional gaming terminal which includes a lever handle configured to receive an operation of a player, which operation is made by inclining the operation device. Such a conventional gaming terminal is described, for example, in the Specification of U.S. Patent Application Publication No. 2006/0009283 and U.S. Pat. No. 6,722,976.

In such a gaming terminal including a lever-type operation device, when the player inclines the lever excessively, a support mechanism or the like of the operation device is broken, and this shortens the life of that portion.

An object of the present invention is to provide a gaming terminal capable of effectively prevents breakage of a support mechanism of a lever-type operation device; and a method of providing notification.

SUMMARY OF THE INVENTION

According to the present invention, a gaming terminal includes: a notification unit arranged to give notification to a player; a lever-type operation device arranged to receive an operation by the player; a supporting mechanism arranged to rotatably support the operation device at one end portion of the operation device; an inclination detection mechanism arranged to detect an angle of inclination of the operation device; a storage unit arranged to store the angle of inclination; and a controller programmed to execute the processes of:

(a1) detecting an upper limit of the angle of inclination and a lower limit of the angle of inclination of a movable range by the inclination detection mechanism by rotating the operation device by the supporting mechanism at a predetermined reset timing and storing, in the storage unit, the upper limit of the angle of inclination and the lower limit of the angle of inclination as the upper limit and the lower limit of the movable range;

(a2) while a game is being run, detecting the angle of inclination of the operation device when the operation device is rotated by an operation by the player; and (a3) determining whether the angle of inclination detected in (a2) falls within the movable range stored in the storage unit, and (i) updating the upper limit of the angle of inclination with the angle of inclination when the angle of inclination is larger than the movable range, or (ii) updating the lower limit of the angle of inclination with the angle of inclination when the angle of inclination is smaller than the movable range.

According to the arrangement above, because the movable range of the operation device is changed in accordance with the player's operation, it is able to optimize, during the game play, the movable range based on the player-side conditions such as the player's play style, physical constitution, and muscle strength and the gaming-terminal-side conditions indicating the individual specificity of each gaming terminal 10 such as the deformation of components over time, dimensional variations of the components, and assembly errors. As a result, various processes based on the movable range of the operation device, e.g., issuing a warning against excessive operations at a suitable timing or at a suitable angle of inclination of the operation device.

The gaming terminal of the present invention may be arranged such that the controller is programmed to execute the process of:

(a4) issuing a warning to the player by giving the notification by the notification unit, when the angle of inclination detected in (a2) falls within a first warning range, the upper limit of which is the upper limit of the angle of inclination of the movable range stored in the storage unit, or when the angle of inclination detected in (a2) falls within a second warning range, the lower limit of which is the lower limit of the angle of inclination of the movable range stored in the storage unit.

According to this arrangement, it is possible to issue a warning against an excessive operation of the operation device close to the limit of the movable range.

The gaming terminal of the present invention may be arranged such that, in (a4), the controller divides at least one of the first warning range and the second warning range into a plurality of areas and differentiates warning contents of the warning to the player between the areas.

The arrangement above allows the player to understand to what extent the operation is excessive, through the warning contents notified to the player. It is therefore possible to prevent the operation device from being broken, without taking away the enthusiasms of the player toward the game.

The gaming terminal of the present invention may be arranged such that, in (a4), the controller increases a warning level of the warning contents as the plurality of areas get close to the upper limit of the first warning range or the lower limit of the second warning range.

This allows the player to instinctively understand to what extent the operation is excessive, through the increase in the warning level notified to the player.

The gaming terminal of the present invention is arranged such that, in (a4), the controller stops the running of the game when the warning level is at the highest and a predetermined operation condition is satisfied.

This makes it possible to prevent damages to the operation device on account of an excessive operation by the player.

The gaming terminal of the present invention is arranged such that, the supporting mechanism includes a load placing mechanism which is arranged to generate a load against the rotation of the operation device, and the controller is programmed to execute the process of:

(a5) while the game is being run, causing the load placing mechanism to generate the load against the rotation of the operation device.

Because this makes it possible to place a load on the operation device operated by the player, the synchronization between the game and the load on the operation device offers the sense of presence to the player.

The gaming terminal of the present invention may be arranged such that the controller is programmed to execute the process of:

(a6) issuing the warning to the player by the notification by the notification unit, when (i) the angle of inclination detected in (a2) is, for a predetermined time, continuously at either the first warning range, the upper limit of which is the upper limit of the angle of inclination of the movable range stored in the storage unit, or the second warning range, the lower limit of which is the lower limit of the angle of inclination of the movable range stored in the storage unit, or (ii) the angle of inclination repeatedly enters the first warning range or the second warning range for a predetermined number of times within a predetermined time.

This makes it possible to issue a warning against an excessive operation of the operation device close to the limit of the movable range.

The gaming terminal of the present invention may be arranged such that, in (a6), the controller performs: issuance of the warning to the player by causing the notification unit to display a warning image and produce a warning sound at low volume, when the predetermined time is a first predetermined time or the predetermined number of times is a first predetermined number of times;

issuance of the warning to the player by causing the notification unit to display the warning image and produce the warning sound at middle volume, when the predetermined time is a second predetermined time (second predetermined time>first predetermined time) or the predetermined number of times is a second predetermined number of times (second predetermined number of times>first predetermined number of times); and issuance of the warning to the player by causing the notification unit to display the warning image and produce the warning sound at high volume, when the predetermined time is a third predetermined time (third predetermined time>second predetermined time) or the predetermined number of times is a third predetermined number of times (third predetermined number of times>second predetermined number of times).

The arrangement above allows the player to understand to what extent the operation is excessive, through the warning contents notified to the player. It is therefore possible to prevent the operation device from being broken, without taking away the enthusiasms of the player toward the game.

The present invention provides a gaming terminal that can effectively prevent a supporting mechanism of a operation device from being damaged.

BRIEF DESCRIPTION OF THE DRAWINGS

FIG. 20 illustrates a base game symbol table.
FIG. 21 illustrates a base game qualification time awarding table.
FIG. 22 illustrates a common game qualification time management table.
FIG. 23 illustrates a maximum qualification time table.
FIG. 24 illustrates an accumulation calculation table.
FIG. 27 illustrates an independent special game qualification time awarding table.
FIG. 29 illustrates a bonus type table.
FIG. 30 illustrates an independent special game probability table.
FIG. 32 illustrates a mystery bonus start random determination table.
FIG. 33 illustrates a mystery bonus probability table.
FIG. 35 illustrates a common game start random determination table.
FIG. 36 illustrates a common game type random determination table.
FIG. 40 illustrates a first common game probability table.
FIG. 45 illustrates a third common game probability table.
FIG. 46 illustrates a movement pattern table.
FIG. 47 illustrates a display pattern table.

FIG. 58 illustrates a modification of the base game qualification time awarding table.

DESCRIPTION OF THE PREFERRED EMBODIMENTS

The following will describe an embodiment of the present invention with reference to the drawings.

(Gaming Machine Overview)

A gaming machine includes a plurality of gaming terminals and a center controller data-communicably connected to the gaming terminals. Each gaming terminal runs independently of the other gaming terminals a unit game using symbol columns, and runs a common game in sync with the other gaming terminals.

Figure 5:
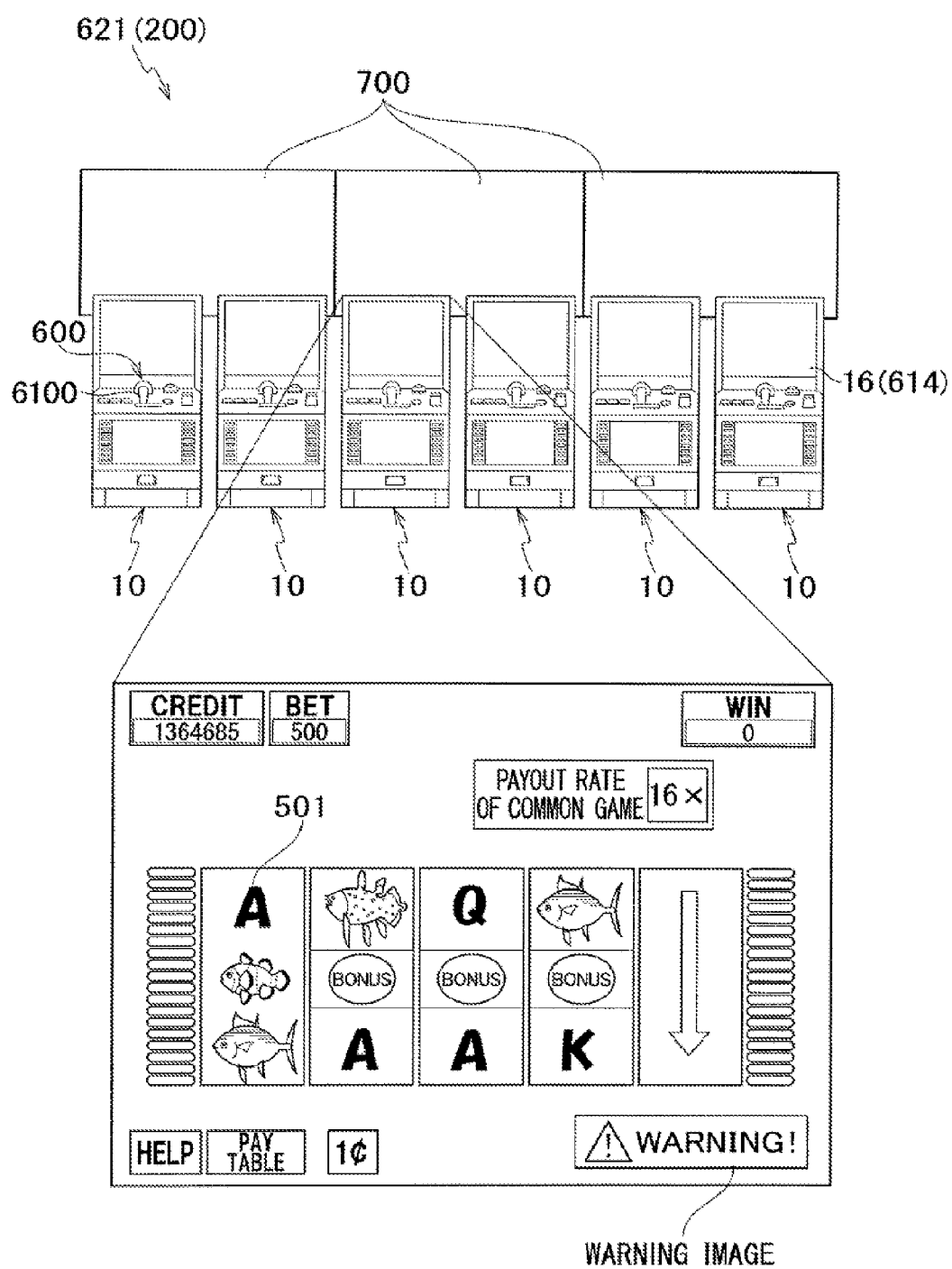
FIG. 5 illustrates the outline of a gaming machine.
Figure 6:
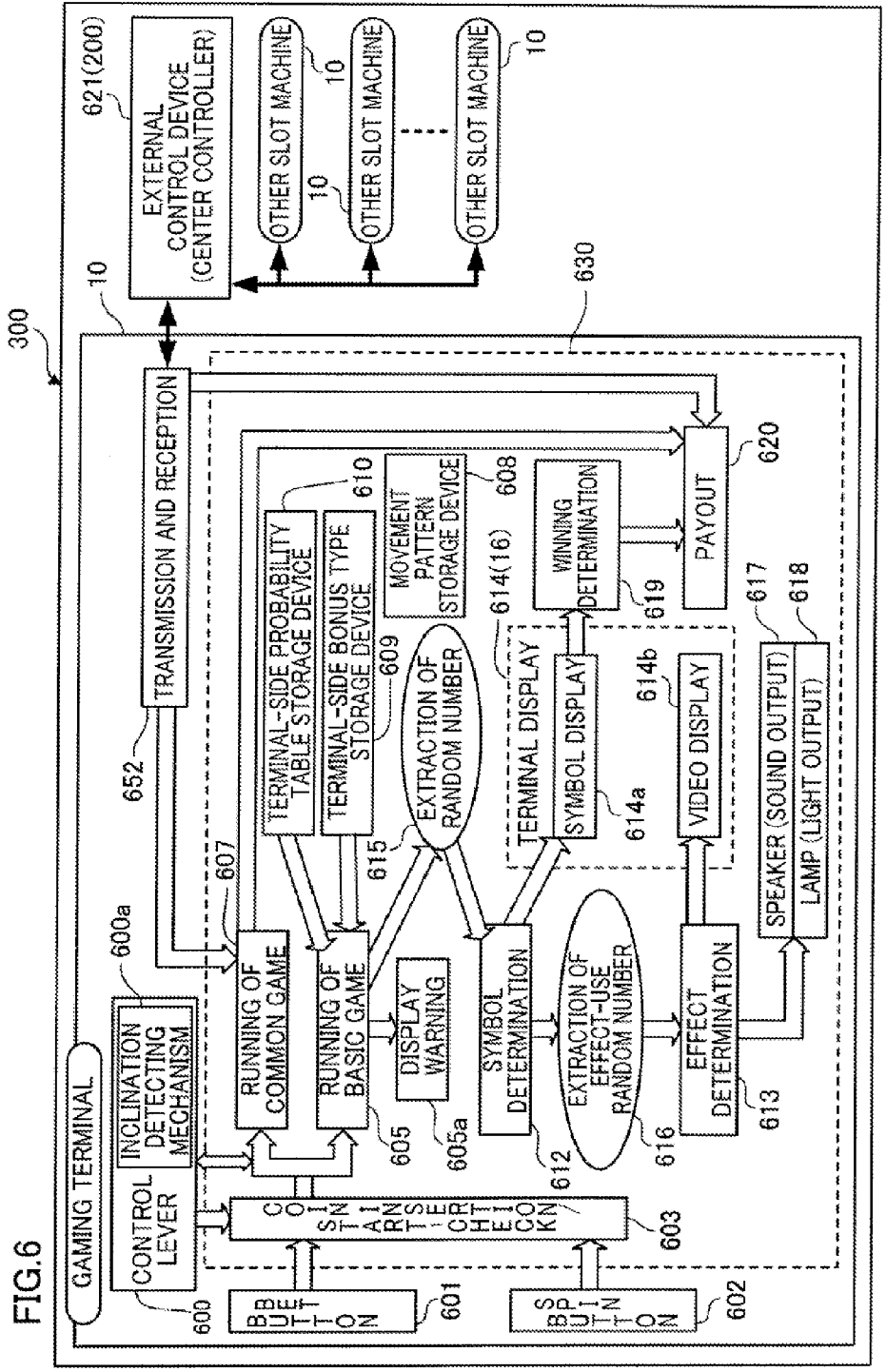
FIG. 6 is a block diagram of a gaming terminal.
Figure 7:
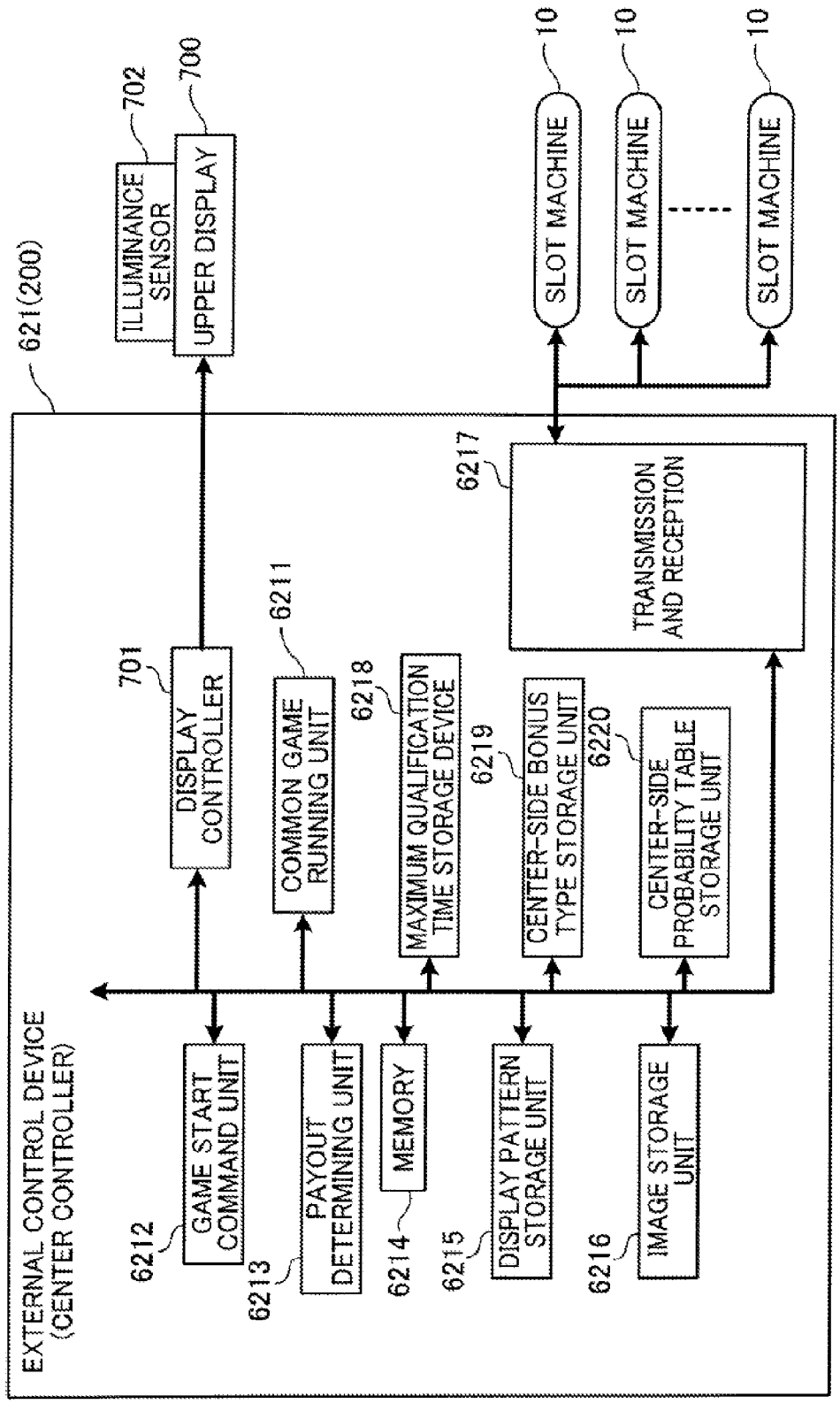
FIG. 7 is block diagram of a center controller.

More specifically, as shown in FIG. 5 to FIG. 7, the gaming machine 300 of the present embodiment has a multi-player type structure, where gaming terminals 10 are connected in a parallel manner and in communication with a center controller 200. The gaming machine 300 is structured so that each gaming terminal 10 is able to individually run a unit game such as a slot game, independently of the other gaming terminals 10. In the unit game, symbols 501 are rearranged on the terminal display 614 (terminal image display panel 16) of the gaming terminal 10.

(Functional Block of Gaming Machine 300: Gaming Terminal 10)

The gaming machine 300 having the above structure includes the gaming terminals 10 and the external controller 621 (center controller 200) data-communicably connected to the gaming terminals 10, as illustrated in FIG. 6. The external controller 621 is data-communicably connected to the gaming terminals 10 which are provided in a parallel manner.

Figure 1:
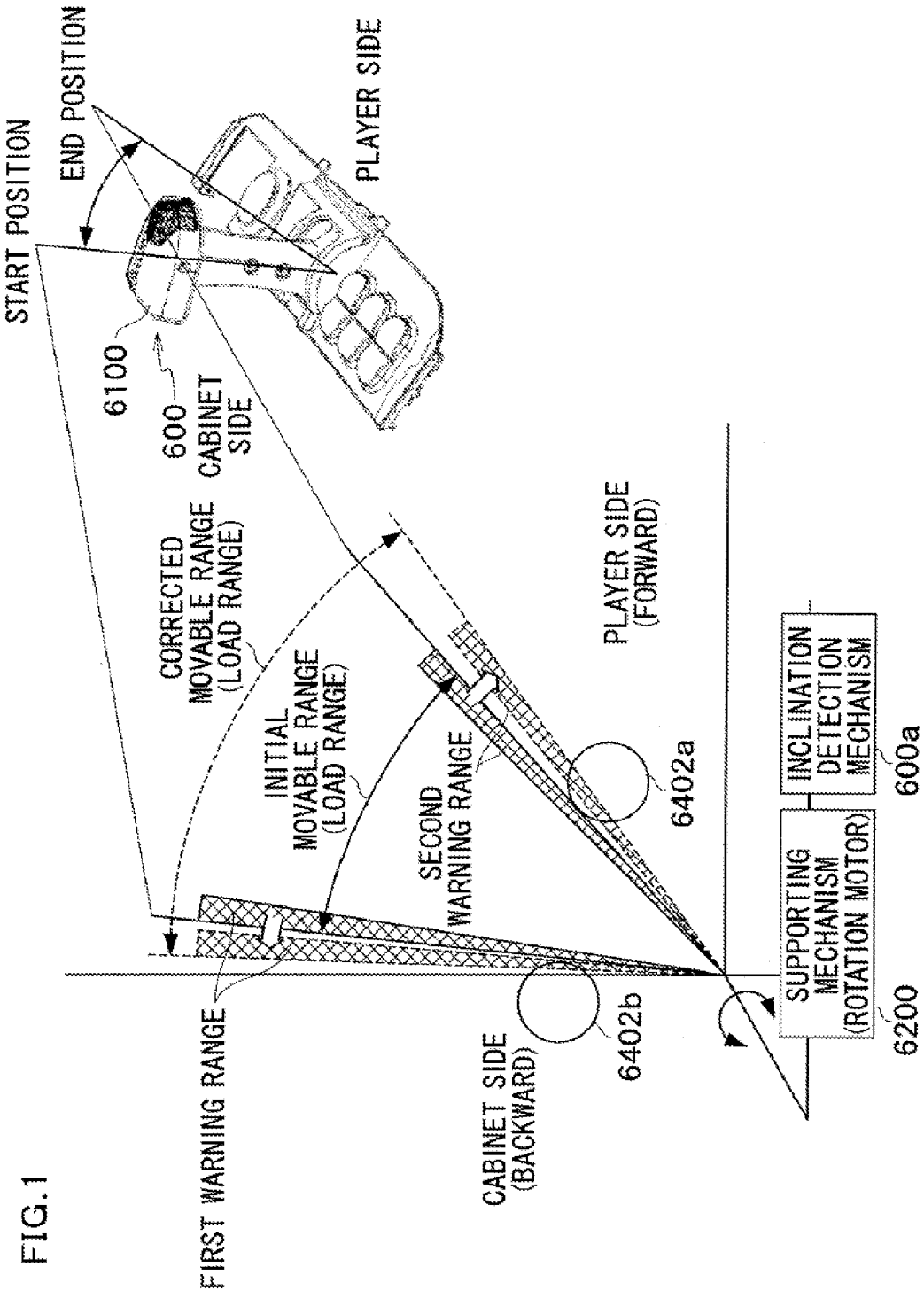
FIG. 1 illustrates the initial setting and the state of update of the lever.
Figure 11:
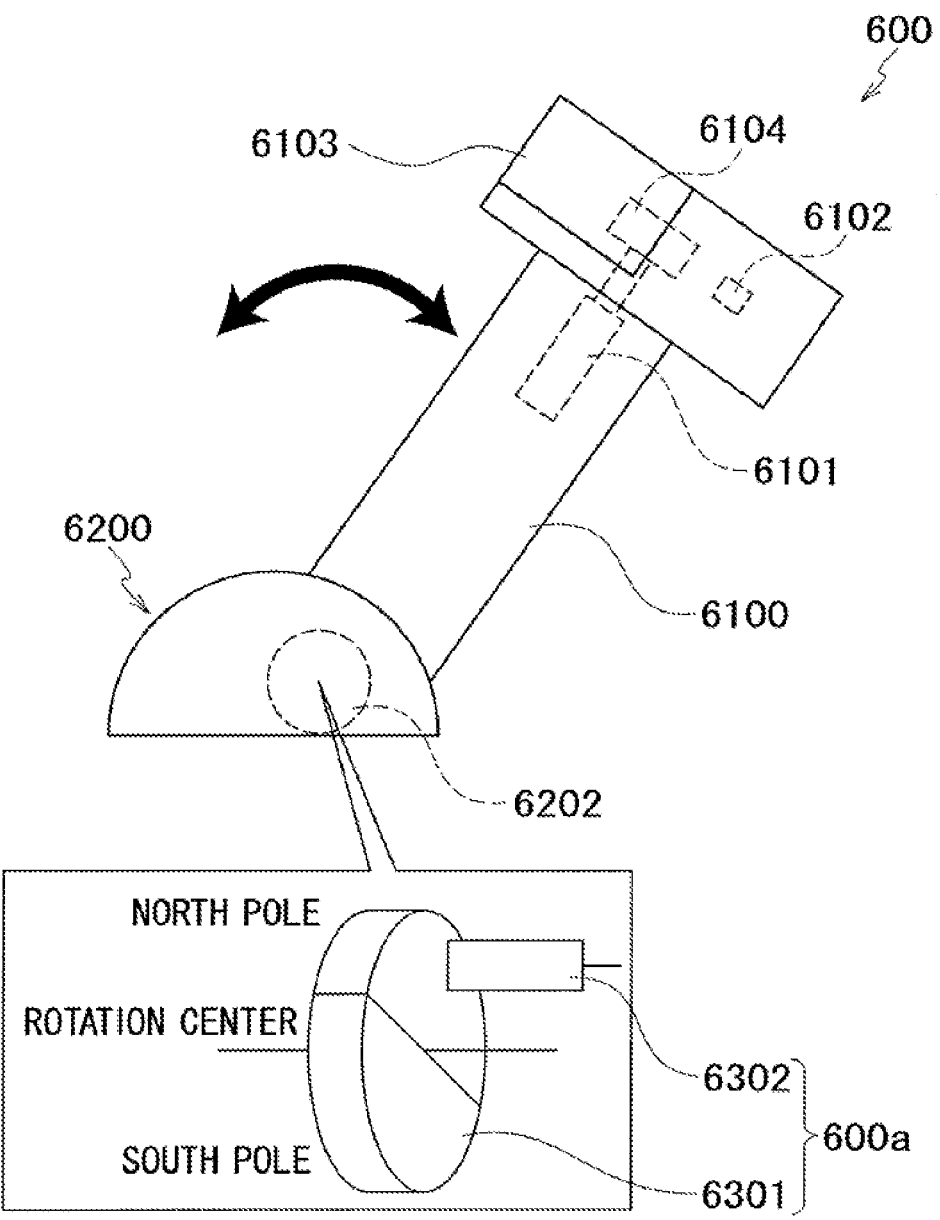
FIG. 11 is a schematic drawing of a control lever device.

As shown in FIG. 1, the gaming terminal 10 is arranged so that the movable range of a lever 6100 which is a operation device is updated based on a player's operation. More specifically, the gaming terminal 10 includes a notification unit (a terminal display 614, a speaker 617, or the like) for giving notification to the player, a lever 6100 (operation device) for receiving a player's operation, a supporting mechanism 6200 which is shown in FIG. 11 and supports one end portion of the lever 6100 to allow the lever 6100 to be rotatable by a rotation motor 6202, an inclination detection mechanism 600a for detecting the angle of inclination of the lever 6100, a storage unit (an inclination angle table shown in FIG. 2 and FIG. 16) for storing the angle of inclination, and a terminal controller 630.

The supporting mechanism 6200 is arranged to be switchable between a mode with which the lever 6100 is automatically rotated by the rotation motor 6202 and a mode with which the lever 6100 receiving a load form the rotation motor 6202 is manually rotated by the player. In the present embodiment, the phrase "the lever 6100 is rotatable" indicates an operation in the mode with which the lever is automatically rotated by the driving force of the rotation motor 6202.

Figure 2:
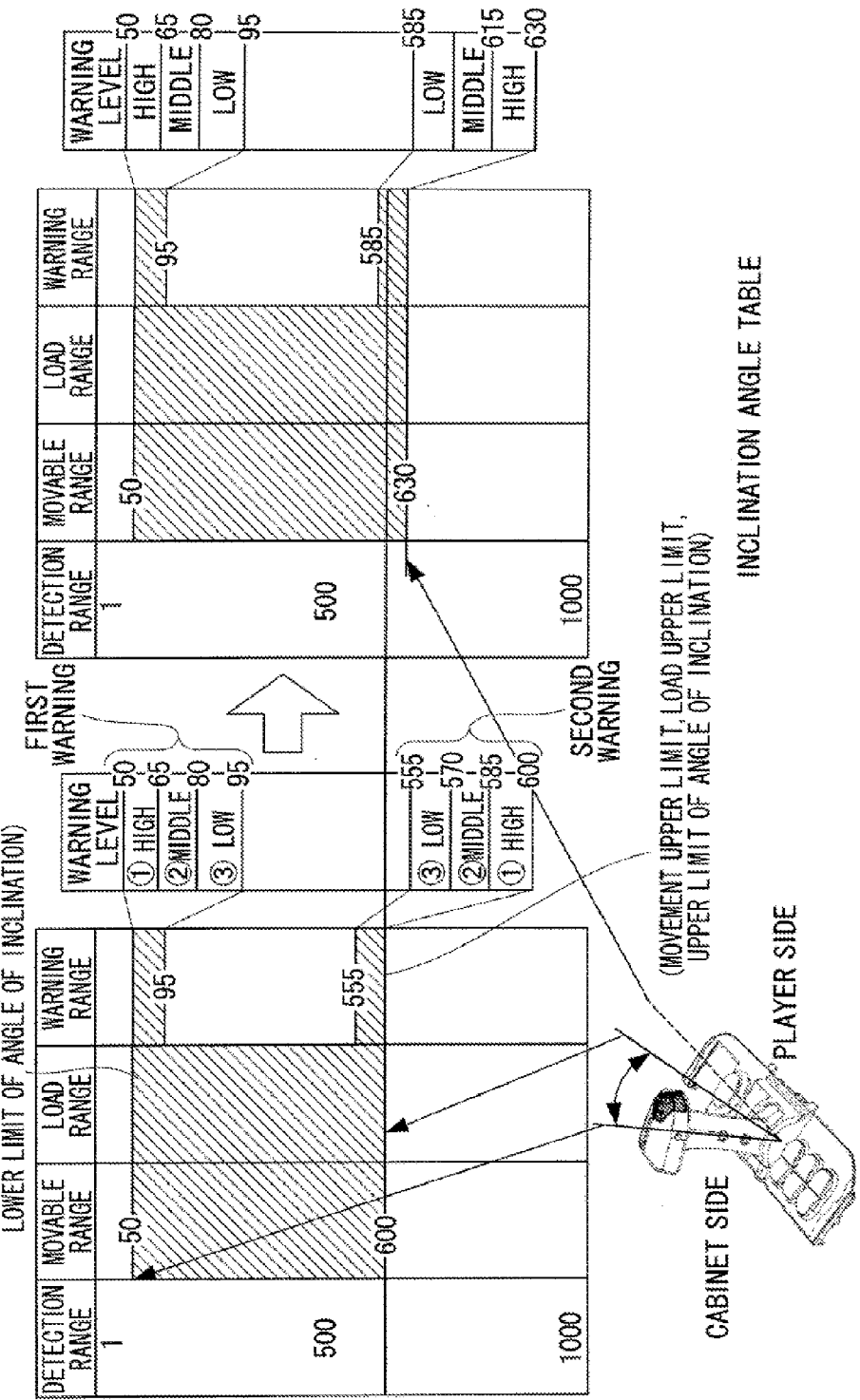
FIG. 2 illustrates an inclination angle table.

The terminal controller 630 is programmed to execute the processes (a1) to (a3). In the process (a1), the lever 6100 is rotated by the supporting mechanism 6200 at a predetermined reset timing, the upper limit of the angle of inclination and the lower limit of the angle of inclination of the movable range are detected by the inclination detection mechanism 600a, and the upper limit of the angle of inclination and the lower limit of the angle of inclination are stored in the storage unit (inclination angle table) as the upper limit and the lower limit of the movable range. With this, as shown in FIG. 2, the process (a1) arranges the inclination angle table in the initial setting state. For example, a movable range field of the inclination angle table is arranged so that the initial movable range is set between the movement lower limit "50" and the movement upper limit "600".

In this connection, in the present embodiment, the initial setting of the upper limit of the angle of inclination and the lower limit of the angle of inclination of the movable range is performed by causing the lever 6100 to contact restriction members 6402b and 6402a. More specifically, the upper limit of the angle of inclination of the movable range is set with the assumption that a lever position of the lever 6100 when the lever 6100 is rotated backward (toward the cabinet) and stops the movement as it contacts the restriction member 6402b provided at the back is the start position. On the other hand, the lower limit of the angle of inclination of the movable range is set with the assumption that a lever position of the lever 6100 when the lever 6100 is rotated forward (toward the player) and stops the movement as it contacts the restriction member 6402A provided at the front is the end position.

Figure 14:
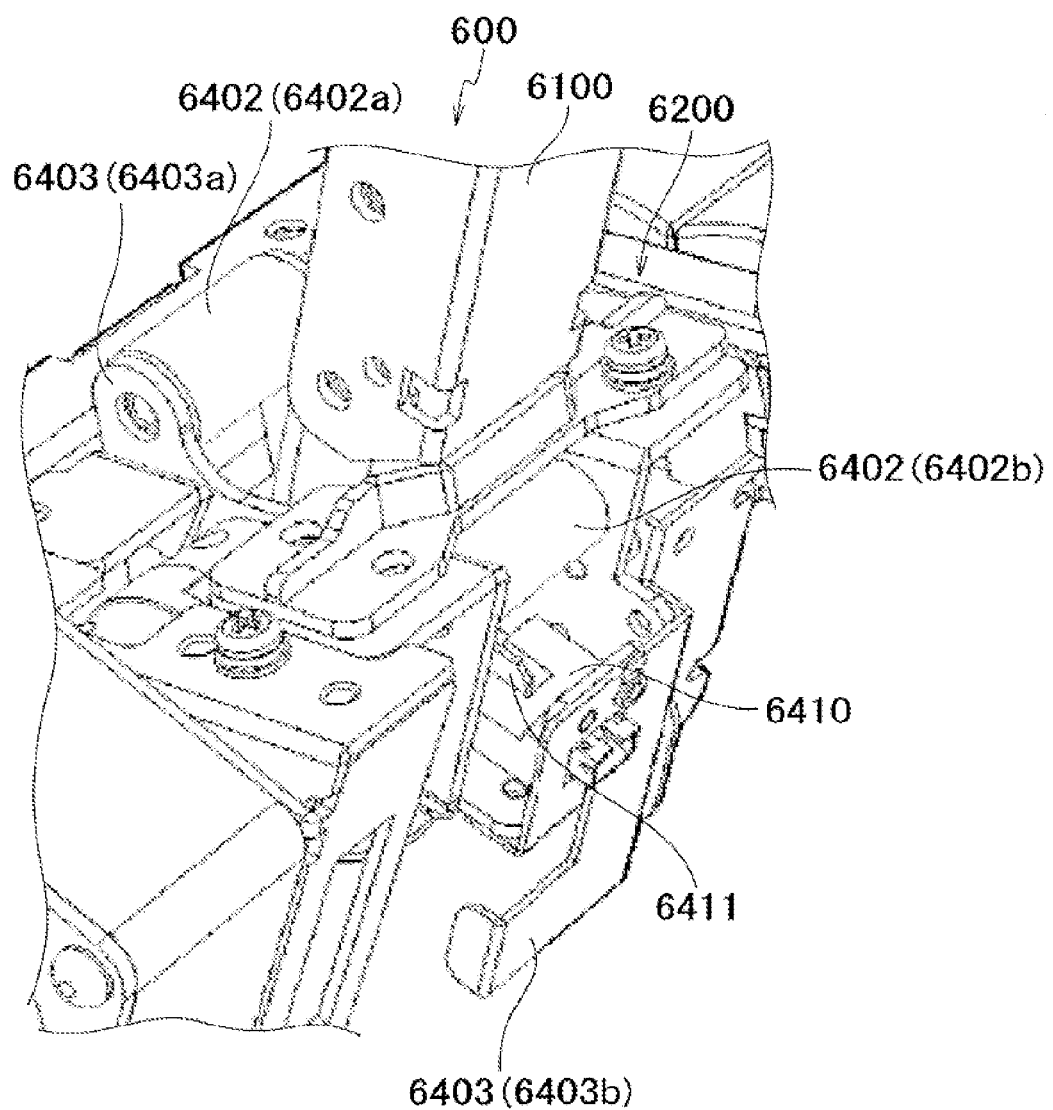
FIG. 14 is a perspective view of the control lever device, whose cover is removed, viewed from the front left.

It is noted that the initial setting of the movable range is not necessarily carried out with the assumption that the lever positions of the lever 6100 when contacting the restriction members 6402b and 6402a are the start position and the end position. For example, a photo sensor is provided to detect lever positions immediately before the lever 6100 contacts the restriction members 6402b and 6402a, and the initial setting of the movable range is carried out with the start position and the end position determined based on detection signals supplied from the photo sensor. More specifically, as shown in FIG. 14, a photo sensor 6410 is provided in the vicinity of the restriction member 6402b, a sensor plate 6411 traversing the space between the light emitting portion and the photo acceptance portion of the photo sensor 6410 is fixed to the lever 6100, and the sensor plate 6411 vertically moves in sync with the rotation of the lever 6100.

In the process (a2), as shown in FIG. 1, the angle of inclination of the lever 6100 is detected when the lever 6100 is rotated by the player while a game is being run. In the process (a3), whether the angle of inclination detected in (a2) falls within the movable range stored in the storage unit is determined. If the angle is larger than the movable range, the upper limit of the angle of inclination is updated with the angle of inclination. If the angle is smaller than the movable range, the lower limit of the angle of inclination is updated with the angle of inclination. It is noted that the "game" includes all kinds of games such as a basic game and a common game.

In this way, as shown in FIG. 2, the process (a2) and the process (a3) set the inclination angle table at a correction setting state. For example, when the angle of inclination of the lever 6100 is "630", the movable range field of the inclination angle table is updated so that the movable range is set at the movement lower limit "50" to the movement upper limit "630". In other words, as shown in FIG. 1, the movable range of the lever 6100 is changed from the initial movable range to an updated movable range.

According to the arrangement above, because the movable range of the lever 6100 is changed in accordance with the player's operation, the gaming terminal 10 is able to optimize, during the game play, the movable range based on the player-side conditions such as the player's play style, physical constitution, and muscle strength and the gaming-terminal-side conditions indicating the individual specificity of each gaming terminal 10 such as the deformation of components over time, dimensional variations of the components, and assembly errors. As a result, various processes based on the movable range of the lever 6100, e.g., issuing a warning against excessive operations at a suitable timing or at a suitable angle of inclination (lever position) of the lever 6100.

In addition to the above, the gaming terminal 10 is arranged to issue a warning when the operation of the lever 6100 is close to the upper limit or the lower limit of the movable range. More specifically, the terminal controller 630 is programmed to execute the process (a4). In the process (a4), as shown in FIG. 2, when the angle of inclination detected in (a2) falls within the first warning range, the upper limit of which is the upper limit of the angle of inclination (movement upper limit) of the movable range stored in the storage unit, or within the second warning range, the lower limit of which is the lower limit of the angle of inclination (movement lower limit) of the movable range stored in the storage unit, a warning is issued to the player by notification by means of the notification unit. This allows the gaming terminal 10 to issue a warning against an excessive operation of the lever 6100 close to the limit of the movable range.

Figure 3:
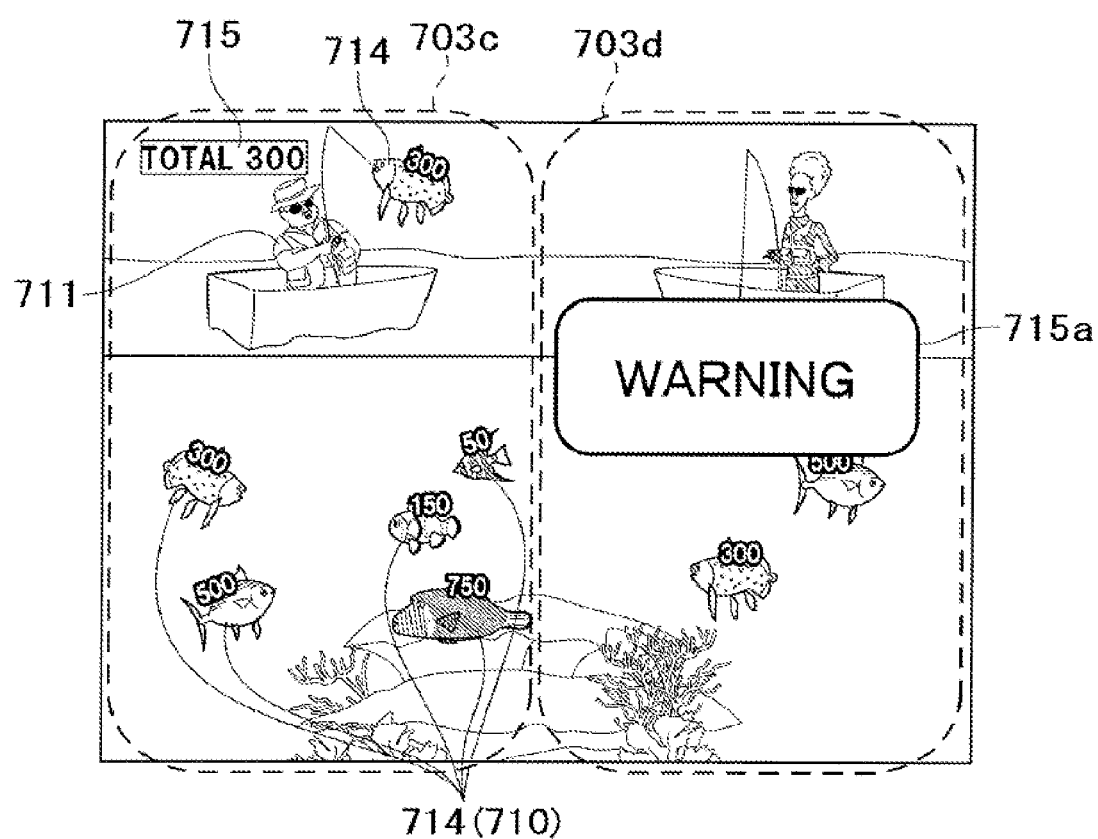
FIG. 3 illustrates a warning screen.
Figure 4:
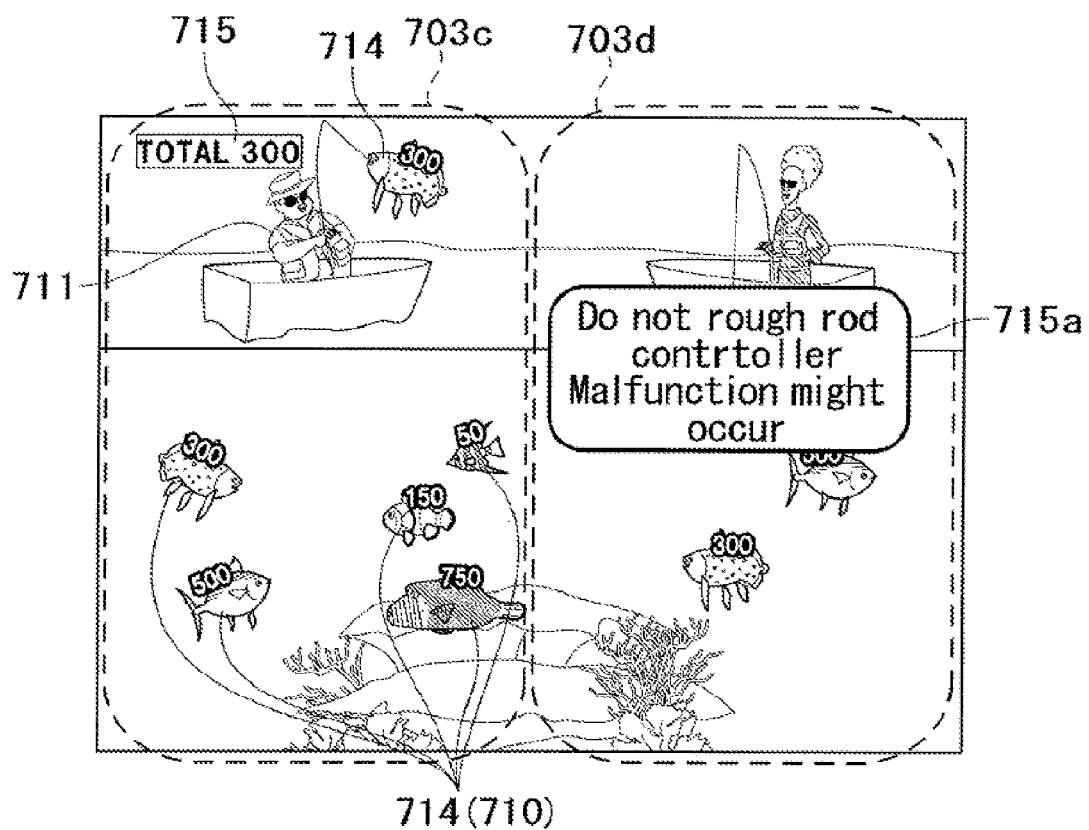
FIG. 4 illustrates a warning screen.

Details of the warning will be given. As shown in FIG. 3, to begin with, a first warning image 715a "WARNING" is displayed on the display screen. Thereafter, as shown in FIG. 4, the first warning image is switched to a second warning image 715b "Do not rough rod controller Malfunction might occur". At the same time as the display of the second warning image 715b, the content of the second warning image 715b is read aloud by sound.

In addition to the above, the gaming terminal 10 is arranged to change the warning level in stages at the time of the operation of the lever 6100. More specifically, in (a4), the terminal controller 630 divides at least one of the first warning range and the second warning range into two or more (e.g., three) areas, and the warning content (sound, audio, text information, or the like) indicating the warning level for the player is changed in accordance with each area. More specifically, the volume of the sound is changed in stages when the content of the second warning image 715b of FIG. 4 is output as sound. It is noted that a warning may be linearly changed. This allows the player at the gaming terminal 10 to understand to what extent the operation is excessive, through the warning contents notified to the player. It is therefore possible to prevent the lever 6100 from being broken, without taking away the enthusiasms of the player toward the game.

In addition to the above, the gaming terminal 10 is arranged so that the warning level is increased in stages. More specifically, in (a4), the terminal controller 630 increases the warning level (sound volume, musical pitch, light amount, light color, output intervals, etc.) of the warning contents as the plural areas get close to the upper limit of the first warning range or the lower limit of the second warning range. This allows the player at the gaming terminal 10 to instinctively understand to what extent the operation is excessive, through the increase in the warning level notified to the player.

In addition to the above, the gaming terminal 10 is arranged to invalidate the game when the lever 6100 is excessively operated. More specifically, if in (a4) the warning level is at the highest, the terminal controller 630 stops the running of the game when a predetermined operation condition is satisfied. For example, when a fishing game is run, an image showing that the fishing line is broken may be displayed and the game may be forcibly terminated thereafter. This allows the gaming terminal 10 to prevent damages to the lever 6100 on account of an excessive operation by the player.

It is noted that the "predetermined operation condition" is cases where, for example, an excessive operation is continued for more than a predetermined time such as 16 seconds while a warning has been issued at the maximum warning level and where an excessive operation is repeated for a predetermined number of times such as twice during a predetermined time such as 20 seconds.

The relationship between the warning level and the warning timing may be arranged as below. That is to say, the terminal controller 630 may be programmed to execute the following process (a6). In the process (a6), a warning is issued against the player by the notification by means of the notification unit when the angle of inclination detected in (a2) remains, for a predetermined time, in either the first warning range, the upper limit of which is the upper limit of the angle of inclination of the movable range, or the second warning range the lower limit of which is the lower limit of the angle of inclination of the movable range, or when the angle of inclination is changed to the first warning range or the second warning range for a predetermined number of times within a predetermined time. In such cases, a warning is issued against an excessive operation of the lever 6100 close to the limit of the movable range.

Furthermore, in (a6), the terminal controller 630 may issue a warning to the player by causing the notification unit to display a warning image and produce a warning sound at low volume when the predetermined time is a first predetermined time or when the predetermined number of times is a first predetermined number of times, the terminal controller 630 may issue a warning to the player by causing the notification unit to display a warning image and produce a warning sound at middle volume when the predetermined time is a second predetermined time (second predetermined time>first predetermined time) or when the predetermined number of times is a second predetermined number of times (second predetermined number of times>first predetermined number of times), and the terminal controller 630 may issue a warning to the player by causing the notification unit to display a warning image and produce a warning sound at high volume when the predetermined time is at a third predetermined time (third predetermined time>second predetermined time) or when the predetermined number of times is a third predetermined number of times (third predetermined number of times>second predetermined number of times).

According to the arrangement above, the warning contents notified to the player allow the player to understand to what extent the operation is excessive, with the result that damages to the operation device is prevented without taking away the enthusiasms of the player toward the game.

More specifically, a first warning image 715a and a second warning image 715b shown in FIG. 3 and FIG. 4 are displayed and a warning sound is produced at low volume, when the lever position (angle of inclination) continuously stays at the first warning range or the second warning range for the first predetermined time such as four seconds or when the lever position (angle of inclination) enters the first warning range or the second warning range for the first predetermined number of times such as five times within the predetermined time such as 15 seconds.

In addition to the above, the first warning image 715a and the second warning image 715b shown in FIG. 3 and FIG. 4 are displayed and a warning sound is produced at middle volume, when the lever position (angle of inclination) continuously remains in the first warning range or the second warning range for the second predetermined time (second predetermined time>first predetermined time) such as 10 seconds, or when the lever position (angle of inclination) enters the first warning range or the second warning range for a second predetermined number of times (second predetermined number of times>first predetermined number of times) such as 10 times within the predetermined time such as 15 seconds.

In addition to the above, the first warning image 715a and the second warning image 715b shown in FIG. 3 and FIG. 4 are displayed and a warning sound is produced at high volume, when the lever position (angle of inclination) continuously remains in the first warning range or the second warning range for the third predetermined time (third predetermined time>second predetermined time) such as 16 seconds, or when the lever position (angle of inclination) enters the first warning range or the second warning range for the third predetermined number of times (third predetermined number of times>second predetermined number of times) such as 15 times within the predetermined time such as 15 seconds.

In addition to the above, the gaming terminal 10 is arranged to place a load on the lever 6100 when the lever is operated. More specifically, the supporting mechanism 6200 is provided with a load placing mechanism (such as a rotation motor 6202) that is able to place a load against the rotation of the lever 6100, and the terminal controller 630 is programmed to execute the process (a5). In the process (a5), the load placing mechanism places a load against the rotation of the lever 6100 during the running of a game. Because the gaming terminal 10 is able to place a load on the lever 6100 operated by the player, the synchronization between the game and the load on the lever 6100 offers the sense of presence to the player.

With the above-described relationship between the warning level and the warning timing, a warning is issued when an excessive lever operation has continued for a long time or when an excessive lever operation is repeatedly done. As the warning level is changed in accordance with the time and frequency of the excessive lever operation, a warning to the player to refrain from an excessive lever operation is issued in stages.

The gaming terminal 10 arranged as above will be detailed. The gaming terminal 10 includes a bet button unit 601, a spin button unit 602, a control lever 600, a terminal display 614, a movement pattern storage device 608, a terminal-side bonus type storage device 609, and a terminal-side probability table storage device 610. The gaming terminal also includes a terminal controller 630 which controls these units and devices. Note that the bet button unit 601, the spin button unit 602, and the control lever 600 each is a kind of an input device. Further, the gaming terminal 10 includes a transceiver unit 652 which enables data communication with the external controller 621.

The bet button unit 601 has a function of accepting a player's operation for entering a bet amount. The spin button unit 602 and the control lever 600 have a function of receiving a start of a game such as a basic game through a player's operation, i.e., start operation. The terminal display 614 has a function of displaying, in the form of a still image, various symbols 501, numerical values, marks, or the like, and displaying moving pictures such as an effect movie.

As described above, with the control lever 6100, input operation from the outside is possible, and the control lever 6100 is controlled by the terminal controller 630 so that it is movable in accordance with a plurality of movement patterns. Specifically, as shown in FIG. 11, the control lever device 600 includes: a lever 6100 adapted to be gripped by a player; a first motor 6101 which is provided inside the lever 6100 to vibrate the lever; and light emission units 6102 provided at an upper portion of the lever 6100. The movement patterns of the lever 6100 are stored in the movement pattern storage device 608 in association with identification information used for identifying the movement patterns.

The control lever device 600 further includes a support mechanism 6200 configured to rotatably support the lever 6100. The supporting mechanism 6200 is fixed to the gaming terminal 10 to allow the lever 6100 to be rotatable. As shown in FIG. 1, the supporting mechanism 6200 includes a rotation motor 6202 that biases the lever 6100 in forward and backward directions, a restriction member 6402 that restricts the inclination of the lever 6100, and an inclination detection mechanism 600a. The restriction member 6402 is provided at a position where the lever 6100 contacts the restriction member 6402 when the lever 6100 is inclined forward (toward the player) or backward (toward the cabinet) beyond the predetermined angle. The inclination detection mechanism 600a detects the angle of inclination of the lever 6100. The restriction member 6402 and the inclination detection mechanism 600a will be detailed later.

The terminal-side bonus type storage device 609 stores bonus types and unit payout amounts of the terminal bonus games, in association with one another. The terminal-side probability table storage device 610 stores a probability table in which combinations of the terminal bonus games are associated with the probabilities of the combinations.

The terminal controller 630 includes: a coin insertion/start-check unit 603; a basic game running unit 605; a common game running unit 653; a random number sampling unit 615; a symbol determining unit 612; an effect-use random number sampling unit 616; an effect determining unit 613; a speaker unit 617; a lamp unit 618; a winning determining unit 619; and a payout unit 620.

The coin insertion/start-check unit 603 determines which one of the base game, the bonus game, the common game, and the like is to be started, and determines whether the determined one of the base game, the bonus game, the common game, and the like is startable, based on signals output from the bet button unit 601, the spin button unit 602, and the control lever device 600, and a signal or the like from the center controller 200.

The basic game running unit 605 has a function of running a base game on condition that the bet button unit 601 is operated. The basic game running unit 605 determines whether to run a terminal bonus game, based on a combination of rearranged symbols 501 resulted from the base game.

Further, the basic game running unit 605 obtains the angle of inclination of the lever 6100 detected by the inclination detecting mechanism 600a. The basic game running unit 605 issues a warning to the player when the obtained angle of inclination of the lever 6100 is close to the upper limit or the lower limit of the movable range, i.e., in the warning ranges. The warning is issued in such a way that a predetermined sound (warning sound) is output and/or a predetermined image is displayed by the speaker 617 and/or the terminal display 614. For example, in the case where symbols 501 are variable-displayed in response to an operation of the lever 6100, the warning image may be displayed on the terminal display 614 where the symbols 501 are variable-displayed, as illustrated in FIG. 5. Note that, the gaming terminal 10 may give such a visual indication with the use of the lamp unit 618.

Further, the basic game running unit 605 has a function of outputting the state of the basic game to the center controller 200, via the transceiver unit 652. That is, the basic game running unit 605 outputs the running status information to the center controller 200.

The common game running unit 653 has a function of running the common game, based on a game start command from the center controller 200.

The symbol determining unit 612 has: a function of determining symbols 501 to be rearranged, by using a random number given by the random number sampling unit 615; a function of rearranging selected symbols 501 on the symbol display region 614a of the terminal display 614; and a function of outputting information of the symbols 501 rearranged, to the winning determining unit 619.

More specifically, the symbol determining unit 612 has functions of: selecting a symbol column image 500 according to the game (basic game or common game); scroll-displaying the symbol column image 500 selected on the terminal display 614; and stopping the scroll display to rearrange the symbols 501 determined.

The effect-use random number sampling unit 616 has functions of: when receiving the effect instruction signal from the symbol determining unit 612, sampling an effect-use random number; and outputting the effect-use random number to the effect determining unit. The effect determining unit has: a function of determining an effect by using the effect-use random number; a function of outputting, to a video display region 614b of the terminal display 614, video information of the effect thus determined; and a function of outputting audio information and illumination information of the effect to the speaker unit 617 and the lamp unit 618, respectively.

The winning determining unit 619 has: a function of determining whether a winning is achieved when rearrangement information of the symbols 501, which is a display state rearranged on the terminal display 614, is obtained; a function of calculating a payout amount based on a winning combination when it is determined that a winning is achieved; and a function of outputting a payout signal based on the payout amount to the payout unit 620. The payout unit 620 has a function of awarding the player a game value in the form of a coin, a medal, credit, or the like, based on a payout signal from the winning determining unit 619 or the center controller.

The transceiver unit 652 has functions of: outputting the running state of the basic game, points calculated in the common game, or the like to the center controller 200, along with the identification information of each gaming terminal 10; and receiving the game start command, the common game symbol column image 500b, or the like from the center controller 200.

(Functional Block of Gaming Machine 300: External Controller)

The gaming terminal 10 structured as above is connected to the external controller 621. This external controller 621 has a function of remotely operating and monitoring the operation state of each gaming terminal 10 and processes such as changes in various game setting values. Further, the external controller 621 has a function of running the common game in a plurality of gaming terminals 10 simultaneously.

More specifically, as shown in FIG. 7, the external controller 621 includes a common game running unit 6211, a game start command unit 6212, a payout determining unit 6213, a memory 6214, a transceiver unit 6217, a plurality of upper displays 700, display controllers 701, an illuminance sensor 702, a display pattern storage unit 6215, an image storage unit 6216, a center-side bonus type storage unit 6219, and a center-side probability table storage unit 6220.

The common game running unit 6211 has functions of determining whether to start the common game, based on the state of the basic game obtained from the terminal controller 630, and synchronizing the common game run in each of the gaming terminals 10. The game start command unit 6212 has a function of outputting the game start command to the gaming terminal 10. The memory 6214 stores, for each gaming terminal 10, common game qualification times in association with respective payout rates. The transceiver unit 6217 has a function of allowing data exchange with the gaming terminals 10.

The upper displays 700 are provided in a parallel manner, and are controlled by the associated display controllers 701 so that the upper displays 700 form a single common effect display screen. The common effect display screen is arranged to display a plurality of individual images corresponding to the respective gaming terminals 10. Furthermore, the common effect display screen is arranged to display a common game start effect image. The common game start effect image is stored in the image storage unit 6216. The display controllers 701 are controlled by the common game running unit 6211. The illuminance sensor 702 detects the brightness of the disturbance light on the upper displays 700.

The display pattern storage unit 6215 stores sets of identification information in association with a plurality of display patterns of the individual image. Furthermore, the center-side bonus type storage unit 6219 stores bonus types and unit payout amounts of the common game in association with one another. The center-side probability table storage unit 6220 stores a probability table in which combinations of the bonus types are associated with the probabilities of these combinations.

DEFINITION OF TERMS

In this Specification, the expression "rearrange" means dismissing an arrangement of symbols 501, and once again arranging symbols 501. An "arrangement" means a state of symbols 501, which can be visually confirmed by a player.

Note that a "unit game" includes a series of operations performed within a period between a start of receiving a bet to a point where a winning may be resulted. In the present embodiment, a unit game is repeatable in the base game, and contains one each of the following: a bet time where a bet is accepted; a game time where symbols 501 having been stopped are rearranged; and a payout time where a payout process is performed to award a payout. Note that the "base game" is a game runnable on condition that a game value is bet, which base game awards an amount of game media based on symbols 501 rearranged. In other words, the "base game" is a game in which a unit game is started on the premise that a game value is consumed. The "unit game" in the present embodiment is a so-called slot game which is run in each gaming terminal 10 independently of the other gaming terminals 10.

Note that the gaming machine 300 of the present embodiment is structured so that each gaming terminal 10 is able to run a bonus game (terminal bonus game) independently of the other gaming terminals 10. Another bonus game may be adopted in combination, provided that the player is given a more advantageous gaming state than the base game. For example, in the bonus game, various states such as a state in which a larger amount of game values than in the base game is obtainable, a state in which the probability of obtaining a game value is higher than in the base game, and a state in which the amount of consumed game values is smaller than in the base game such as a free game may be realized independently or in combination.

A game runnable with a bet of less game values than the base game is referred to as "free game". Note that "bet of fewer amounts of game values" encompasses a bet of zero game value. The "free game" therefore may be a game runnable without a bet of game value, which awards an amount of game values according to symbols 501 having been rearranged. In other words, the "free game" may be a game which is started without the premise that a game value is consumed. To the contrary, the "base game" is a game runnable on condition that a game value is bet, which awards an amount of game values according to symbols 501 rearranged. In other words, the "base game" is a game which starts on the premise that a game value is consumed.

The gaming machine 300 of the present embodiment has a state in which the base game or the bonus game is runnable, and a state in which the common game is runnable. The base game and/or the bonus game (terminal bonus game) are also referred to as basic game. Thus, in the present embodiment, the basic game includes a base game and/or a bonus game. Further, the common game or the period during which the common game is run is referred to as "event time".

The "game value" is a coin, bill, or electronic information corresponding to them. Note that the game value in the present invention is not particularly limited. Examples of the game value include game media such as medals, tokens, electronic money, tickets, and the like. Further, the ticket is not particularly limited and may be a ticket with a barcode or the like.

Although the present embodiment describes a gaming machine 300 which has a center controller 200 in addition to the gaming terminals 10, the invention is not limited to this. The gaming machine 300 may be arranged so that one or more gaming terminal 10 has the function of the center controller 200 and the gaming terminals 10 are connected with each other to be able to exchange data therebetween. Alternatively, the gaming machine 300 may be arranged so that communication among the gaming terminals 10 is impossible.

(Internal Connection Layout of Gaming Machine 300)

Figure 8:
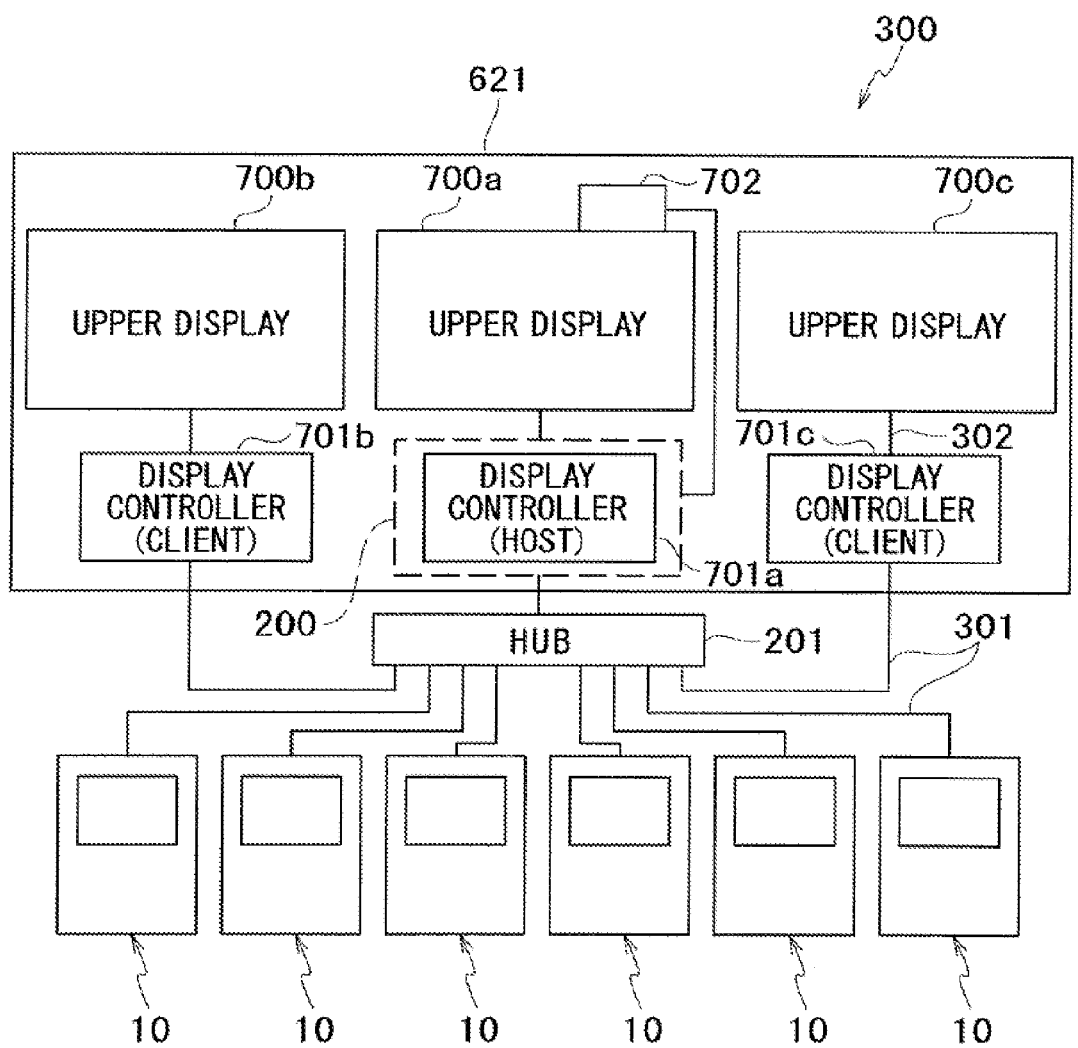
FIG. 8 shows an internal connection layout of the gaming machine.

Now, referring to FIG. 8, the internal connection layout of the gaming machine 300 including the gaming terminals 10 will be described. FIG. 8 shows the gaming machine 300 including the gaming terminals 10 according to First Embodiment of the present invention.

The gaming machine 300 includes six gaming terminals 10 and an external controller 621. The external controller 621 includes three upper displays 700 (700a, 700b, and 700c) and three display controllers 701 (701a, 701b, and 701c). The display controller 701a is a component of the center controller 200 and hosts the other display controllers 701b and 701c. In other words, the display controllers 701b and 701c are clients of the display controller 701a. The display controllers 701a, 701b, and 701c are connected with the respective upper displays 700a, 700b, and 700c via monitor cables 302, so as to function as system controllers controlling the respective upper displays 700.

In addition to the above, the gaming machine 300 is provided with a hub 201. Upstream of the hub 201, the display controller 701a (center controller 200) is connected via a LAN cable 301. On the other hand, downstream of the hub 201, the gaming terminals 10 and the display controllers 701b and 701c are connected via the LAN cable 301. That is to say, the center controller 200 is connected with the gaming terminals 10 to be able to conduct data communications therebetween, and the center controller 200 (display controller 701a) is connected to be able to control the display controllers 701b and 701c. This makes it possible to control the display controllers 701a, 701b, and 701c to cause the upper displays 700 to display images as a single common effect display screen.

In addition to the above, the upper display 700a is provided with an illuminance sensor 702 to detect the brightness of disturbance light applied to the upper display 700a. The illuminance sensor 702 transmits a brightness signal always or at regular intervals to the center controller 200. This brightness signal indicates the brightness of the disturbance light applied onto the upper display 700a. Receiving the brightness signal, the center controller 200 determines whether the currently-set brightness is appropriate by conducting comparison with a predetermined standard. If inappropriate, the center controller 200 controls the display controllers 701a, 701b, and 701c to change the brightness to a suitable level.

(Mechanical Structure of Gaming Machine 300)

Next, the following describes a specific example of mechanical and electrical structures of the gaming machine 300 thus structured.

Figure 9:
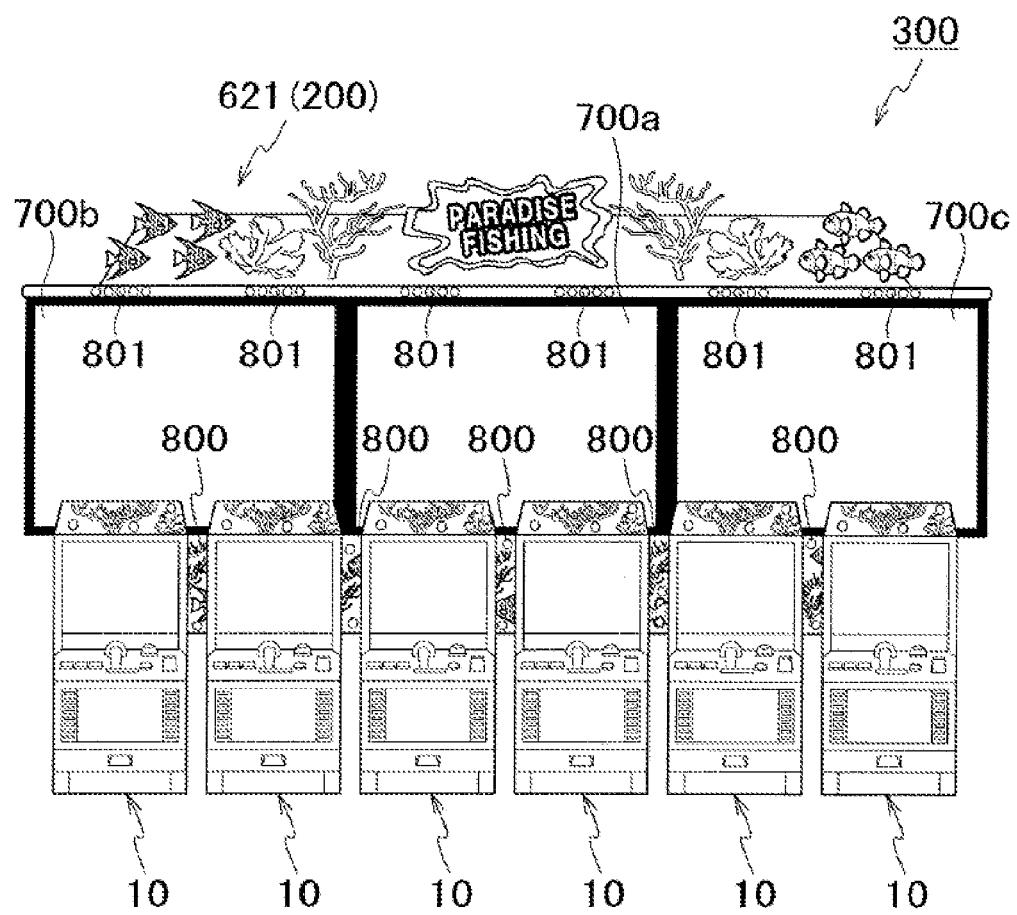
FIG. 9 is a front elevation of the entirety of the gaming machine.

As shown in FIG. 9, the gaming machine 300 includes: six gaming terminals 10 which are provided in a parallel manner and each independently runs a basic game; and an external controller 621 (center controller 200) which is connected with the gaming terminals 10 to be able to communicate therewith and runs a common game. The external controller 621 has three parallel upper displays 700a, 700b, and 700c forming a single common effect display screen, independently from the gaming terminals 10.

Between neighboring gaming terminals 10, an inter-terminal panel 800 is provided. Each inter-terminal panel 800 has at least one LED to light the panel itself. The inter-terminal panel 800 is decorated with pictures indicating the theme of the games playable by the gaming machine 300, giving integrity to the gaming terminals 10. This makes the entirety of the gaming machine 300 look larger than the actual size.

In addition to the above, the upper displays 700 are provided with LED units 801 corresponding to the respective gaming terminals 10. More specifically, the LED units 801 are provided at the upper parts of the frame of each upper display 700 to be immediately above the respective gaming terminals 10. That is to say, the LED units 801 are provided to enclose the upper displays 700. For example, when a later-described independent special game starts at the corresponding gaming terminal 10, the LED unit 801 produces an effect such as flickering for the corresponding gaming terminal 10. This makes it possible to report which gaming terminal 10 wins the independent special game.

In addition to the above, above the external controller 621 and above each gaming terminal 10, decoration panels decorated with pictures indicating the theme of the games playable by the gaming machine 300 are provided. It is noted that, except FIG. 9, the inter-terminal panels 800, the LED units 801, and the decoration panels are omitted from the figures.

Figure 10:
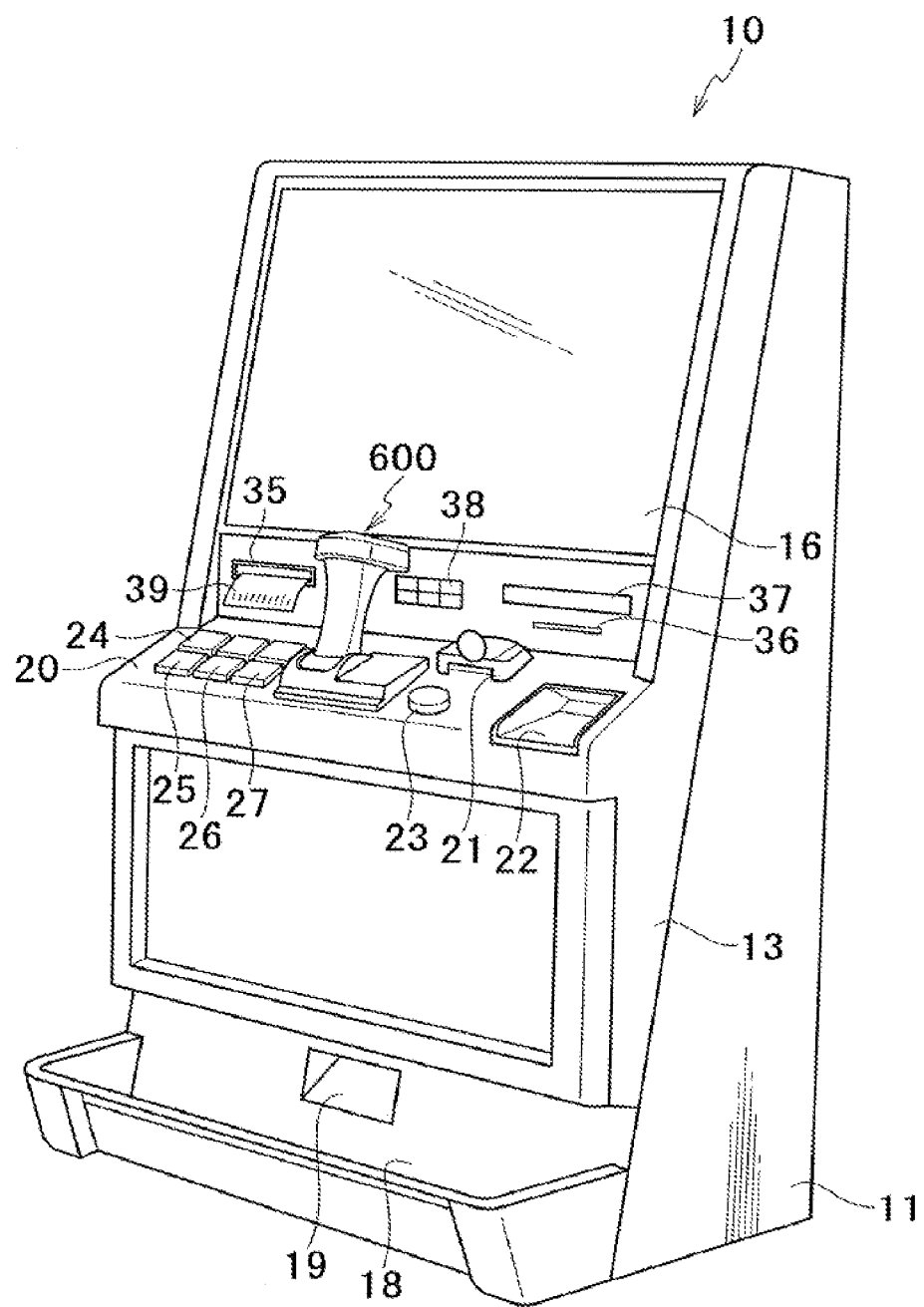
FIG. 10 is a perspective view of the gaming terminal.

As shown in FIG. 10, the gaming terminal 10 includes a cabinet 11 and a main door 13 provided on the front surface of the cabinet 11. The main door 13 has a terminal image display panel 16. The terminal image display panel 16 has a transparent liquid crystal panel for displaying various kinds of information. The terminal image display panel 16 displays display windows 150 (video reels 151 to 155) for scroll-displaying and arranging a plurality of symbols 501 (see FIG. 19). Further, the terminal image display panel 16 displays various information and effect images related to a game, as needed.

The present embodiment deals with a case where the terminal image display panel 16 electrically displays symbols 501 arranged in five columns and three rows. However, the present invention is not limited to this.

Note that the terminal image display panel 16 may have a credit amount display unit and a payout amount display unit. The credit amount display unit displays a total value (hereinafter also referred to as total credit value) which the gaming terminal 10 can pay out to a player. The payout amount display unit displays the number of coins to be paid out when symbols stopped along a payline form a winning combination.

Below the terminal image display panel 16 provided are a control panel 20, a coin receiving slot 21, and a bill validator 22. The control panel 20 is provided with buttons 23 to 27 and the control lever device 600. These buttons 23 to 27 and the control lever device 600 allow the player to input instructions concerning the progress of a game. Through the coin receiving slot 21, a coin is received in the cabinet 11.

The control panel 20 has: a spin button 23, a change button 24, a cashout button 25, a 1-bet button 26, and a maximum bet button 27. The spin button 23 is for inputting an instruction to start symbol scrolling. The change button 24 is used to ask a staff person in the gaming facility for exchange of money. The cashout button 25 is for inputting an instruction to pay out coins corresponding to the total credit value into the coin tray 18.

The 1-bet button 26 is used for betting one coin out of those corresponding to the total credit value. The maximum bet button 27 is used for betting, out of those corresponding to the total credit value, a upper limit of coins (e.g., 50 coins) which can be bet in one game.

The bill validator 22 validates whether a bill is genuine or not and receives the genuine bill into the cabinet 11. Note that the bill validator 22 is capable of reading a barcode attached to a later-mentioned barcoded ticket 39. When the bill validator 22 reads the barcoded ticket 39, it outputs to the main CPU 41a read signal representing information having read from the barcode.

On the lower front surface of the main door 13, that is, below the control panel 20, a belly glass 34 is provided. On the belly glass 34, a character of the gaming terminal 10, or the like is drawn.

Below the terminal image display panel 16 are provided a ticket printer 35, a card reader 36, a data displayer 37, and a keypad 38. The ticket printer 35 prints on a ticket a barcode and outputs the ticket as the barcoded ticket 39. The barcode is encoded data containing a credit amount, date and time, an identification number of the gaming terminal 10, or the like. A player can play a game in another gaming terminal 10 using the barcoded ticket 39 having the barcode, or can exchange the barcoded ticket 39 having the barcode with a bill or the like at a change booth of the gaming facility.

The card reader 36 reads/writes data from/into a smart card. The smart card is carried by a player, and stores therein data for identifying the player, data relating to a history of games played by the player, or the like.

The data displayer 37 includes a fluorescent display or the like, and displays the data read by the card reader 36 and the data input by the player through the keypad 38, for example. The keypad 38 is for entering instructions or data relating to issuing of a ticket or the like.

Figure 12:
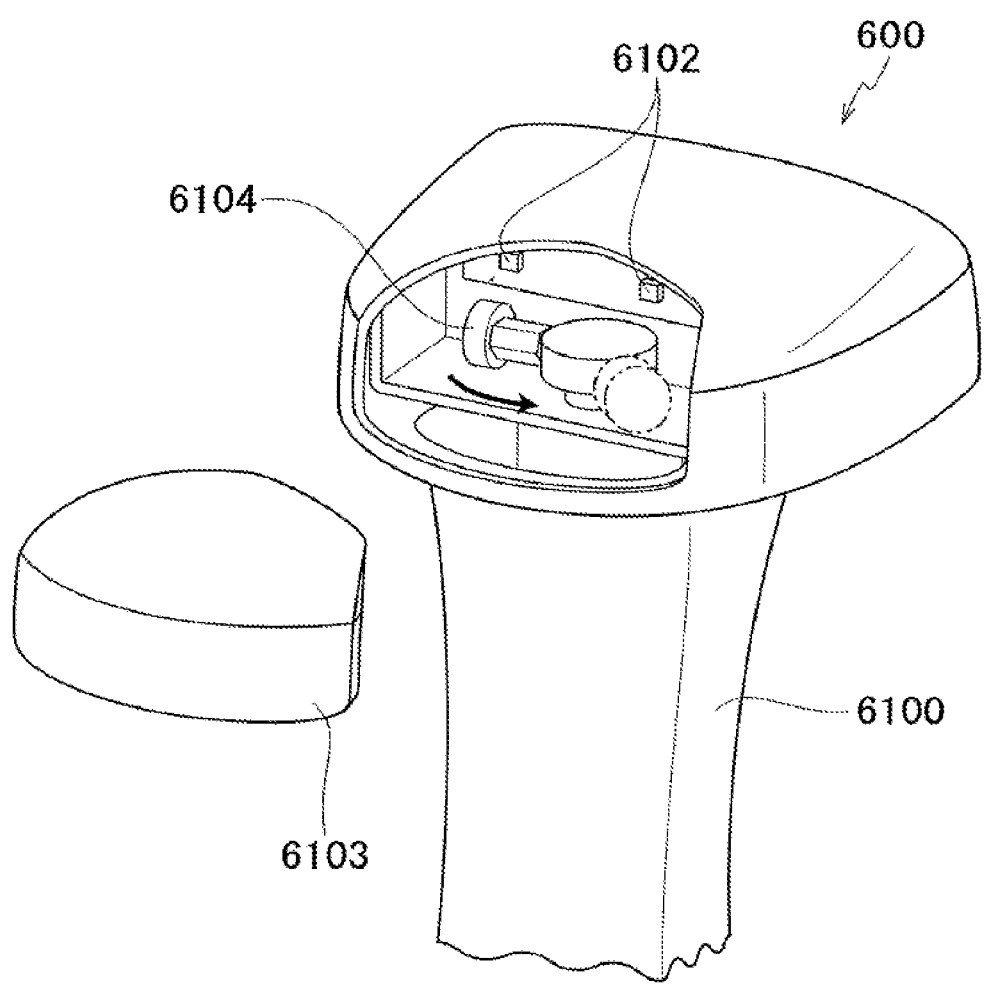
FIG. 12 is a partial exploded perspective view showing the control lever device.
Figure 13:
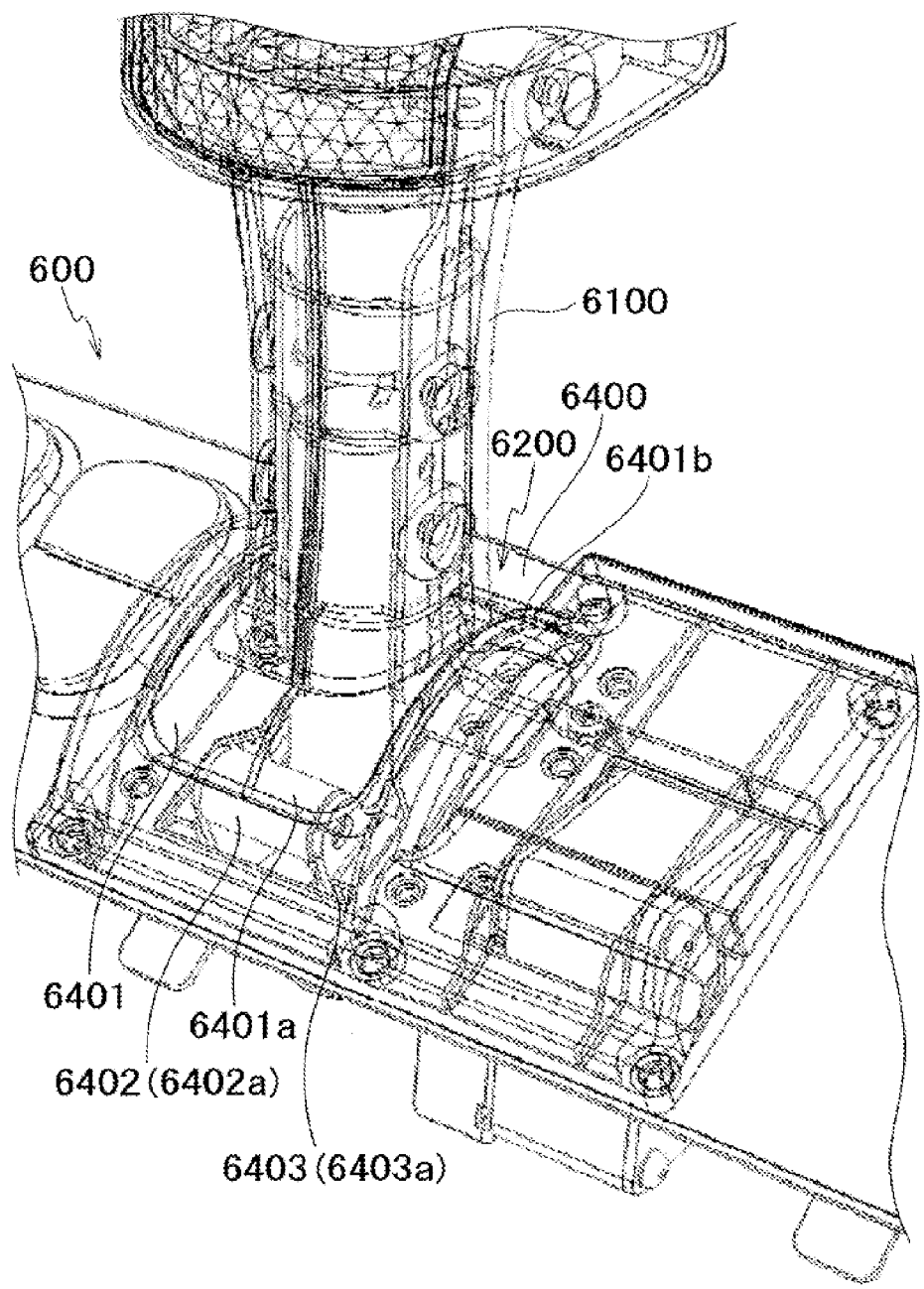
FIG. 13 is a perspective view of the control lever device viewed from the front right.
Figure 15:
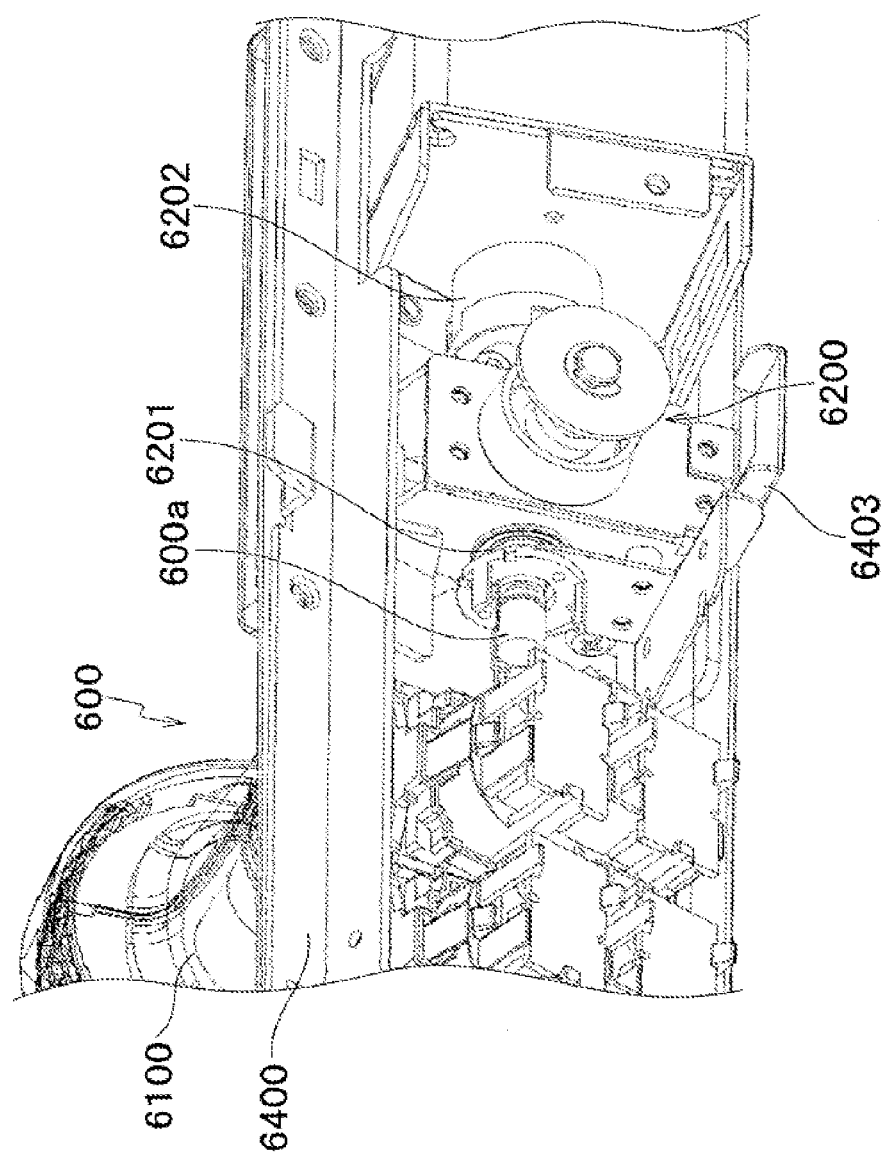
FIG. 15 is a perspective view of the control lever device, focusing on its bottom.

Now, with reference to FIG. 11 and FIGS. 12 to 15, the control lever device 600 will be described. FIG. 11 is a schematic drawing of the control lever device 600, viewed from the side. FIG. 12 is a partial exploded perspective view showing the control lever device 600. FIG. 13 is a perspective view of the control lever device 600 viewed from the front right. FIG. 14 is a perspective view of the control lever device 600, whose cover is removed, viewed from the front left. FIG. 15 is a perspective view of the control lever device 600, focusing on its bottom. As shown in FIG. 11, the control lever device 600 includes: a lever main body (lever) 6100 adapted to be gripped by a player; and the support mechanism 6200 which supports the lever 6100. The lever 6100 contains a vibration motor (the first motor) 6101 which vibrates the lever 6100, and is provided with LEDs (the light emission units) 6102 at an upper portion of the lever.

The lever 6100 is substantially T-shaped in cross section, and has a light emitting portion having LEDs 6102 at an upper part and a grip to be griped by the player. The light emitting portion of the lever 6100 is provided with a light-transmissive cover 6103 which allows light from the LEDs 6102 to pass through. The vibration motor 6101 is stored in the upper portion of the grip. The vibration of the vibration motor 6101 is controlled by a later-described motor drive control circuit 6035 (see FIG. 17). Further, the control lever device 600 is arranged so that the lever 6100 is rotatable in forward and backward directions in the elevation view of the gaming terminal 10 (forward and backward from a reference position shown in FIG. 11, i.e., in directions indicated with arrows in FIG. 11). In the control lever device 600, a rotation motor 6202 is provided below the grip inside the cabinet 11. The rotation motor 6202 is controlled by the later-described motor drive control circuit 6035 (see FIG. 17), and the rotation motor 6202 provides torque in the rotation direction to the lever 6100. It is noted that the torque in this rotation direction functions not only as a driving force causing the lever 6100 to automatically rotate forward and backward but also as a load placed on the lever 6100 during the game.

Further, as shown in FIG. 12, at the light emitting portion of the control lever device 600, there is provided a pendulum component 6104 which is attached to be coaxial with the vibration motor 6101 and rotates with the vibration motor 6101. The pendulum component 6104 is configured to partly protrude in a radial direction. The pendulum component 6104 is positioned to block at least a part of light emitted from the LEDs 6102 to the light-transmissive cover 6103. The pendulum component 6104 is positioned to block at least a part of light emitted from the LEDs 6102 to the light-transmissive cover 6103. Thus, rotating with the vibration motor 6101, the pendulum component 6104 changes the amount of light emitted from the LEDs 6102 to the outside through the light-transmissive cover 6103, in synchronization with the vibration motor 6101. In other words, as the protrusion of the pendulum component 6104 blocks or do not block the light from the LEDs 6102, the light viewed from the outside through the light-transmissive cover 6103 is changed.

As shown in FIG. 15, the support mechanism 6200 includes: a rotation axis 6201 which penetrates one end portion (end portion where the grip is not provided) of the lever 6100; and the rotation motor (the second motor) 6202 connected to one end of the rotation axis 6201. The rotation motor 6202 rotates the rotation axis 6201, and this rotates the lever 6100 coupled to the rotation axis 6201. Meanwhile, to the other end of the rotation axis 6201 (the end opposite to the end to which the rotation motor 6202 is attached), attached is the inclination detecting mechanism 600a which configured to detect the angle of inclination of the lever 6100.

As shown in FIG. 11, the inclination detecting mechanism 600a includes: a magnet 6301 attached to the rotation axis 6201; and a magnetic force detecting mechanism 6302 disposed in the vicinity of the magnet 6301. Since the magnet 6301 is attached to the rotation axis 6201, the magnet 6301 rotates along with the rotation of the lever 6100. Thus, with the rotation of the lever 6100, the magnet 6301 changes an external magnetic field. Further, the magnetic force detecting mechanism 6302 includes: a magnetic force sensor which outputs a magnetic force detection signal of an output intensity corresponding to the magnetic force; and a sensor fixing mechanism which fixes the magnetic force sensor to a predetermined position. The magnetic force detecting mechanism 6302 detects the magnetic force of the magnetic field which is generated by the magnet 6301 and varies with the rotation of the lever 6100, and then outputs a magnetic force detection signal indicating the value of the detected magnetic force (detected magnetic force value). The detected magnetic force value represents the angle of inclination of the lever 6100 with respect to the reference position (the position of the lever 6100 which is not being operated by the player), so that the angle of inclination of the lever 6100 is derived from the detected magnetic force value. Note that, the angles of inclination (lever positions) of the lever 6100 and the corresponding detected magnetic force values are listed in a later-described lever position determining table.

As shown in FIGS. 13 and 15, the support mechanism 6200 is accommodated in a sturdy case 6400 (sturdier than the later-described restriction members 6402). In the case 6400, there is formed a space 6401 in a motion space of the lever 6100 to allow the lever 6100 to rotate. Further, as shown in FIGS. 13 and 14, one of the restriction members 6402 (restriction member 6402a) is positioned so that the restriction member 6402a is closer to the lever 6100 than a front edge 6401a of the space 6401 (behind the front edge 6401a); whereas another one of the restriction members 6402 (6402b) is positioned so that the restriction member 6402b is closer to the lever 6100 than a rear edge 6401b of the space 6401 (in front of the rear edge 6401b). It should be noted that, in this Specification, "front", "forward" or "in front of" is used with reference to "the front of the gaming terminal 10" or "the position in front of the gaming terminal 10", that is, it means the position closer to, or the direction toward, a viewer of FIG. 5 (i.e., player-side in FIG. 1); while "rear", "backward" or "behind" is used with reference to "the rear of the gaming terminal 10" or "the position behind the gaming terminal 10", that is, it means the position farther from, or the direction away from, the viewer of FIG. 5 (i.e., cabinet-side in FIG. 1).

Each of the restriction members 6402a and 6402b is an elastic member made of resin or the like, for example, and is fixed to the case 6400 through a mounting member 6403 (6403a, 6403b). Note that, each restriction member 6402a, 6402b has a columnar shape, and is fixed in a horizontal posture (in such a manner that the height direction of the column is parallel to the left and right direction of the gaming terminal 10).

In the above structure, when inclined forward, the lever 6100 abuts the restriction member 6402a before it abuts the edge 6401a of the space 6401. That is, the angle of inclination, with respect to the reference position, of the lever 6100 abutting the restriction member 6402a (the first angle and the third angle) is designed to be smaller than the angle of inclination, with respect to the reference position, of the lever 6100 abutting the edge 6401a of the space 6401 (the fourth angle). Meanwhile, when inclined backward, the lever 6100 abuts the restriction member 6402b before abutting the edge 6401b of the space 6401. That is, the angle of inclination, with respect to the reference position, of the lever 6100 abutting the restriction member 6402b (the first angle and the third angle) is also designed to be smaller than the angle of inclination, with respect to the reference position of the lever 6100 abutting the edge 6401b of the space 6401 (the fourth angle).

Accordingly, even if the player excessively inclines the lever 6100, the lever 6100 abuts either of the restriction members 6402 before abutting the edge 6401a, 6401b of the space 6401. Therefore, even if the lever 6100 accidentally comes into collision with the edge 6401a, 6401b of the space 6401, the impact of the collision is mitigated with either of the restriction members 6402. This effectively prevents breakage or the like of the edge 6401a, 6401b of the space 6401 or the support mechanism 6200.

(Inclination Angle Table)

Figure 16:
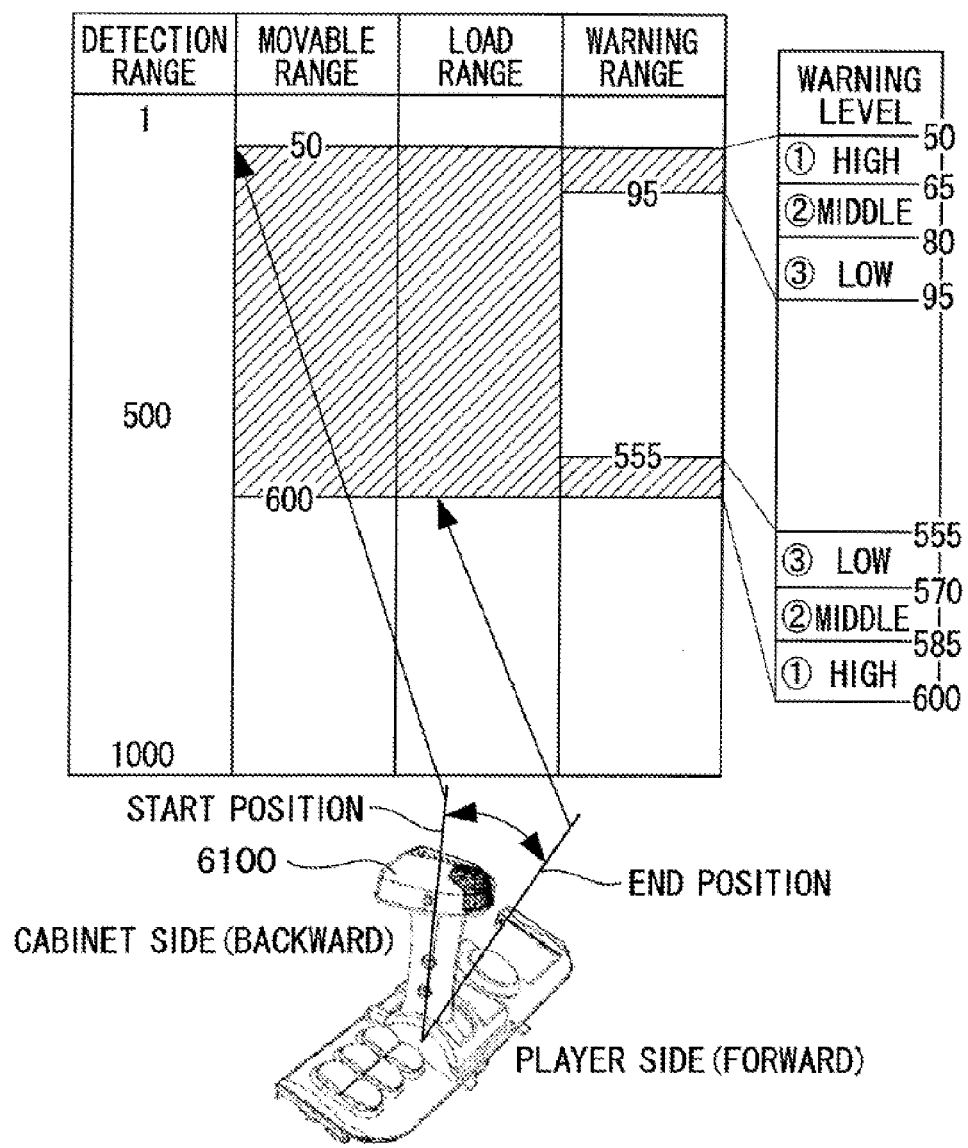
FIG. 16 illustrates an inclination angle table.

As shown in FIG. 16, the inclination angle table has a detection range field, a movable range field, a load range field, and a warning range field. The detection range field stores the maximum range of the angles of inclination detectable by the detecting mechanism 600a. For example, the detection range field stores the angles of inclination from "1" to "1000" in sequence. The angle of inclination is calculated by rounding a detected magnetic force value at each position of the rotated lever 6100 to an integer. The table shown in FIG. 16 indicates that the angle of inclination is detectable with the resolution of "1" to "1000". It is noted that the resolution of the detection of the angle of inclination is easily changed by changing the maximum value in the detection range field. For example, when the maximum value in the detection range field is changed from "1000" to "50", the angle of inclination is detected with the resolution of "1" to "50".

The movable range field specifies the range of the angles of inclination in which the lever 6100 is operable. That is to say, the movable range field specifies, for example, the movable range by assigning "1" to the range corresponding to the angles of inclination from the cabinet-side start position to the player-side end position and assigning "0" to other areas. For example, the table shown in FIG. 16 indicates that the angles of inclination are variable within the range of "50" to "600". When an operation of the lever 6100 exceeds the upper limit or lower limit of the movable range, the movable range is updated so that the exceeded angle of inclination is set as a new upper limit or lower limit of the movable range.

The load range field specifies the range of the angles of inclination in which a load is placed on the lever 6100. That is to say, the load range field specifies, for example, the movable range by assigning "1" to the range of the angles of inclination from the cabinet-side start position to the player-side end position and by assigning "0" to other areas. For example, the table in FIG. 16 indicates that a load is placed when the angle of inclination falls within the range of "50" to "600". While the present embodiment is arranged so that the range of the angles of inclination is identical between the movable range field and the load range field, this arrangement is not prerequisite.

The warning range field specifies the range of the angles of inclination in which a warning is issued to the player and also specifies the range of the angles of inclination for each warning level. That is to say, the warning range field assigns "1" to the low warning level, "2" to the middle warning level, "3" to the high warning level, and "0" to the ranges in which no warning is issued.

For example, the table of FIG. 16 assigns the warning level "3" to the range of the angles of inclination "50" to "65", the warning level "2" to the range of the angles of inclination "65" to "80", and the warning level "1" to the range of the angles of inclination "80" to "95". Furthermore, the table assigns the warning level "1" to the range of the angles of inclination "555" to "570", the warning level "2" to the range of the angles of inclination "570" to "585", and the warning level "3" to the range of the angles of inclination "585" to "600". The warning level "0" is assigned to the ranges other than the above.

As such, when the lever 6100 is positioned at the angle of inclination in the start-position-side warning range or the end-position-side warning range, the gaming terminal 10 issues a warning to the player by the warning contents or sound at volume corresponding to each warning level.

(Electric Configuration of Gaming Terminal 10)

Figure 17:
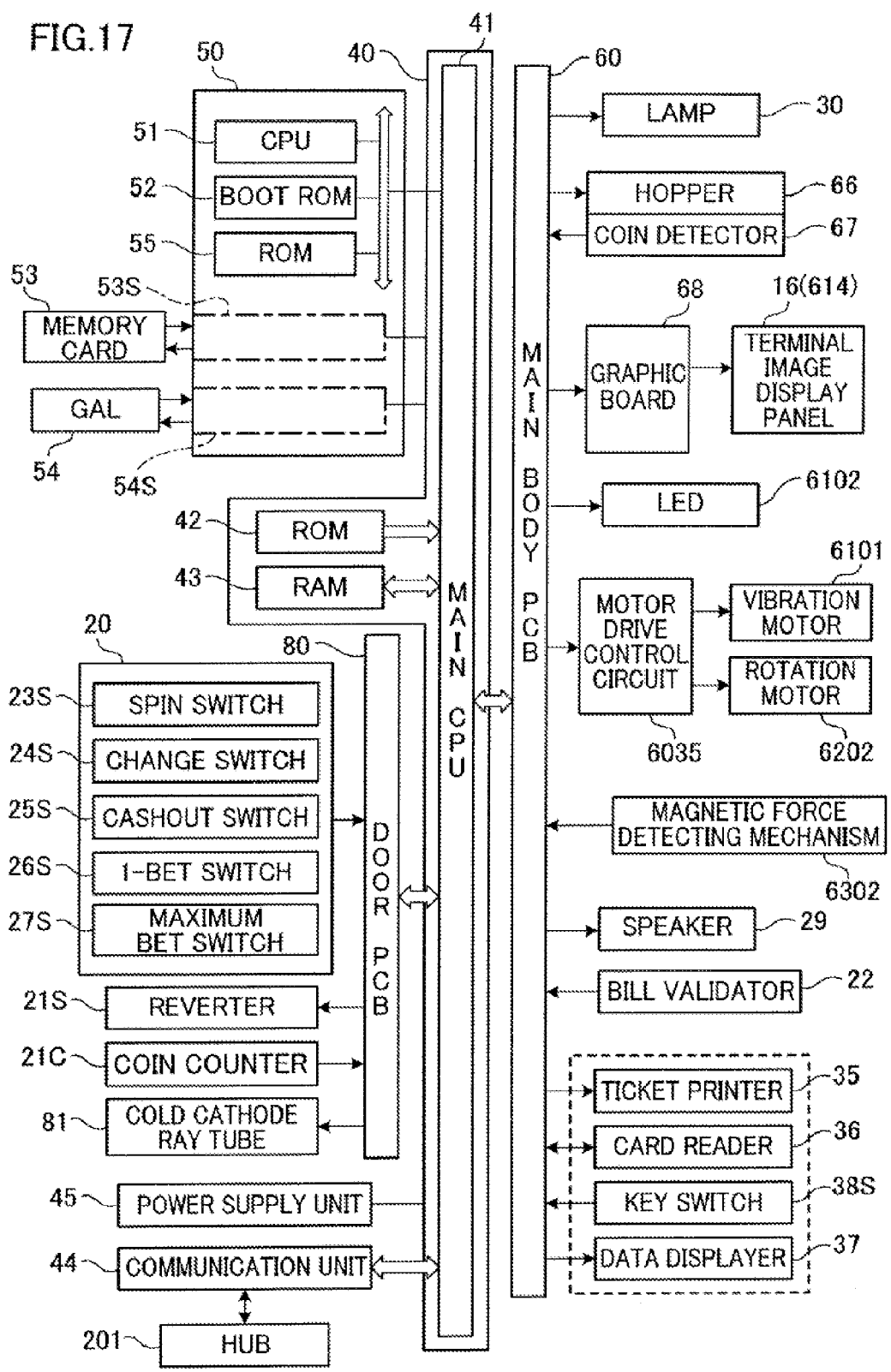
FIG. 17 is a block diagram of a control circuit of the terminal controller.

FIG. 17 is a block diagram illustrating an electric configuration of each of the gaming terminals 10. As illustrated in FIG. 17, the cabinet 11 includes a control unit having a terminal controller 630. The control unit includes a motherboard 40, a main body PCB (Printed Circuit Board) 60, a gaming board 50, a door PCB 80, various switches, sensors, or the like, as shown in FIG. 17.

The gaming board 50 is provided with a CPU (Central Processing Unit) 51, a ROM 55, a boot ROM 52, a card slot 53S corresponding to a memory card 53, and an IC socket 54S corresponding to a GAL (Generic Array Logic) 54. The CPU 51, the ROM 55, and the boot ROM 52 are connected to one another through an internal bus.

The memory card 53 stores therein various types of data for use in the game programs and the game system programs. The game program contains a stop symbol determining program. The stop symbol determining program determines symbols (code number corresponding to the symbol) to be stopped in the display windows 150. This stop symbol determining program contains sets of symbol weighting data respectively corresponding to various payout ratios (e.g., 80%, 84%, 88%). Each set of the symbol weighting data indicates, for each of the video reels 151 to 155, a code number of each symbol and at least one random number allotted to the code number. The random number is a value within a predetermined range of 0 to 256 for example.

The payout ratio is determined based on payout ratio setting data output from the GAL 54. Based on a set of the symbol weighting data corresponding to the payout ratio determined, a symbol to be stopped is determined.

The memory card 53 stores therein various types of data for use in the game programs and the game system programs. For example, the memory card 53 stores a table listing combinations of a symbol 501 to be displayed on the video reels 151 to 155 and an associated range of random numbers. This data is transferred to the RAM 43 of the motherboard 40, at the time of running a game program.

The card slot 53S is structured so as to allow the memory card 53 to be attached/detached to/from the card slot 53S. This card slot 53S is connected to the motherboard 40 through an IDE bus. Thus, a type and contents of a game run at the gaming terminal 10 can be changed by detaching the memory card 53 from the card slot 53S, writing a different game program and a different game system program into the memory card 53, and inserting the memory card 53 back into the card slot 53S.

Each of the game programs includes a program related to the progress of the game and/or a program for causing a transition to a common game. Each of the game programs includes image data and audio data output during the game.

The GAL 54 has input ports and output ports. When the GAL 54 receives data via an input port, it outputs data corresponding to the input data from its output port. This data from the output port is the payout ratio setting data described above.

The IC socket 54S is structured so as to allow the GAL 54 to be attached/detached to/from the IC socket 54S. The IC socket 54S is connected to the motherboard 40, via a PCI bus. Thus, the payout ratio setting data to be output from the GAL 54 can be modified by: detaching the GAL 54 from the IC socket 54S, overwriting the program stored in the GAL 54, and attaching the GAL 54 back to the IC socket 54S.

The CPU 51, the ROM 55 and the boot ROM 52 connected through the internal bus are connected to the motherboard 40 through the PCI bus. The PCI bus communicates signals between the motherboard 40 and the gaming board 50 and supplies power from the motherboard 40 to the gaming board 50. The ROM 55 stores country identification information and an authentication program. The boot ROM 52 stores a preliminary authentication program and a program (boot code) for enabling the CPU 51 to run the preliminary authentication program.

The authentication program is a program (falsification check program) for authenticating the game program and the game system program. The authentication program is a program for confirming and verifying that the game program and the game system program are not falsified. In other words, the authentication program is described in accordance with a procedure for authenticating the game program and the game system program. The preliminary authentication program is a program for authenticating the authentication program. The preliminary authentication program is described in accordance with a procedure for verifying that the authentication program to be authenticated is not falsified. In short, the preliminary authentication program authenticates the authentication program.

The motherboard 40 is provided with a main CPU 41 (terminal controller 630), a ROM (Read Only Memory) 42, a RAM (Random Access Memory) 43, and a communication unit 44.

The main CPU 41 serves as a terminal controller 630 and has a function of controlling the entire gaming terminal 10. In particular, the main CPU 41 controls the following operations: an operation of outputting an instruction signal instructing variable-displaying of symbols 501 to the graphic board 68, which is performed in response to pressing of the spin button 23 after betting of credit; an operation of determining symbols 501 to be stopped after the variable-displaying of symbols 501; and an operation of stopping the symbols 501 thus determined in the video reels 151 to 155.

In other words, the main CPU 41 serves as an arrangement controller which arranges symbols to form a new symbol matrix through scrolling of symbols displayed on the terminal image display panel 16. This main CPU 41 therefore determines symbols to be arranged in the symbol matrix by selecting symbols to be arranged from various kinds of symbols. Then, the main CPU 41 executes arrangement control to stop scrolling the symbols to present the symbols thus determined.

The ROM 42 stores a program such as BIOS (Basic Input/Output System) run by the main CPU 41, and permanently-used data. When the BIOS is run by the main CPU 41, each of peripheral devices is initialized and the game program and the game system program stored in the memory card 53 are read out through the gaming board 50. The RAM 43 stores data or a program used for the main CPU 41 to perform a process.

The communication unit 44 is provided to communicate with a host computer or the like equipped in the gaming facility, through a communication line. The communication unit 44 is also for communicating with the center controller 200 through a hub 201 and a communication line. Further, a main body PCB (Printed Circuit Board) 60 and a door PCB 80 are connected to the motherboard 40, through USB (Universal Serial Bus). Further, the motherboard 40 is connected to a power supply unit 45. The power supply unit 45 supplies power to the motherboard 40 to boot the main CPU 41 thereof. Meanwhile, the power unit 45 supplies power to the gaming board 50 through the PCI bus to boot the CPU 51 thereof.

The main body PCB 60 and door PCB 80 are connected to various devices or units which generate signals to be input to the main CPU 41, and various devices or units whose operations are controlled by control signals from the main CPU 41. Based on a signal input to the main CPU 41, the main CPU 41 runs the game program and the game system program stored in the RAM 43, to perform a calculation process. Then, the CPU 41 stores the result of the calculation process in the RAM 43, or transmits a control signal to the various devices and units to control them based on the result.

The main body PCB 60 is connected with the lamp 30, a hopper 66, a coin detector 67, the graphic board 68, the speaker 29, the bill validator 22, the ticket printer 35, the card reader 36, a key switch 38S, and the data displayer 37.

The lamp 30 is turned on/off on the basis of a control signal from the main CPU 41.

The hopper 66 is mounted in the cabinet 11 and pays out a predetermined number of coins from a coin outlet 19 to the coin tray 18, based on a control signal from the main CPU 41. The coin detector 67 is provided inside the coin outlet 19, and outputs a signal to be input to the main CPU 41 upon sensing that a predetermined number of coins have been delivered from the coin outlet 19.

The graphic board 68 controls image displaying on the terminal image display panel 16, based on a control signal from the main CPU 41. Further, the graphic board 68 is provided with a VDP (Video Display Processor) for generating image data on the basis of a control signal from the main CPU 41, a video RAM for temporarily storing the image data generated by the VDP, or the like. Note that image data used at the time of generating the image data by the VDP is in a game program which is read out from the memory card 53 and stored in the RAM 43.

The bill validator 22 reads an image on a bill and takes only those recognized as genuine into the cabinet 11. When taking in a genuine bill, the bill validator 22 outputs an input signal indicating the value of the bill to the main CPU 41. The main CPU 41 stores into the RAM 43 a credit amount corresponding to the value of the bill indicated by the signal.

Based on a control signal from the main CPU 41, the ticket printer 35 prints on a ticket a barcode and outputs the ticket as a barcoded ticket 39. The barcode is encoded data containing the credit amount stored in the RAM 43, date and time, and the identification number of the gaming terminal 10.

The card reader 36 reads out data from the smart card and transmits the data to the main CPU 41. Further, the card reader 36 writes data into the smart card based on the control signal output from the main CPU 41. The key switch 38S is mounted to the keypad 38, and outputs a signal to the main CPU 41 in response to an operation of the keypad 38 by the player. The data displayer 37 displays, based on a control signal from the main CPU 41, the data read by the card reader 36 or the data input by the player through the keypad 38.

The door PCB 80 is connected to the control panel 20, a reverter 21S, a coin counter 21C, and a cold cathode tube 81. The control panel 20 is provided with: a spin switch 23S associated with the spin button 23; a change switch 24S associated with the change button 24; a cashout switch 25S associated with the cashout button 25; a 1-bet switch 26S associated with the 1-bet button 26; and a maximum bet switch 27S associated with the maximum bet button 27. Each of the switches 23S to 27S outputs an input signal to the main CPU 41 when corresponding one of the buttons 23 to 27 is operated by a player.

The coin counter 21C is provided within the coin receiving slot 21, and identifies whether the coin inserted into the coin receiving slot 21 by the player is genuine. A coin except the genuine coin is discharged from the coin outlet 19. In addition, the coin counter 21C outputs an input signal to the main CPU 41 upon detection of a genuine coin.

The reverter 21S operates based on a control signal from the main CPU 41, and delivers coins that are recognized as genuine by the coin counter 21C into a not-shown cash box or the hopper 66 in the gaming terminal 10. In other words, when the hopper 66 is full of the coins, the genuine coin is distributed into the cash box by the reverter 21S. On the other hand, when the hopper 66 is not yet full of the coins, the genuine coin is distributed into the hopper 66. The cold cathode tube 81 functions as a backlight mounted to rear sides of the terminal image display panel 16 and the upper image display panel 33. This cold cathode tube 81 turns on according to a control signal from the main CPU 41.

In addition to the above, the main body PCB 60 is connected to the motor drive control circuit 6035. The motor drive control circuit 6035 controls the drive of the vibration motor 6101 and the rotation motor 6202. The main body PCB 60 is also connected to the LEDs 6102. The main body PCB 60 controls light emission from the LEDs 6102.

The main body PCB 60 is also connected to the magnetic force detecting mechanism 6302. As described above, the magnetic force detecting mechanism 6302 detects a magnetic force indicating the position of the lever 6100, and transmits to the main body PCB 60 a magnetic force detection signal indicating the value of the detected magnetic force (detected magnetic force value). The main body PCB 60 generates magnetic force detection data indicating the detected magnetic force value of the magnetic force detection signal, at short intervals each shorter than a frame period (e.g., $\frac{1}{60}$ seconds per frame), and then inputs the data into the main CPU 41. Then, the main CPU 41 searches, through the corresponding one lever position determining table T1, for the detected magnetic force value indicated by the magnetic force detection data obtained from the main body PCB 60, and thereby obtains the angle of inclination (lever position) of the lever 6100.

(Electric Configuration of Center Controller 200)

Figure 18:
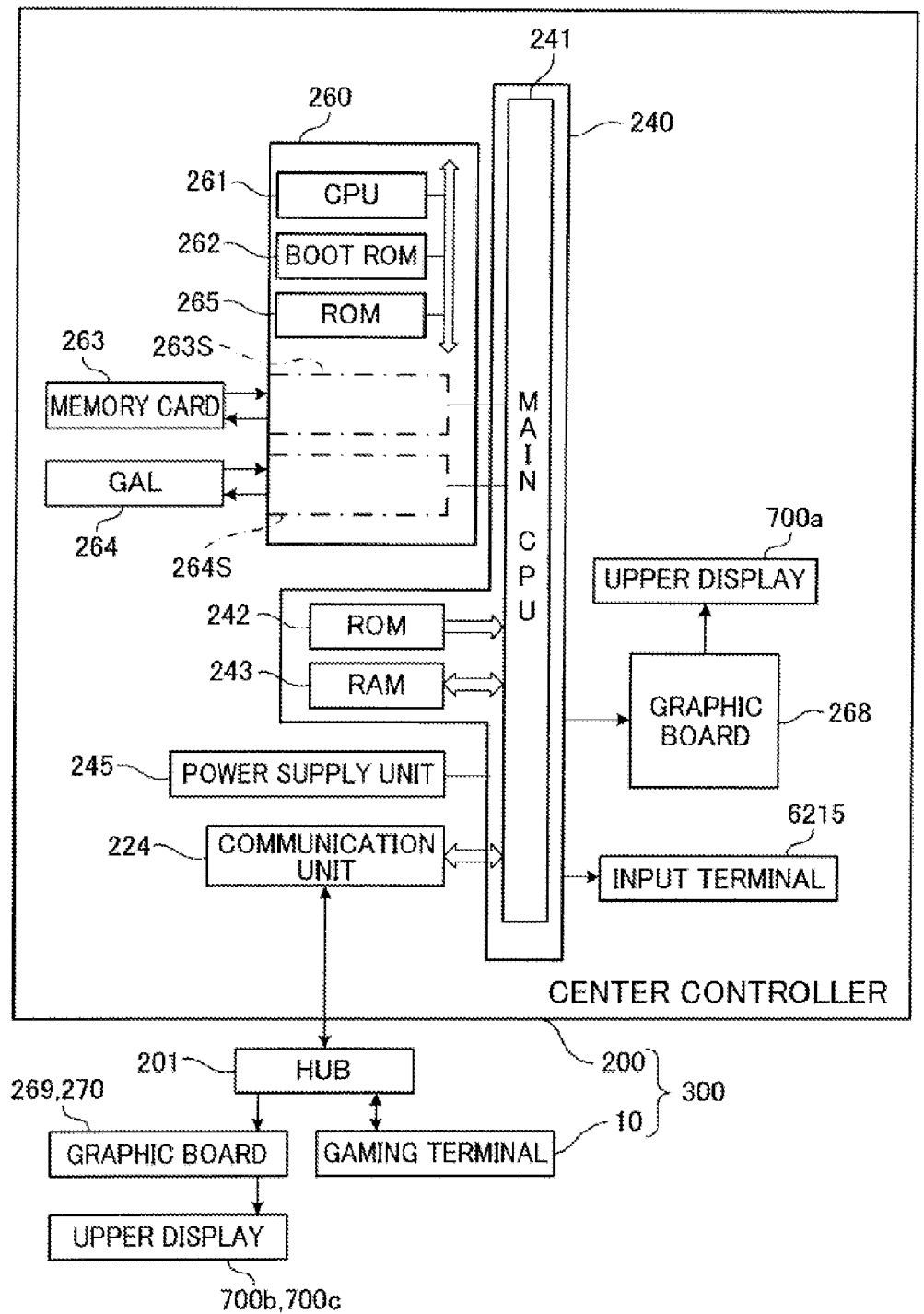
FIG. 18 is a block diagram of a control circuit of the center controller.

FIG. 18 is a block diagram illustrating an electric configuration of the center controller 200. The center controller 200 is provided therein with a control unit. As illustrated in FIG. 18, the control unit includes a motherboard 240, a gaming board 260, an actuator, and the like.

The gaming board 260 has the same structure as that of the gaming board 50. The motherboard 240 has the same structure as that of the motherboard 40. The communication unit 244 communicates with the terminal controller 630 through a communication line.

The graphic board 268 has the same structure as that of the graphic board 68, except in that the graphic board 268 controls displaying of the upper display 700*a* based on a control signal from the main CPU 241. In other words, the graphic board 268 functions as the display controller 701*a*. Furthermore, the graphic board 268 outputs a control signal to graphic boards 269 and 270 controlling the upper displays 700*b* and 700*c*, via the communication unit 224, the hub 201, and the communication line. In other words, the graphic boards 269 and 270 function as the display controllers 701*b* and 701*c*.

(Basic Game)

Now, the basic game independently run by the gaming terminal 10 will be described. In the present embodiment, the basic game is constituted by a base game and a bonus game.

(Symbols, Combinations, and the Like)

Figure 19:
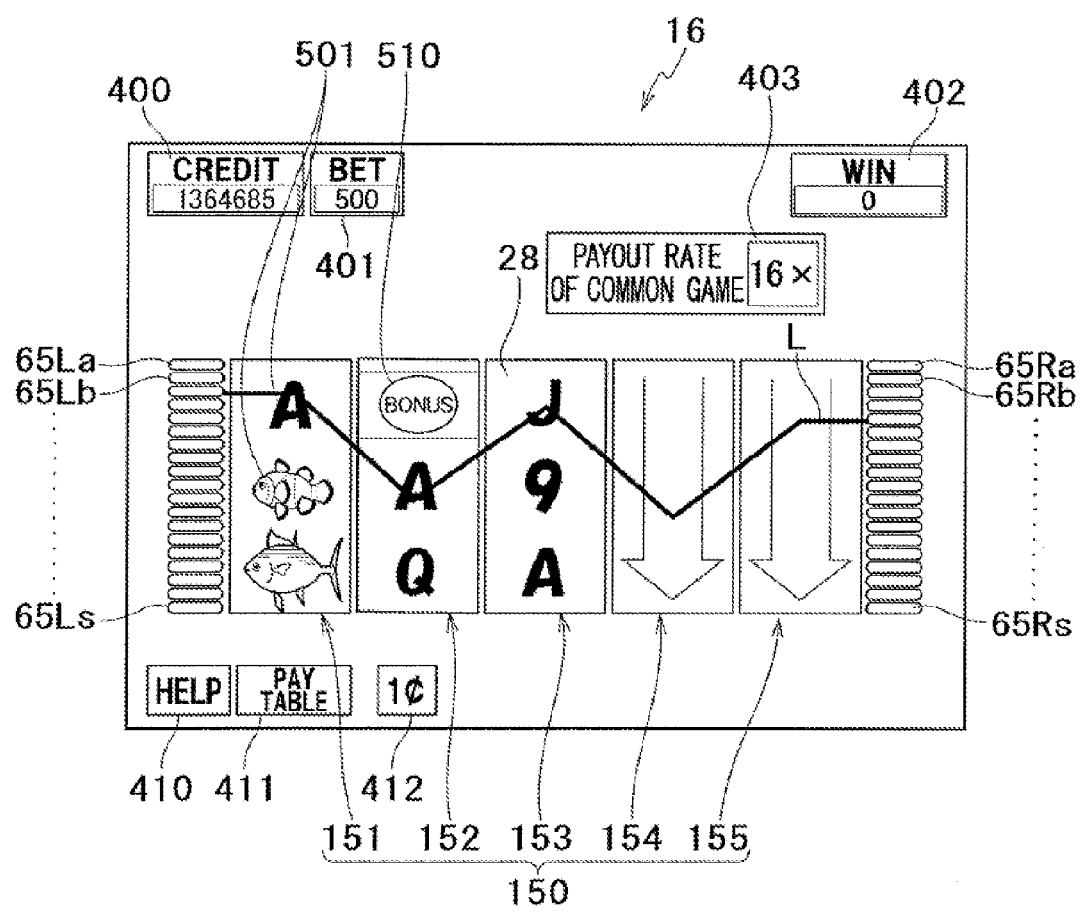
FIG. 19 shows an example of a display screen of a base game.

The symbols 501, which are displayed on the video reels 151 to 155 of the terminal image display panel 16 on which a basic game is displayed, form a symbol column. As shown in FIG. 19, the terminal image display panel 16 displays a display window 150 which is constituted by the video reels 151 to 155. The display window 150 is constituted by fifteen display blocks 28 of five columns and three rows. Each of the video reels 151 to 155 is therefore constituted by three display blocks 28. Each of the video reels 151 to 155 rearranges the symbols 501 in such a way that three display blocks 28 are moved (scrolled) downward while changing the speed and the vertically moved symbols 501 in the display blocks 28 are then stopped.

At the left and right edges of the display window 150, payline occurrence columns are provided in a symmetrical manner on the left and right. The left payline occurrence column on the left side when viewed from the player has, as shown in FIG. 19, 19 payline occurrence parts 65L (65La, 65Lb, 65Lc, 65Ld, 65Le, 65Lf, 65Lg, 65Lh, 65Li, 65Lj, 65Lk, 65Ll, 65Lm, 65Ln, 65Lo, 65Lp, 65Lq, 65Lr, and 65Ls).

The right payline occurrence column on the right side when viewed from the player has 19 payline occurrence parts 65R (65Ra, 65Rb, 65Rc, 65Rd, 65Re, 65Rf, 65Rg, 65Rh, 65Ri, 65Rj, 65Rk, 65Rl, 65Rm, 65Rn, 65Ro, 65Rp, 65Rq, 65Rr, and 65Rs).

The left payline occurrence parts 65L form pairs with the respective right payline occurrence parts 65R. From the left payline occurrence parts 65L to the right payline occurrence parts 65R paired with the left payline occurrence parts 65L, paylines L are defined in advance. Note that, although FIG. 19 only shows one payline L for the sake of simplicity, there are ten paylines L in the present embodiment.

A payline L is activated when left and right payline occurrence parts 65L and 65R are connected with each other. In other cases, the paylines are inactive. The number of activated paylines L is determined based on a bet amount. When the bet amount is maximum, i.e., MAXBET, the upper limit of, i.e. 10 paylines are activated. An activated payline L allows the symbols 501 to establish various types of winning combinations. Details of the winning combinations will be described later.

The present embodiment presupposes that the gaming terminal 10 is a so-called video slot machine. The gaming terminal 10 of the present invention, however, may use so-called mechanical reels as some of the video reels 151 to 155.

As shown in FIG. 20, one of code numbers 0 to 19 is assigned to each of the symbols 501 constituting each symbol column. Each symbol column is a combination of symbols 501 which are "specific symbol 510", "A", "Q", "J", "K", "Angelfish", "Clownfish", "Tuna", and "Coelacanth".

Three successive symbols 501 in each of the symbol columns are, as shown in FIG. 19, respectively displayed (arranged) on an upper stage, a central stage, and a lower stage of each of the display region of each of the video reels 151 to 155, to form a symbol matrix of five columns and three rows on the display windows 150. When at least the start button 23 is pressed or the lever 6100 is inclined to start a game, the symbols 501 forming a symbol matrix start scrolling. This scrolling of the symbols 501 stops (rearrangement) after a predetermined period elapses from the beginning of the scrolling.

Various kinds of winning combinations are set in advance for each symbol 501. The term "winning combination" indicates that a winning is established. A winning combination is a combination of stopped symbols 501 on the payline L which puts the player in an advantageous state. Examples of an advantageous state include: a state where coins according to a winning combination are paid out, a state where the number of coins to be paid out is added to a credit, a state where a bonus game is started.

A winning combinations in the present embodiment is established when a predetermined number or more of the symbols 501 of at least one type, namely "A", "Q", "BAT", "Angelfish", "Clownfish", "Tuna", or "Coelacanth", are rearranged on an activated payline L. When a predetermined type of symbols 501 is set as scatter symbols, a winning combination is established when a predetermined number or more of scattered symbols are rearranged, no matter whether a payline L is active.

For example, in a base game, when "BAT" symbols 501 forms a winning combination on a payline L, coins (values) calculated by multiplying the basic payout amount of "BAT" by the bet amount are paid out.

(Symbol Table)

FIG. 20 shows a symbol table which is used for determining which symbols 501 are targets of rearrangement in a base game. In the symbol table, symbols 501 on the display blocks 28 in each symbol column are associated with code numbers, and 20 numerical ranges defined by dividing a numerical range of 0 to 65535 by 20 are associated with the respective code numbers.

The numerical range of 0 to 65535 may be equally or unequally divided. When unequally divided, it is possible to adjust the probabilities of winning for the respective types of the symbols 501 by determining the ranges of the random numbers. In this regard, the range corresponding to the specific symbol 510 may be arranged to be narrower than the ranges of the other types of the symbols 501. In this case, results of games can be easily adjusted in accordance of the progress of the games, by arranging valuable types of the symbols 501 to be less likely to be rearranged.

For example, when a random number randomly selected for the first column is "10000", the symbol "J" having the code number 3 associated with the random number range including the selected random number is chosen as the target of rearrangement on the video reel 151 of the first column. On the other hand, when, for example, a random number for the fourth column is "40000", the specific symbol 510 having the code number 12 associated with the random number range including the selected random number is chosen as the target of rearrangement on the video reel 151 of the fourth column.

(Basic Game: Base Game Screen)

FIG. 19 shows an example of a base game screen which is a display screen in case of base game on the terminal image display panel 16.

More specifically, the base game screen has a display window 150 which is provided at the central portion and has five columns of video reels 151 to 155 and payline occurrence parts 65L and 65R which is symmetrically provided to the left and right of the display window 150. On the base game screen shown in FIG. 19, the video reels 151, 152, and 153 of the first to third columns are stopped whereas the video reels 154 and 155 of the fourth and fifth columns are scrolled.

At the upper parts of the terminal image display panel 16, the credit amount display unit 400 and a bet amount display unit 401 are provided on the left whereas a payout display unit 402 is provided on the right.

The credit amount display unit 400 displays credit amounts. The bet amount display unit 401 displays a bet amount on the currently-running unit game. The payout display unit 402 displays the number of coins to be paid out when a winning combination is established.

In the meanwhile, below the display window 150, a warning image display area 409, a help button 410, a pay-table button 411, and a unit-of-betting display unit 412 are provided. These sections 410, 411, and 412 are provided in this order from left to right for the player.

The help button 410 is pushed by the player so that a help mode is executed. The help mode is a mode for providing information to solve player's questions concerning games.

The pay-table button 411 is pushed by the player so that a payout display mode for displaying the details of a payout is executed. The payout display mode is a mode for displaying an explanation screen explaining a relation between a winning combination and a payout rate for the player.

The unit-of-betting display unit 412 displays a current bet unit (payout unit). The unit-of-betting display unit 412 therefore allows the player to recognize that, for example, the unit of betting is one cent.

Above the display window 150 is provided a payout rate display unit 403. The payout rate display unit 403 is displayed when the player is qualified to participate in a common game, and is not displayed when the player is not qualified. That is to say, when a common game starts, the player can participate in the common game if the payout rate display unit 403 is displayed. The payout rate display unit 403 displays a payout rate by which a unit payout amount obtained in a common game is multiplied.

Now, the payout rate indicating that the player is qualified will be described. A qualification is awarded to a gaming terminal 10 as a time during which the player is allowed to participate in a common game (i.e., common game qualification time), in response to betting on a base game. Regarding the awarded common game qualification time, a payout rate corresponding to each unit time (one second in the present embodiment) is determined in advance in the base game qualification time awarding table.

(Base Game Qualification Time Awarding Table)

FIG. 21 shows a base game qualification time awarding table which is referred to when a common game qualification time is awarded in a base game. The base game qualification time awarding table is stored in the RAM 243 of the center controller 200. In the base game qualification time awarding table, common game qualification times awarded in a base game and payout rates are determined for each of the numbers of paylines L activated in accordance with a bet amount.

For example, when the number of activated paylines L corresponding to the betting on a base game is one, six seconds are awarded as the common game qualification time. The payout rate is therefore one for six seconds of the common game qualification time. When the number of activated paylines L corresponding to the betting on a base game is five, eight seconds are awarded as the common game qualification time. The payout rate is one for one second, two for one second, three for one second, and four for one second of the common game qualification time, and is five for four seconds of the common game qualification time. As such, the number of activated paylines increases as the bet amount increases in a base game, and an awarded common game qualification time and a payout rate also increase. It is noted that the maximum payout rate in the present embodiment is ten.

(Common Game Qualification Time Management Table)

The common game qualification times of the respective gaming terminals 10 are managed by a common game qualification time management table which is temporarily stored in the RAM 243. FIG. 22 shows a common game qualification time management table which is updated when a common game qualification time is awarded. In the common game qualification time management table, an awarded common game qualification time and a payout rate are accumulatively stored for each gaming terminal 10.

For example, the common game qualification time of the gaming terminal 10a is six seconds for the payout rate of one, 12 seconds for the payout rate of two, 18 seconds for the payout rate of three, and six seconds for the payout rate of four. When the gaming terminal 10a with this arrangement participates in a common game and a unit payout amount is awarded, the payout is calculated by multiplying the unit payout amount by the highest payout rate, i.e. four. The payout rate display unit 403 of the gaming terminal 10a therefore displays "4×" which indicates that the payout rate is four.

It is noted that, the common game qualification time is decreased, by subtracting a unit time from the common game qualification time corresponding to the highest payout rate, each time a predetermined time (one second in the present embodiment) elapses. Therefore, when no common game qualification time is awarded to the gaming terminal 10a within the first six seconds corresponding to the payout rate of four, the maximum payout rate becomes three.

(Maximum Qualification Time Table)

In addition to the above, the upper limit of the common game qualification times that the gaming terminal 10 can accumulatively store is defined in the maximum qualification time table in advance. The maximum qualification time table is stored in the RAM 243 of the center controller 200. As shown in FIG. 23, in the maximum qualification time table, a payout rate N is associated with the upper limit XN of the accumulation of the common game qualification times of the payout rate N or higher.

More specifically, the upper limit of the accumulation is set for the payout rate of one. In other words, for any payout rate, the total sum of the common game qualification times is set to be 45 seconds or shorter. The upper limit is not limited to this. For example, the upper limit may be 60 seconds.

(Accumulation Calculation Table)

When a common game qualification time is awarded, with reference to the above-described maximum qualification time table, a calculation for updating the common game qualification time management table is carried out by using an accumulation calculation table. The accumulation calculation table is stored in the RAM 243 of the center controller 200. As shown in FIG. 24, the accumulation calculation table stores the following matters for each payout rate. When a common game qualification time is awarded, with reference to the above-described maximum qualification time table, a calculation for updating the common game qualification time management table is carried out by using an accumulation calculation table. The accumulation calculation table is stored in the RAM 243 of the center controller 200. As shown in FIG. 17, the accumulation calculation table stores the following matters for each payout rate. That is to say, "before-awarded common game qualification time" of the common game qualification time management table, "to-be-awarded common game qualification time" of the base game qualification time awarding table in accordance with an activated payline, "awarded common game qualification time" calculated by adding the before-awarded common game qualification time to the to-be-awarded common game qualification time, "accumulation YN of awarded common game qualification time" of a payout rate of N or higher, "accumulation upper limit XN of qualification times" of payout rate of N or higher set in the maximum qualification time table, "calculated accumulation YN", and new "common game qualification time ZN" used for updating the common game qualification time management table.

For example, when the before-awarded common game qualification time is 0 second for the payout rates of five or more, six seconds for the payout rate of four, 18 seconds for the payout rate of three, 12 seconds for the payout rate of two, and six seconds for the payout rate of one, and a bet is made so that the number of paylines L is three, in the common game qualification time one second is added to the time for the payout rate of four, 18 seconds are added to three, 12 seconds are added for two, and six seconds are added for one. In this case, the awarded common game qualification time is arranged so that seven seconds for the payout rate of four, 21 seconds for three, 14 seconds for two, and seven seconds for one. As a result, the accumulation YN of the qualification times of N or higher is as follows: seven seconds for the payout rate of four or higher, 28 seconds for three or higher, 42 seconds for two or higher, and 49 seconds for one or higher.

However, the maximum qualification time table defines the upper limits to be 42 seconds for the payout rate of four or higher, 43 seconds for three or higher, 44 seconds for two or higher, and 45 seconds for one or higher, and hence "49 seconds" which are for the payout rate of one or higher exceeds the upper limit XN. For this reason, the upper limit, i.e. 45 seconds are chosen as accumulated time for one or higher, and the difference, i.e. four seconds, is added to the accumulated time for two. As a result, the accumulated time for two becomes 46 seconds, the upper limit, i.e. 44 seconds is chosen as accumulated time for two and the difference, i.e. two seconds, is added to the accumulated time for three. As a result, the accumulated time for three becomes 30 seconds. This time is shorter than the upper limit for three, i.e. 43 seconds, and hence the accumulated time for three is determined to be 30 seconds. Furthermore, the accumulated time for four is seven seconds. Since this is shorter than the upper limit for four, i.e. 42 seconds, the accumulated time for four is determined to be seven seconds. In summary, when YN is higher than XN, calculations of YN=XN and YN+1=YN+1+YN−XN are repeated from the lowest payout rate.

Then the common game qualification time ZN is calculated from YN−YN+1, and the common game qualification time management table is updated with the result of this calculation.

With such accumulation calculations, it is possible to keep the accumulation of the multiplication of the common game qualification time by the payout rate is unchanged before and after the accumulation calculations.

(Basic Game: Bonus Game Screen)

Figure 25:
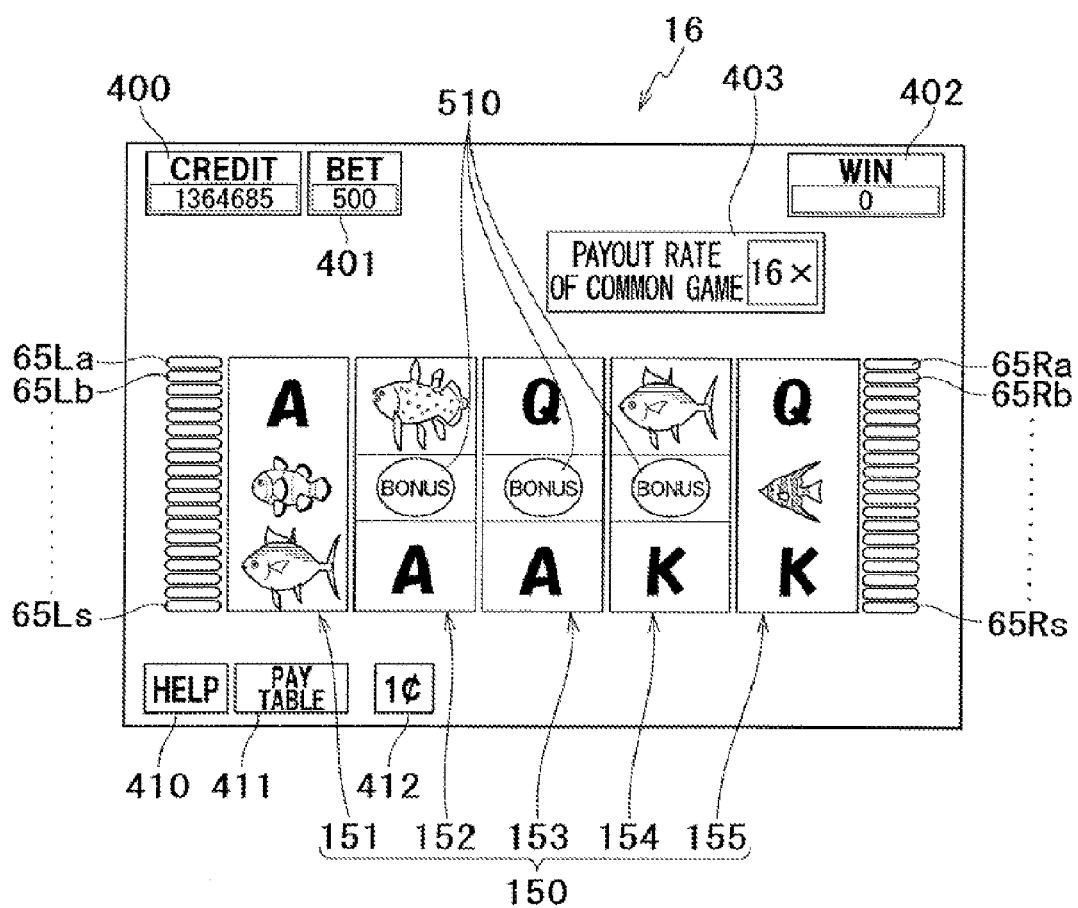
FIG. 25 shows an example of a display screen of a base game.

FIG. 25 shows an example of a base game screen on the terminal image display panel 16, at the time when the start of an independent special game which is a bonus game is determined. In the base game screen shown in FIG. 25, all of the video reels 151 to 155 in the first to fifth columns are stopped, and three symbols 501 of "specific symbol 510" are stopped at the central stages of the video reels 152 to 154 of the second to fourth columns. This triggers the start of an independent special game which is independently run by the gaming terminal 10. The stop mode of the specific symbols 510 triggering an independent special game is not limited to this. The trigger may be a predetermined number or more of "specific symbols 510" on one of the paylines L. Furthermore, such triggering does not necessarily need the "specific symbols 510" to be stopped on a payline. For example, a game may be triggered on condition that a predetermined number or more of specific symbols 510 are provided on any display blocks 28, based on the scatter symbol method.

Figure 26:
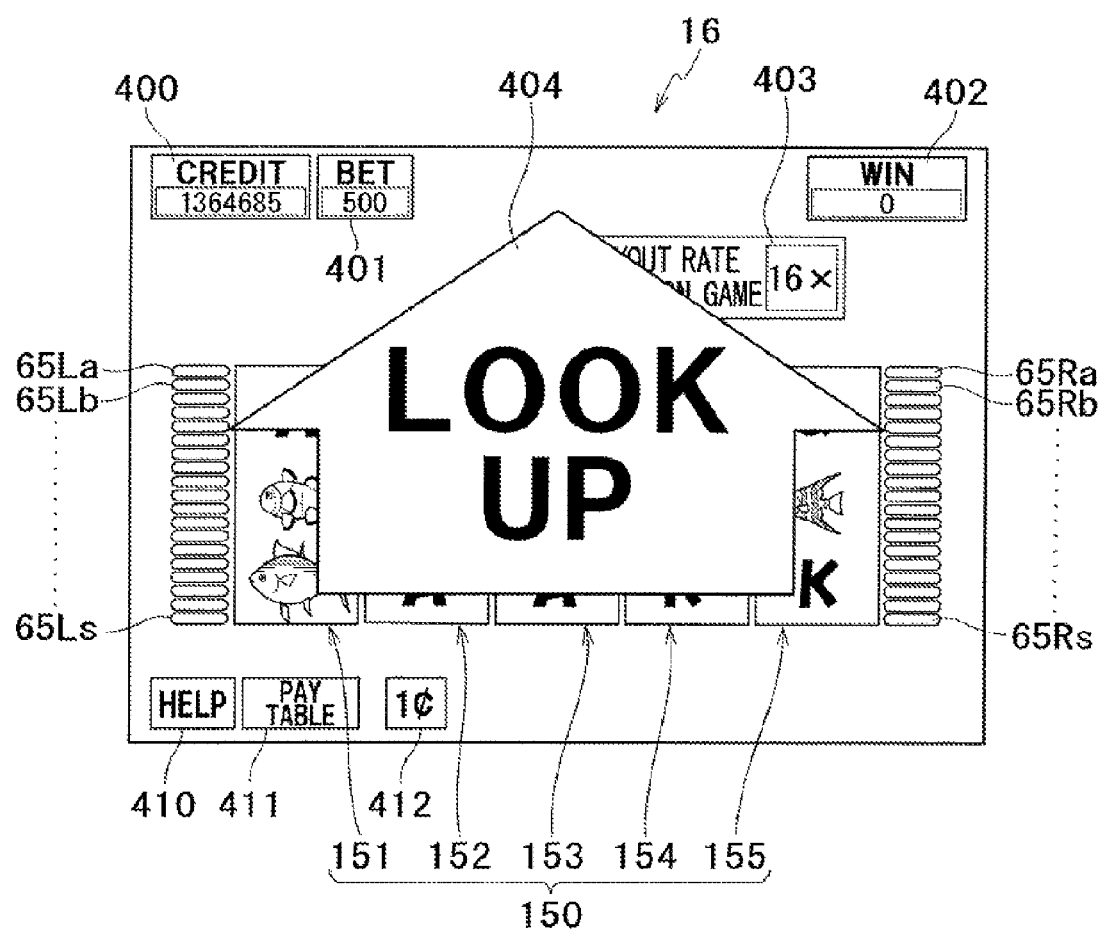
FIG. 26 illustrates a display state of a terminal image display panel and an upper display.

FIG. 26 illustrates the display states on the terminal image display panel 16 during the independent special game. During the independent special game, the terminal image display panel 16 displays a lookup display unit 404. As shown in FIG. 26, the lookup display unit 404 is displayed at the central part of the terminal image display panel 16, notifying the player that the terminal image display panel 16 is not used in the independent special game and the player is instructed to see the upper display 700.

In the present embodiment, the common game qualification time is awarded as soon as the independent special game is started. The common game qualification time awarded at the start of the independent special game is different from those defined in the base game qualification time awarding table (FIG. 21), and the table used in this case is an independent special game qualification time awarding table shown in FIG. 27. According to the independent special game qualification time awarding table, the common game qualification time to be awarded is shortened but the payout rate is increased, as the number of activated paylines L is increased.

Figure 28:
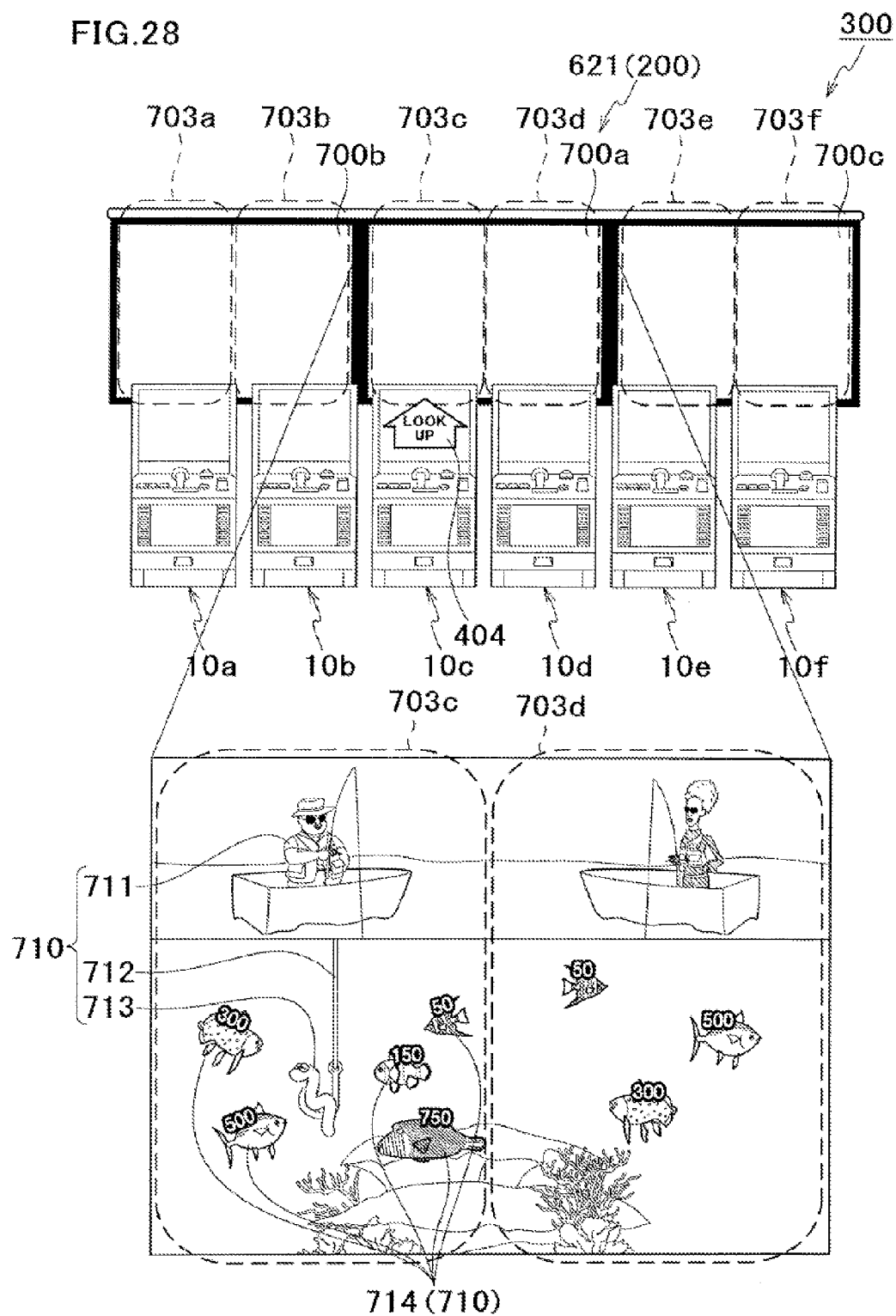
FIG. 28 illustrates a display state on the upper display during an independent special game.

FIG. 28 illustrates a display state on the upper display 700 during an independent special game. The upper display 700 constituted by the three upper displays 700a, 700b, and 700c is arranged to display a single common effect display screen. The common effect display screen is constituted by gaming terminal areas 703a to 703f corresponding to the six gaming terminals 10a to 10f, respectively.

In FIG. 28, the gaming terminal 10c is running an independent special game, and the terminal image display panel 16 of the gaming terminal 10c is displaying the lookup display unit 404. In the independent special game, the gaming terminal area 703c corresponding to the gaming terminal 10c displays an individual image 710 for the independent special game.

More specifically, the individual image 710 includes a fisherman image 711, a fishhook image 712, a fishing bait image 713, and fish images 714. The fisherman image 711 is displayed at an upper part of each of the gaming terminal areas 703a to 703f. The fisherman image 711 is different in each gaming terminal 10, to make it possible to understand how the gaming terminals 10 correspond to the respective gaming terminal areas 703a to 703 on the common effect display screen.

The fishhook image 712 is displayed substantially at the center of each of the gaming terminal areas 703a to 703f running an independent special game. The fishhook image 712 is displayed with a display pattern in accordance with the movement of the lever 6100. The fishing bait image 713 is displayed at the lower end portion of the fishhook image 712. The fishing bait image 713 is enlarged when a bonus corresponding to a predetermined unit payout amount (3000 in the present embodiment) or higher is won in the independent special game.

Each fish image 714 corresponds to a bonus awarded in a bonus game. The fish image 714 indicates, by the size of the fish, a unit payout amount in a bonus game, and also the unit payout amount is indicated by a number. In the gaming terminal area 703 in which an independent special game is run, a plurality of fish images 714 are displayed and these fish images 714 approach the fishing bait image 713 or swim beside the fishing bait image 713.

(Bonus Type Table)

Now, referring to a bonus type table shown in FIG. 29, bonuses corresponding to the fish images 714 will be described. The bonus type table stores bonus types, unit payout amounts, and ranks in association with one another. It is noted that the bonus type table is stored in both the RAM 43 of the gaming terminal 10 and the RAM 243 of the center controller 200.

For example, "Blue Marlin" corresponds to the unit payout amount of 10000 and is ranked at number one. Therefore, when the Blue Marlin is displayed on the gaming terminal area 703 as a fish image 714, the number "10000" is displayed with the fish image. Furthermore, since the unit payout amount is not lower than the predetermined amount (3000), the fishing bait image 713 is enlarged when the Blue Marlin is won.

(Independent Special Game Probability Table)

The payout amount of the independent special game is determined based on an independent special game probability table shown in FIG. 30. Though not illustrated, plural types of independent special game probability tables are stored, and which table is used is determined based on the number of paylines L activated at the start of the independent special game. In the independent special game probability table, random number ranges defined by dividing the numerical range of 0 to 65535 are associated with winning bonus types. In the winning bonus type field, at least one bonus is stored. For example, when a random number is 250, the winning bonus types to be awarded are Wahoo, Black Sea Bass, and Halibut, and payouts corresponding to all of these are to be awarded.

Figure 31:
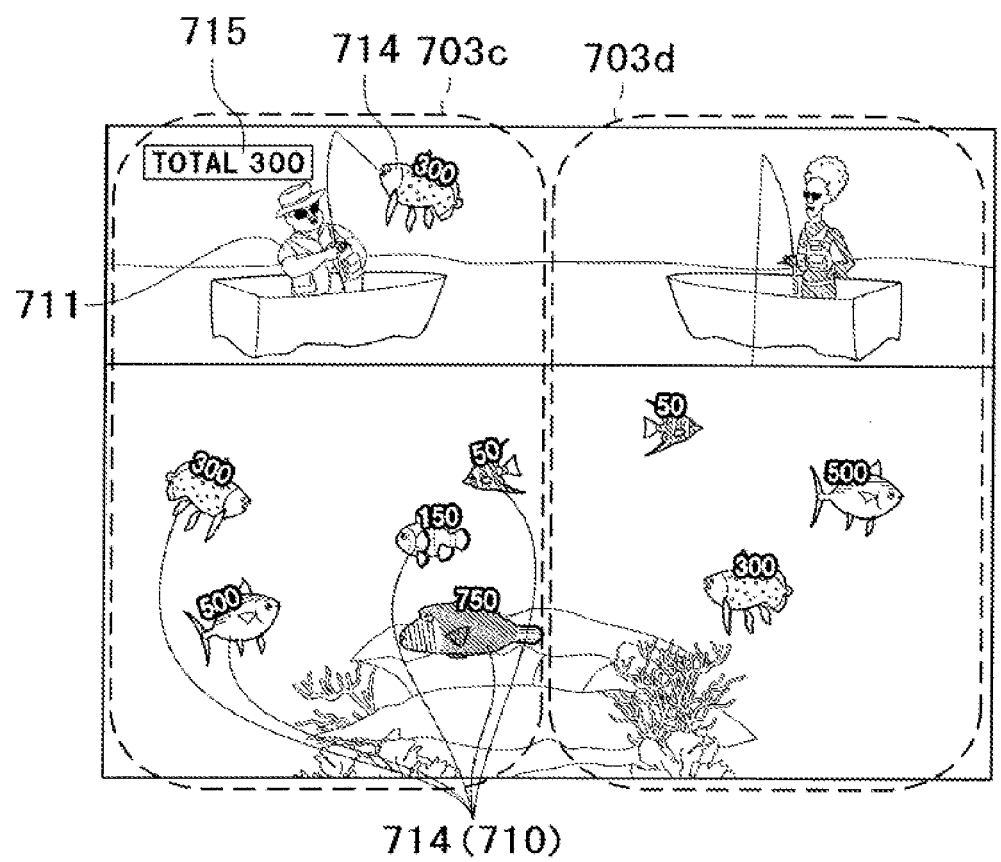
FIG. 31 shows an example of a display screen of an independent special game.

FIG. 31 shows an example of a winning screen displayed in an independent special game. On the winning screen, a display pattern in which a fisherman image 711 catches a fish image 714 is displayed. On the winning screen, moreover, a total display unit 715 is displayed at an upper part of the gaming terminal area 703. The total display unit 715 displays a total sum of bonuses having been won. The number displayed on the total display unit 715 in the end is the total amount of bonuses to be awarded. It is noted that the caught fish images 714 are displayed with sizes corresponding to the ranks defined in the bonus type table shown in FIG. 29. More specifically, a bonus type having a high rank is associated with a large unit payout amount, and the size of the caught fish image 714 corresponding thereto is large.

In addition to the above, a mystery bonus is executed as a bonus game. The mystery bonus is not generated on condition that a predetermined number or more of specific symbols 510 are stopped as in the independent special game. The mystery bonus randomly starts when the specific symbol 510 is not stopped at the video reel 153 of the third column.

The random determination of the start of the mystery bonus is conducted based on a mystery bonus start random determination table shown in FIG. 32. In the mystery bonus start random determination table, random number ranges corresponding to "occurrence of mystery bonus", "effect only", and "non-occurrence of mystery bonus" are determined for each number of activated paylines L.

For example, when the number of paylines L is three and the determined random number is "2", an effect of mystery bonus is conducted and the mystery bonus is awarded as a payout. When the number of paylines L is three and the determined random number is "5", only an effect of mystery bonus is conducted. When the number of paylines L is three and the determined random number is "15", nothing is conducted and the base game is continued.

When the mystery bonus occurs, a bonus to be won is determined with reference to a mystery bonus probability table shown in FIG. 33. Though not illustrated, plural types of mystery bonus probability tables are stored, and the table to be used is determined in accordance with the number of paylines L activated when the mystery bonus starts. In the mystery bonus probability table, random number ranges defined by dividing a numerical range of 0 to 5000 are associated with winning bonus types. In the winning bonus type field, one bonus is stored.

Whether the mystery bonus is started is determined with reference to the mystery bonus start random determination table and "occurrence" or "only effect" is selected, a mystery bonus effect screen shown in FIG. 27 is displayed. On the mystery bonus effect screen, a ground bait image 716 falling from an upper part to a lower part is displayed in the gaming terminal area 703 corresponding to the gaming terminal 10 which has been selected to display an effect screen. At the same time, in a similar manner as the independent special game, the terminal image display panel 16 displays the lookup display unit 404 shown in FIG. 26. Thereafter, if "occurrence" has been selected, a winning screen shown in FIG. 31 is displayed and the mystery bonus is finished.

Note that, when the condition to start a common game is established while the above-described independent special game and mystery bonus are being executed, the common game starts after the effect display, awarding of payout or the like of the independent special game and the mystery bonus is finished.

(Common Game)

Now, a common game run by a plurality of gaming terminals 10 in synchronization with one another will be described. In regard to a common game, random determination as to whether to start a common game is conducted at predetermined intervals (every one second in the present embodiment), with reference to a common game start random determination table shown in FIG. 35.

(Common Game Start Random Determination Table)

As shown in FIG. 35, the common game start random determination table defines random number ranges corresponding to "occurrence of common game", "effect only", and "non-occurrence of common game", respectively. For example, when the determined random number is "1", a common game starts after an effect of the start of the common game is executed. When the determined random number is "3", only the effect of the start of the common game is executed. When the determined random number is "15", nothing is carried out and the base game is continued.

When the common game starts, which one of common games is to be run is determined with reference to a common game type random determination table shown in FIG. 36. More specifically, one of the following common games is randomly selected: a first common game; a second common game; a third common game; the first common game+the third common game; and the second common game+the third common game.

(Common Game: Common Game Start Effect Image)

Figure 37:
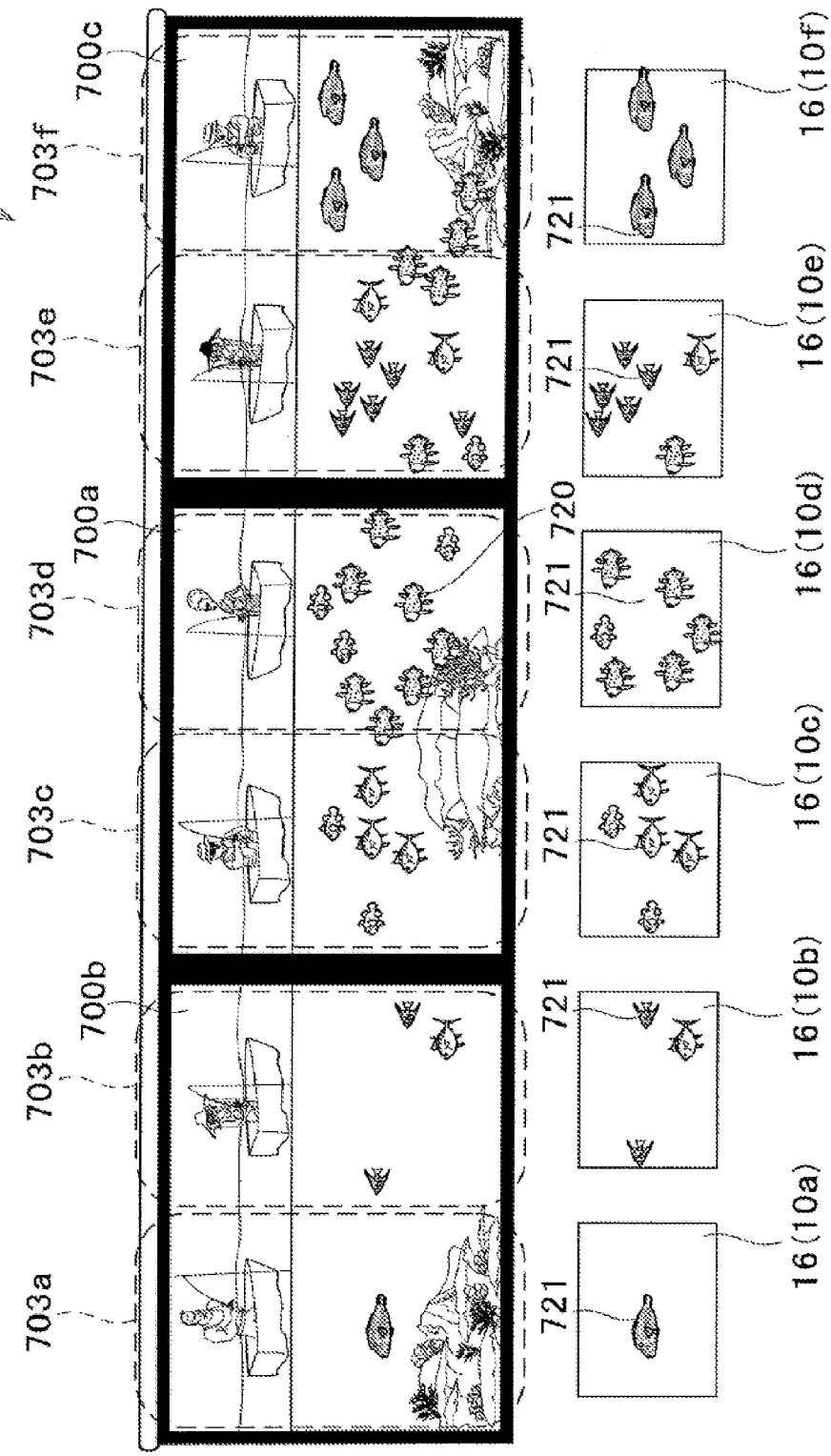
FIG. 37 illustrates an example of a common game start effect image.

After which one of the common games is to be run is determined, a common game start effect image corresponding to that common game is displayed. The common game start effect image is stored in the RAM 243 of the center controller 200. As shown in FIG. 37, the same common game start effect image is displayed on the upper display 700 and the terminal image display panel 16 of each of the six gaming terminals 10.

FIG. 37 shows the display states on the upper display 700 and the terminal image display panel 16 when the first common game starts. More specifically, the upper display 700 displays a game start effect image in which a fish school image 721 showing many fishes of plural types passing from left to right is displayed. Furthermore, a fish school image 721 identical with that displayed on the corresponding one of the gaming terminal areas 703a to 703f of the upper display 700 is displayed on the terminal image display panel 16 of each of the gaming terminals 10a to 10f.

For example, the game start effect image is divided to sets of data corresponding to the six gaming terminal areas 703, respectively. The center controller 200 distributes these sets of data to the respective gaming terminals 10, thereby allowing the upper display 700 and the terminal image display panels 16 to display the game start effect image in the same manner.

(Common Game: First Common Game Screen)

Figure 38:
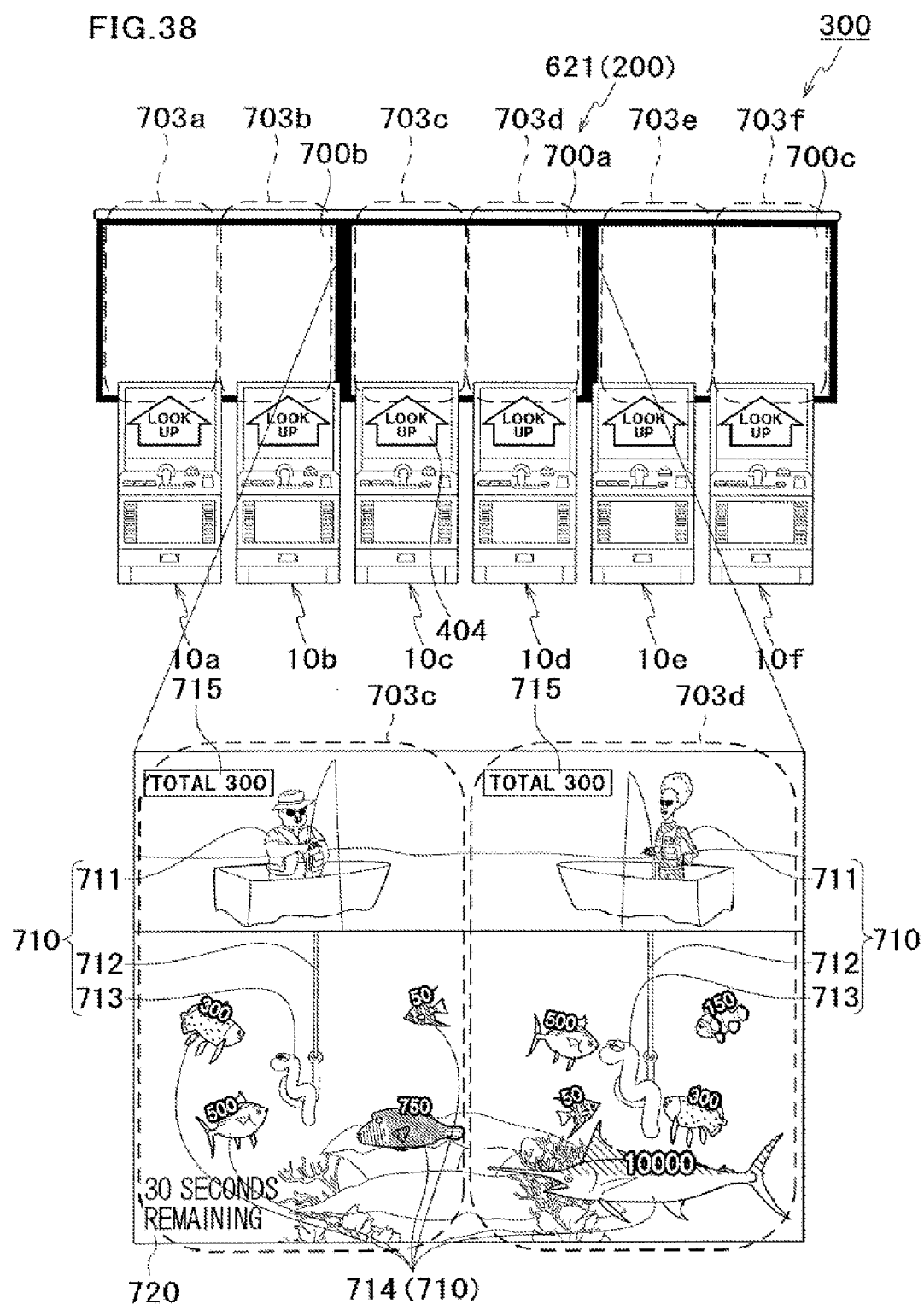
FIG. 38 shows an example of a display screen of a first common game.

Now, each common game will be described. FIG. 38 illustrates the display state on the upper display 700 during the first common game. The upper display 700 constituted by the three upper displays 700a, 700b, and 700c displays a single common effect display screen. The common effect display screen is constituted by the gaming terminal areas 703a to 703f corresponding to the six gaming terminals 10a to 10f, respectively.

In FIG. 38, all gaming terminals 10 are running the common game, and the terminal image display panels 16 of all gaming terminals 10 display the lookup display unit 404. In the first common game, the gaming terminal area 703 corresponding to each gaming terminal 10 participating in the first common game presents display in a similar manner as the individual image 710 for the independent special game. More specifically, the gaming terminal area 703 corresponding to each gaming terminal 10 participating in the common game displays an individual image 710 including a fisherman image 711, a fishhook image 712, a fishing bait image 713, a fish image 714, and a total display unit 715.

The fishing bait image 713 is enlarged when a bonus corresponding to a predetermined unit payout amount (3000 in the present embodiment) or higher is won in a first common game, as in the independent special game. For example, in FIG. 38, the bait image 713 in the gaming terminal area 703d is enlarged because the gaming terminal 10d has won a unit payout amount of 10000.

The first common game screen further displays a count display unit 720. This count display unit 720 displays a remaining time of the first common game. When the time indicated by the count display unit 720 reaches 0, a payout calculated by multiplying the payout amount shown in the total display unit 715 by the payout rate at the start of the first common game is awarded.

Figure 39:
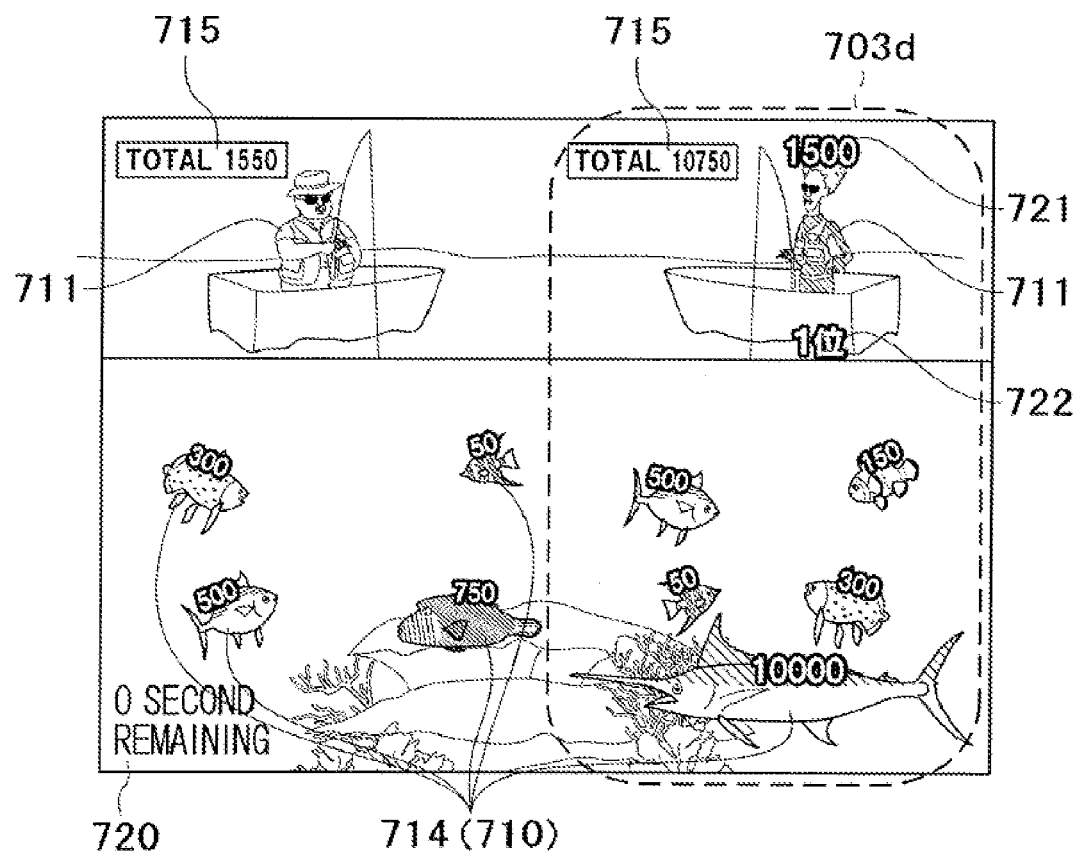
FIG. 39 shows an example of a display screen of a first common game.

When the time indicated by the count display unit 720 reaches 0, furthermore, the rank of the gaming terminal 10 is determined based on the sum total of the unit payout amounts of the awarded bonuses. The first to third ranks are determined in the present embodiment, and a payout corresponding to the rank is awarded to each of the first-ranked, second-ranked, and third-ranked gaming terminals 10. FIG. 39 displays a first common game ranking determination screen in which the gaming terminal 10d is ranked first as having the total unit payout amounts of 10750. In the first common game ranking determination screen, a ranking image 722 indicating the rank is displayed below the fisherman image 711, whereas a payout amount image 721 indicating the payout corresponding to the rank is displayed above the fisherman image 711.

(First Common Game Probability Table)

The determination of the payout amount of the first common game is carried out with reference to a first common game probability table shown in FIG. 40. Though not illustrated, a plurality of first common game probability tables are stored, and the number thereof is arranged to be identical with the number of gaming terminals 10. A different first common game probability table is associated with each gaming terminal 10. In the first common game probability table, random number ranges defined by dividing a numerical range of 0 to 65535 are associated with winning bonus types. A winning bonus type field stores three or more bonuses. For example, when the determined random number is 30, the winning bonus type is the combination of Yellow Fin Tuna, Wahoo, Halibut, and Halibut, and bonuses corresponding to all of these are awarded.

The winning screen of the first common game is identical with the winning screen displayed on the gaming terminal area 703c shown in FIG. 31 and is displayed on the gaming terminal area 703 corresponding to each gaming terminal 10 participating in the first common game. That is to say, when a random number selected is 30 and the first common game probability table shown in FIG. 39 is used, winning screens of catching a Yellow Fin Tuna, a Wahoo, a Halibut, and a Halibut are serially displayed.

(Common Game: Second Common Game Screen)

Figure 41:
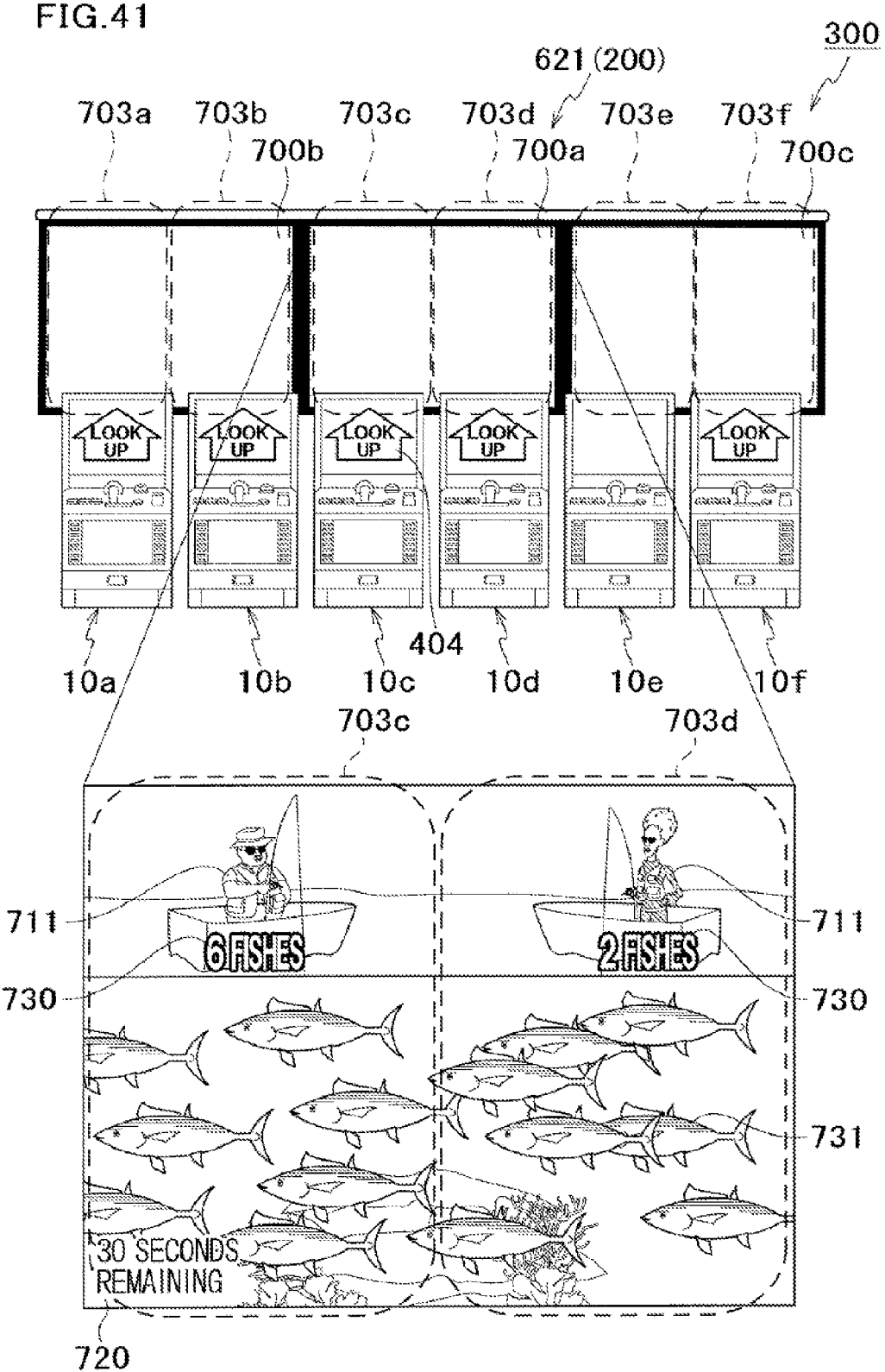
FIG. 41 shows an example of a display screen of a second common game.

FIG. 41 illustrates the display state on the upper display 700 during the second common game. In FIG. 41, the gaming terminals 10 except the gaming terminal 10e are running the common game, and the terminal image display panels 16 of the gaming terminals 10 except that of the gaming terminal 10e display the lookup display unit 404. In the second common game, a fisherman image 711 and a count display unit 720 similar to those in the first common game are displayed, and also a fish school image 731 is displayed on the gaming terminal area 703 corresponding to all the gaming terminals 10.

Figure 42:
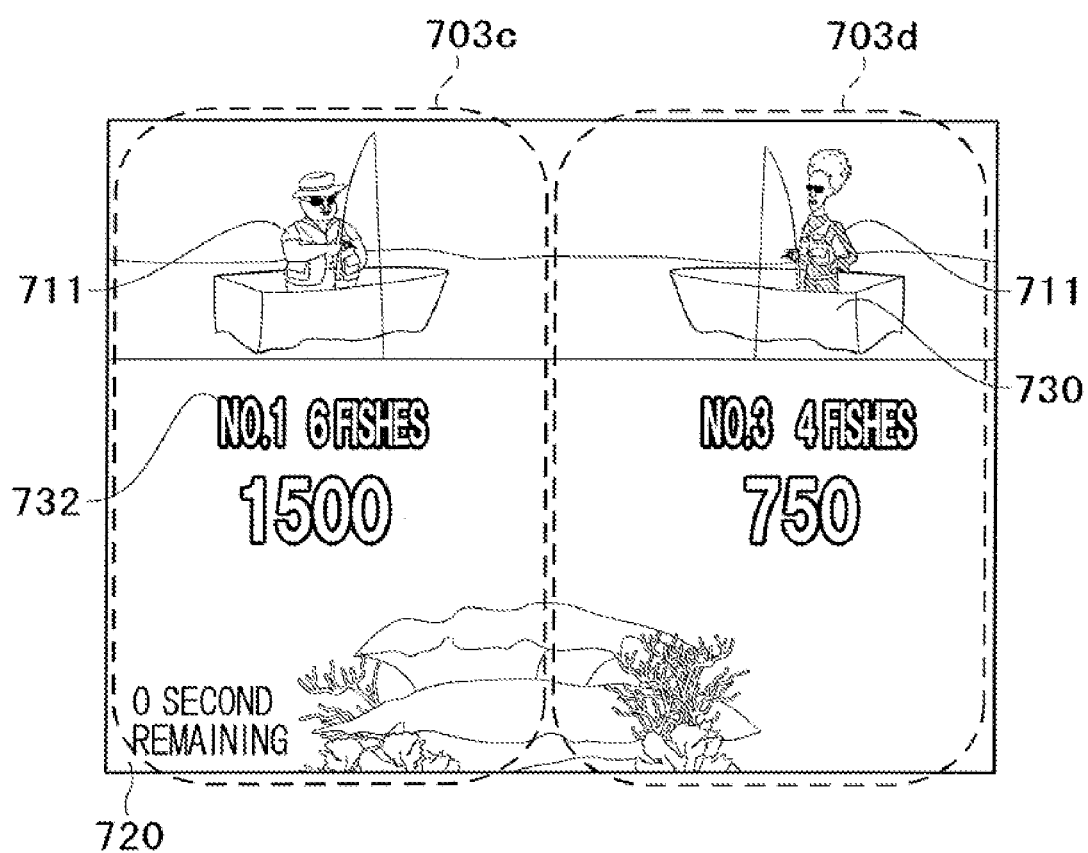
FIG. 42 shows an example of a display screen of a second common game.

When the time indicated by the count display unit 720 reaches 0, furthermore, the rank of the gaming terminal 10 is determined based on the sum total of the awarded winnings. In the second common game, the center controller 200 conducts winning determination with a predetermined winning probability for a predetermined number of times for each gaming terminal 10, and the number of these winnings is determined as the number of obtained winnings. In the present embodiment, terminals ranked first to third are determined. For the first-ranked to third-ranked gaming terminals 10, a payout is awarded according to the rank. FIG. 42 shows a second common game ranking determination screen. In the case of FIG. 35, the gaming terminal 10c is ranked first with six winnings in total. The gaming terminal 10d is ranked third with four winnings in total. On the second common game ranking determination screen, a ranking image 732 indicating the rank, the number of obtained winnings, and an obtained payout amount is displayed below the fisherman image 711.

(Common Game: Third Common Game Screen)

Figure 43:
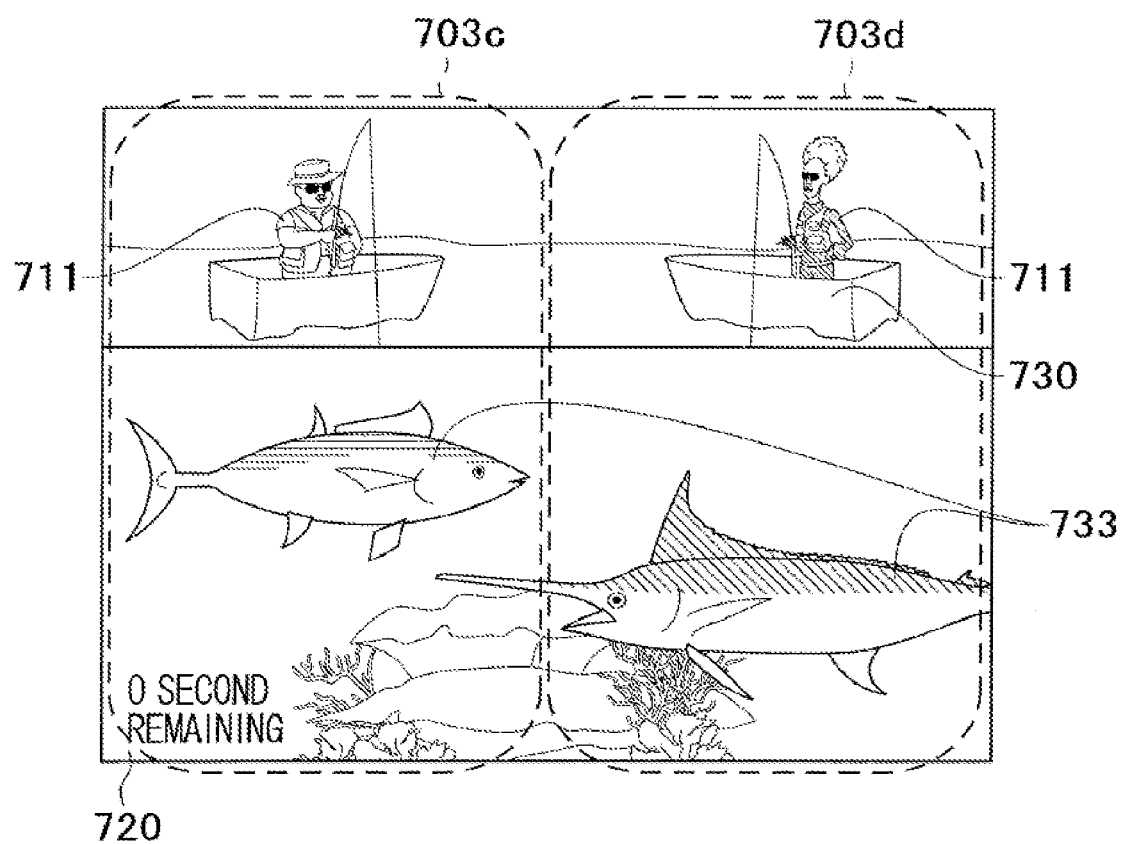
FIG. 43 shows an example of a display screen of a third common game.

When the third common game is run after the first common game or the second common game, a third common game start effect screen shown in FIG. 43 is displayed. As shown in FIG. 43, the third common game start effect screen displays a large fish image 733. Thereafter, the third common game starts.

Figure 44:
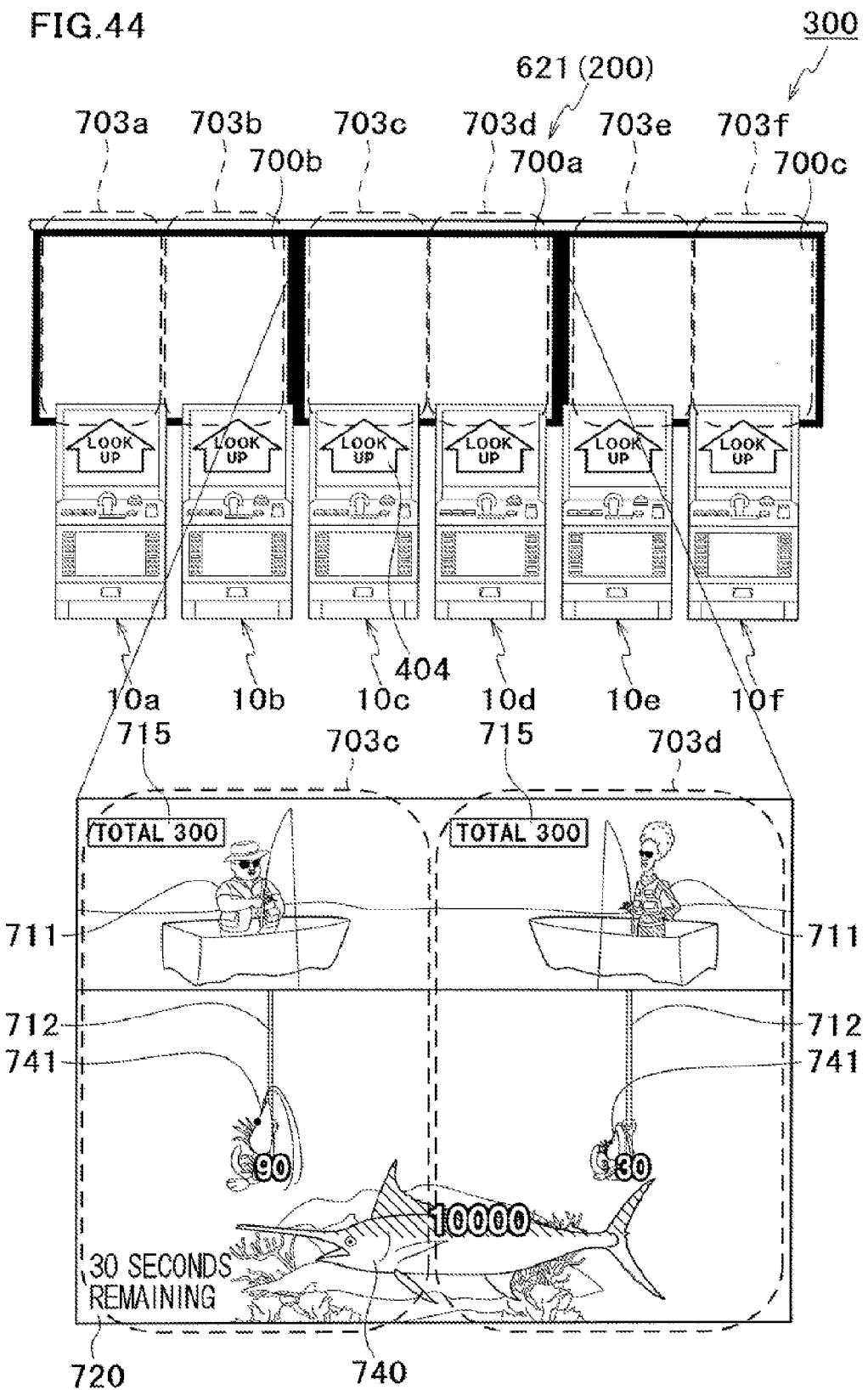
FIG. 44 shows an example of a display screen of a third common game.

FIG. 44 illustrates the display state on the upper display 700 during the third common game. In FIG. 44, all gaming terminals 10 are running the common game, and the terminal image display panels 16 of all gaming terminals display the lookup display unit 404. In the third common game, the gaming terminal area 703 corresponding to each gaming terminal 10 participating in the third common game presents display in a similar manner as the individual image 710 for the independent special game. More specifically, the gaming terminal area 703 corresponding to each gaming terminal 10 participating in the common game displays an individual image 710 including a fisherman image 711, a fishhook image 712, a large fish image 740, a prawn image 741, and a total display unit 715.

The prawn image 741 is displayed instead of the fishing bait image 713 of the first common game, and has a numerical value image corresponding to the size of the prawn image 741. In the present embodiment, the prawn image 741 is associated with one of the numerical values of "90", "60", and "30". When no winning is obtained in the third common game, a unit payout amount to be awarded is equal to the numerical value shown on the prawn image 741.

Furthermore, in the third common game is displayed the large fish image 740. The number of the large fish images 740 displayed in all the gaming terminal areas 703 is smaller than the number of the gaming terminals 10. In the gaming terminal area 703 corresponding to each gaming terminal 10 having obtained a winning, a winning image shown in FIG. 31 is displayed.

(Third Common Game Probability Table)

The determination of the payout amount of the third common game is carried out with reference to a third common game probability table shown in FIG. 45. Though not illustrated, a plurality of third common game probability tables are stored, and the number thereof is arranged to be identical with the number of gaming terminals 10. A different third common game probability table is associated with each gaming terminal 10. In the third common game probability table, random number ranges defined by dividing a numerical range of 0 to 65535 are associated with winning bonus types. In the winning bonus type field, one bonus is stored. For example, when the determined random number is 10, the winning bonus type to be awarded is Blue Marlin. However, when a bonus that a gaming terminal 10 wins has already been awarded to another gaming terminal 10, no payout is awarded even if the terminal wins the bonus.

As described above, when the third common game is run after the first common game or the second common game, i.e., when the first common game or the second common game evolves into the third common game, bonus payouts of the both games are obtainable.

(Cooperation of Control Lever Device 600 and Individual Image 710)

In the bonus game and common games above, the movement pattern of the lever 6100 of the control lever device 600 and the display pattern of the individual image 710 are cooperated with each other. The movement pattern of the lever 6100 is stored in a movement pattern table which is in the RAM 43 of the gaming terminal 10. In the meanwhile, the display pattern of the individual image 710 is stored in a display pattern table which is in the RAM 243 of the center controller 200. As shown in FIG. 46 and FIG. 47, a movement pattern and a display pattern are associated with a single set of identification information. As a set of identification information is selected in accordance with the situation, the lever 6100 is moved based on the movement pattern associated with the selected set of identification information and the individual image 710 is displayed based on the display pattern associated with the selected set of identification information.

(Operation of Gaming Machine 300: Boot Process)

The following describes a boot process routine which takes place in the gaming machine 300. Upon powering on the gaming machine 300, a boot process routine illustrated in FIG. 48 starts in: the motherboard 240 and gaming board 260 in the center controller 200, and in the motherboard 40 and the gaming board 50 in the terminal controller 630. The memory cards 53 and 263 are assumed to be inserted into the card slots 53S and 263S of the gaming boards 50 and 260, respectively. Further, the GAL 54 and 264 are assumed to be attached to the IC socket 54S and 264S, respectively.

First, turning on the power switch of (powering on) the power supply units 45 and 245 boots the motherboards 40 and 240, and the gaming boards 50 and 260. Booting the motherboards 40 and 240 and the gaming boards 50 and 260 starts separate processes in parallel. Specifically, in the gaming boards 50 and 260, the CPUs 51 and 261 read out preliminary authentication programs stored in the boot ROMs 52 and 262, respectively. Then, preliminary authentication is performed according to the read out programs so as to confirm and verify that no falsification is made to authentication programs, before reading them in the motherboards 40 and 240, respectively (S21). Meanwhile, the main CPUs 41 and 241 of the motherboards 40 and 240 run BIOS stored in the ROMs 42 and 242 to load into the RAMs 43 and 243 compressed data built in the BIOS, respectively (S22). Then, the main CPUs 41 and 241 run a procedure of the BIOS according to the data loaded into the RAMs 43 and 243 so as to diagnose and initialize various peripheral devices (S23).

The main CPUs 41 and 241, which are respectively connected to the ROMs 55 and 265 of the gaming boards 50 and 260 via PCI buses, read out authentication programs stored in the ROMs 55 and 265 and stores them in the RAMs 43 and 243 (S24). During this step, the main CPUs 41 and 241 each derives a checksum through ADDSUM method (a standard check function) which is adopted in a standard BIOS, and store the authentication programs into RAMs 43 and 243 while confirming if the operation of storing is carried out without an error.

Next, the main CPUs 41 and 241 each checks what connects to the IDE bus. Then, the main CPUs 41 and 241 access, via the IDE buses, to the memory cards 53 and 263 inserted into the card slots 53S and 263S, and read out game programs and game system programs from the memory cards 53 and 263, respectively. In this case, the main CPUs 41 and 241 each reads out four bytes of data constituting the game program and the game system program at one time. Next, the main CPUs 41 and 241 authenticate the game program and the game system program read out to confirm and verify that these programs are not falsified, using the authentication program stored in RAMs 43 and 243 (S25).

When the authentication properly ends, the main CPUs 41 and 241 write and store the authenticated game programs and game system programs in RAMs 43 and 243 (S26).

Next, the main CPUs 41 and 241 access, via the PCI buses, to the GALs 54 and 264 attached to the IC sockets 54S and 264S, and read out payout ratio setting data from the GALs 54 and 264, respectively. The payout ratio setting data read out is then written and stored in the RAMs 43 and 243 (S27).

Next, the main CPUs 41 and 241 read out, via the PCI buses, country identification information stored in the ROMs 55 and 265 of the gaming boards 50 and 260, respectively. The country identification information read out is then stored in the RAMs 43 and 243 (S28).

Figure 49:
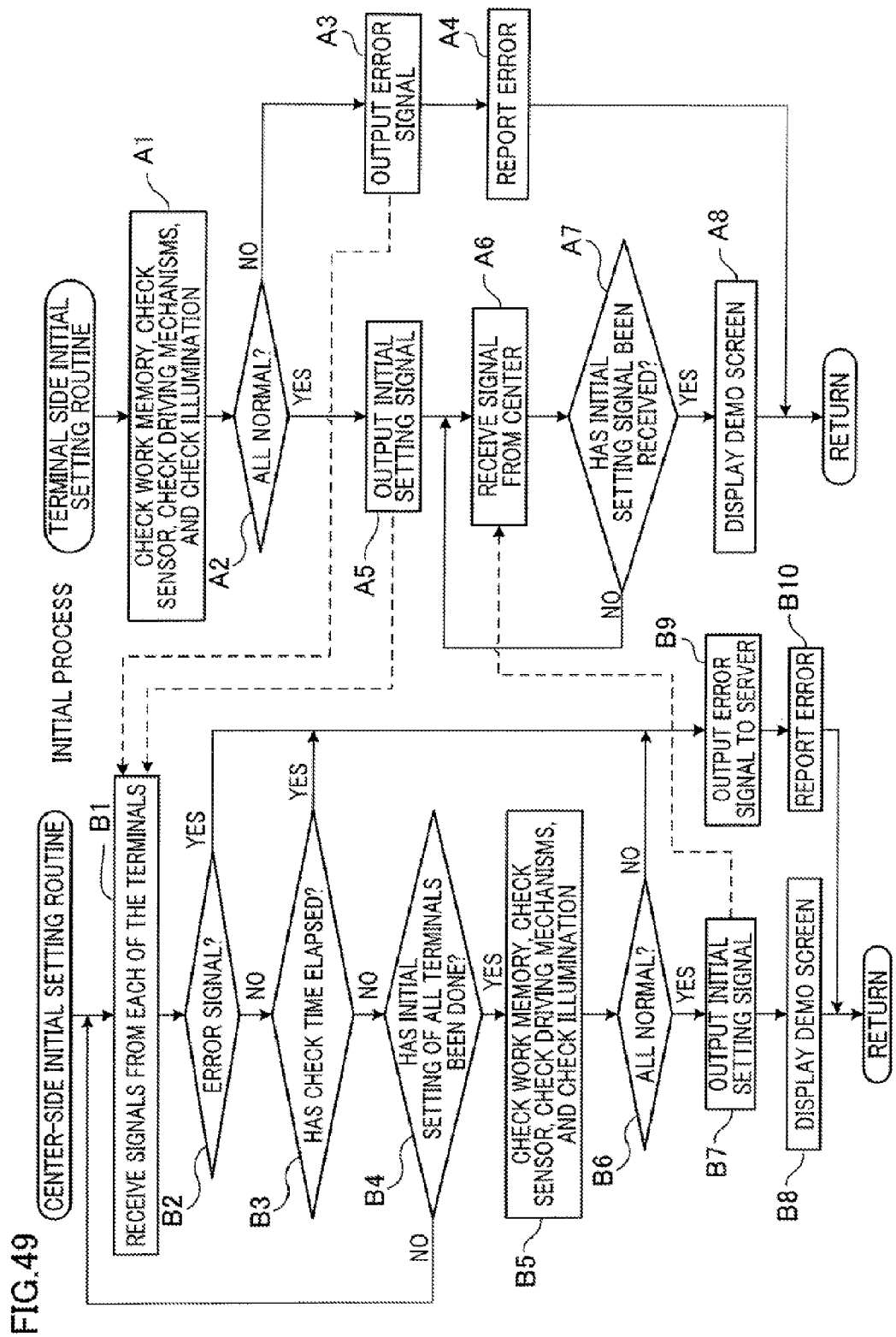
FIG. 49 is a flowchart of an initial process.

After this, the main CPUs 41 and 241 each perform an initial process of FIG. 49.

(Operation of Gaming Machine 300: Initial Process)

Figure 48:
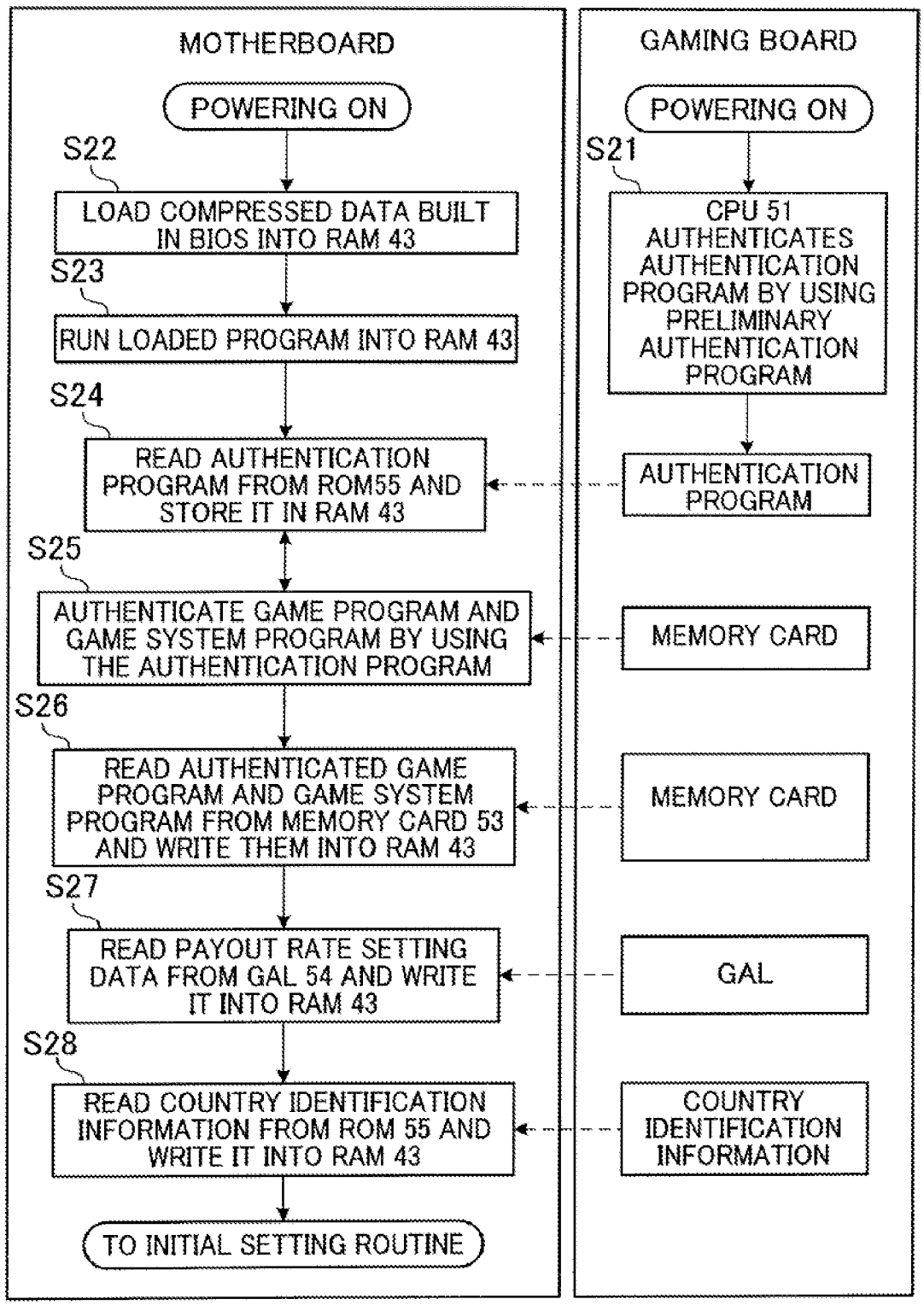
FIG. 48 is a flowchart of a boot process.

The following describes an initial process which takes place in the gaming machine 300. When the boot process of FIG. 48 is completed, the center controller 200 reads out from the RAM 243 a center-side initial setting routine shown in FIG. 49 and executes the routine. Meanwhile, when the boot process of FIG. 48 is completed, the gaming terminal 10 reads out from the RAM 43 a terminal side initial setting routine shown in FIG. 49 and executes the routine. The center-side and terminal side initial setting routines are executed in parallel.

First, the main CPU 41 of each of the gaming terminals 10 checks operations of work memories such as the RAM 43, various sensors, various driving mechanisms, and various decorative illuminations (A1). For example, to check the operation of the driving mechanism, a process is executed such that the lever 6100 is rotated from the start position to the end position while the magnetic force values at the respective positions are detected, and then the inclination angle table in the RAM 43 is initialized. Details of the initialization of the inclination angle table will be described later. Then, the main CPU 41 determines whether all the check results are normal (A2). If the main CPU 41 determines that the check results contains an error (A2: NO), the main CPU 41 outputs a signal notifying the error (hereinafter, error signal) to the center controller 200 (A3). Further, the main CPU 41 reports the error in the form of illuminating the lamp 30 or the like (A4), and then ends the routine.

On the other hand in A2, if the main CPU 41 determines that all the check results are normal (A2: YES), an initial setting signal is output to the center controller 200 (A5). Then, the supply of an initial setting signal from the center controller 200 is waited for (A6, A7: NO).

The main CPU 241 of the center controller 200 receives signals from each of the terminals (B1). Then, the main CPU 241 determines whether a signal received is an error signal (B2). If the main CPU 241 determines that the signal is an error signal (B2: YES), the main CPU 241 outputs the error signal to a server of an unillustrated host computer or the like (B9) to report the error (B10), and ends the routine.

On the other hand in B2, if the main CPU 241 determines that the signal is not an error signal (B2: NO), the main CPU 241 determines whether a predetermined time (check time) has elapsed from the time of powering on (B3). If the main CPU 241 determines that the check time has elapsed (B3: YES), B9 is executed. On the other hand, if the main CPU 241 determines that the check time has not yet elapsed (B3: NO), it is determined whether an initial setting signal is received from each of the gaming terminals 10 (B4). If the main CPU 241 determines that an initial setting signal from any one of the gaming terminals 10 is not received (B4: NO), the process returns to B1. On the other hand, if it is determined that initial setting signals from all the gaming terminals 10 are received (B4: YES), the main CPU 241 checks operations of work memories such as RAM 243 or the like, various sensors, various driving mechanisms, and various decorative illuminations (B5). Then, the main CPU 241 determines whether all the check results are normal (B6). If the main CPU 241 determines the check results contain an error (B6: NO), the main CPU 241 executes B9.

On the other hand in B6, if the main CPU 241 determines that all the check results are normal (B6: YES), the main CPU 241 outputs an initial setting signal to all the gaming terminals 10 (B7), and causes the shared display 102 to display a demo-screen (B8). Then, the main CPU 241 ends the routine.

In A7, the main CPU 41 of each of the gaming terminals 10 determines that an initial setting signal is received from the center controller 200 (A7: YES), and causes the terminal image display panel 16 to display a demo-screen (A7). The main CPU 41 then ends the routine.

(Operation of Gaming Terminal 10: Terminal-Side Basic Game Process Routine)

Figure 50:
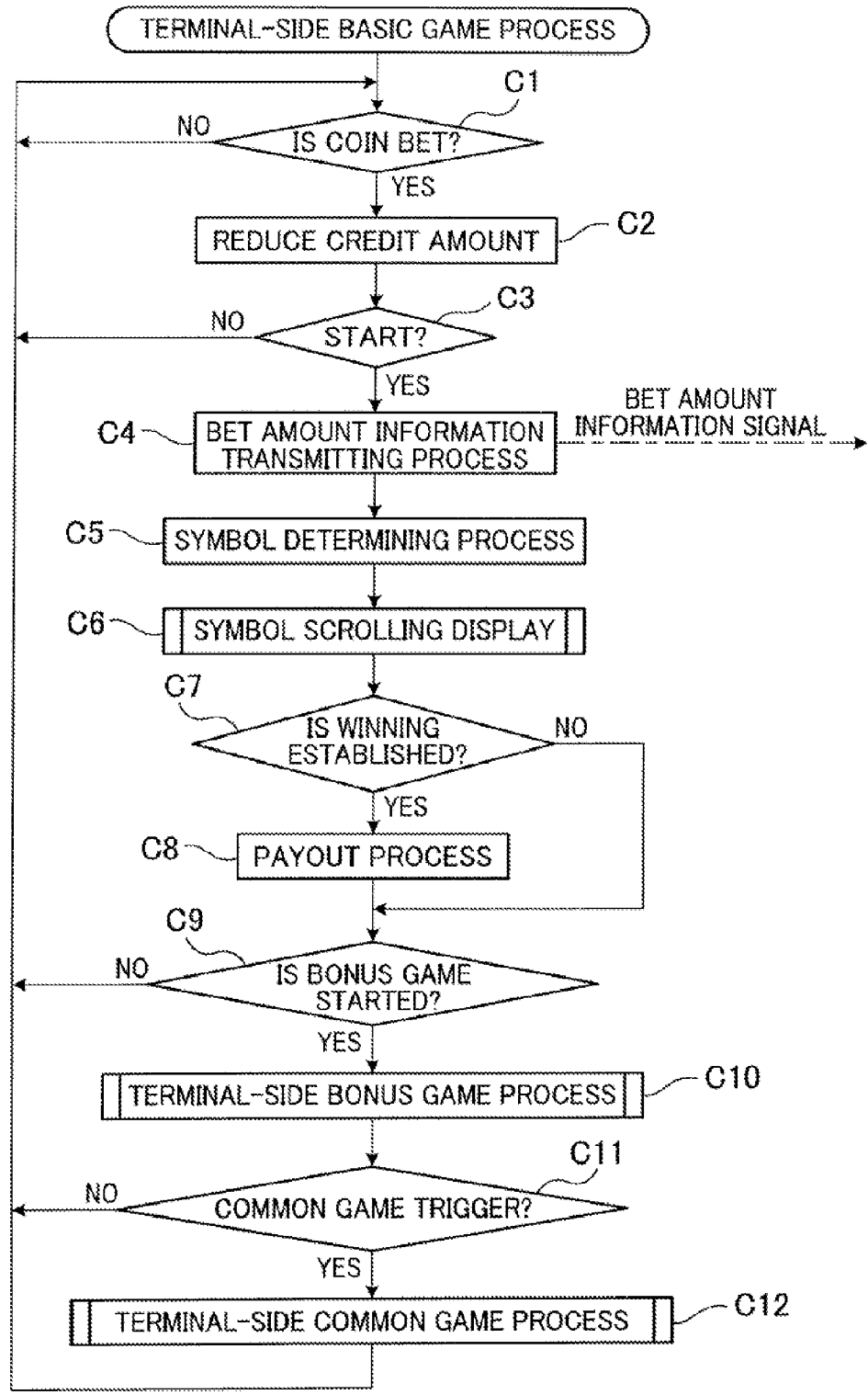
FIG. 50 is a flowchart of a terminal-side basic game process.

After the terminal side initial setting routine of FIG. 49, the main CPU 41 of the gaming terminal 10 performs a terminal-side basic game process routine of FIG. 50. Through this terminal-side basic game process routine executed by the main CPU 41, a basic game is run.

As shown in FIG. 50, in the gaming terminal process routine, it is determined whether a coin is bet (C1). In this step, it is determined whether a signal from the 1-bet switch 26S entered by pressing of the 1-bet button 26 is received. Meanwhile, it is determined whether a signal from the maximum bet switch 27S entered by pressing of the maximum bet button 27 is received. If no coin is bet (C1: NO), C1 is repeated until a coin is bet.

On the other hand, if a coin is bet (C1: YES), the credit amount stored in the RAM 43 is reduced according to the number of coins bet (C2). When the number of coins bet exceeds the credit amount stored in the RAM 43, the process goes to the later-described step C3 without the reduction of the credit amount. When the number of coins bet exceeds the upper limit of coins bettable for one game (50 pieces in this embodiment), the process goes to the later-described step C3 without the reduction of the credit amount.

Then, it is determined whether the spin button 23 is pressed or the control lever device 600 is operated for the start (C3). If not started (C3: NO), the process returns to C1. Here, if not started (for example, a command to end the game is input before the start), the reduction of the credit amount in C2 is canceled. Note that, whether the control lever device 600 is operated for the start is determined based on whether the lever 6100 is inclined forward or backward from the reference position at an angle greater than a specific angle. The specific angle is set so as to be smaller than the first angle corresponding to the angle of inclination of the lever 6100 abutting either of the restriction members 6402 (6402a, 6402b). In this determination, using a detected magnetic force value indicated by magnetic force detection data supplied from the main body PCB 60, the lever position of the lever 6100 (angle of inclination of the lever 6100) is obtained, with reference to one lever position determining table. Based on the thus obtained lever position, it is determined whether the lever 6100 is inclined from the reference position at an angle greater than the specific angle.

On the other hand, if started (C3: YES), a bet amount information transmitting process is executed (C4). In other words, a bet amount information signal indicating the game value bet is transmitted to the center controller 200. Note that, although the present embodiment is arranged so that the information of the number of paylines L activated in response to betting is transmitted, the disclosure is not limited to this.

Next executed is a symbol determining process (C5). That is, the stop symbol determining program stored in the RAM 43 is run to determine symbols 501 to be arranged in the display window 150. Through this, a symbol combination to be formed along the payline L is determined.

Then, the symbol scrolling display process is executed to scroll-display symbols 501 on the terminal image display panel 16 (C6). The symbol scrolling display process is a process in which the symbols 501 determined in C5 are stopped (rearranged) in the display window 150 after scrolling of symbols 501 in a direction indicated by an arrow.

Next, it is determined whether a winning is resulted with the combination of symbols 501 rearranged in the display window 150 (C7). When it is determined that a winning is resulted (C7: YES), a payout process is executed (C8). More specifically, when a winning is resulted, the number of coins according to the combination is calculated. On the other hand in C7, when it is determined that no winning is resulted (C7: NO), C9 is executed.

After the payout process of C8 is executed, the main CPU 41 determines whether to start a bonus game (C9). More specifically, the main CPU 41 starts a bonus game when a predetermined number or more specific symbols 510 are rearranged on a payline L or no specific symbol 510 is rearranged at the video reel 153 of the third column but a mystery bonus is won as a result of random selection. When the bonus game is not started (C9: NO), the process of C1 is executed.

On the other hand, when the bonus game is started (C9: YES), a terminal-side bonus game process is executed (C10). This terminal-side bonus game process will be described later with reference to FIG. 51. Thereafter, whether a common game trigger is established is determined (C11). More specifically, the main CPU 41 determines whether a common game start effect image display command has been received from the center controller 200. If the common game trigger is not established (C11: NO), the process of C1 is executed.

On the other hand, when the common game trigger is established (C11: YES), a terminal-side common game process is executed (C12). The terminal-side common game process will be described later with reference to FIG. 52. Then the process of C1 is executed.

(Operation of Gaming Terminal 10: Terminal-Side Bonus Game Process Routine)

Figure 51:
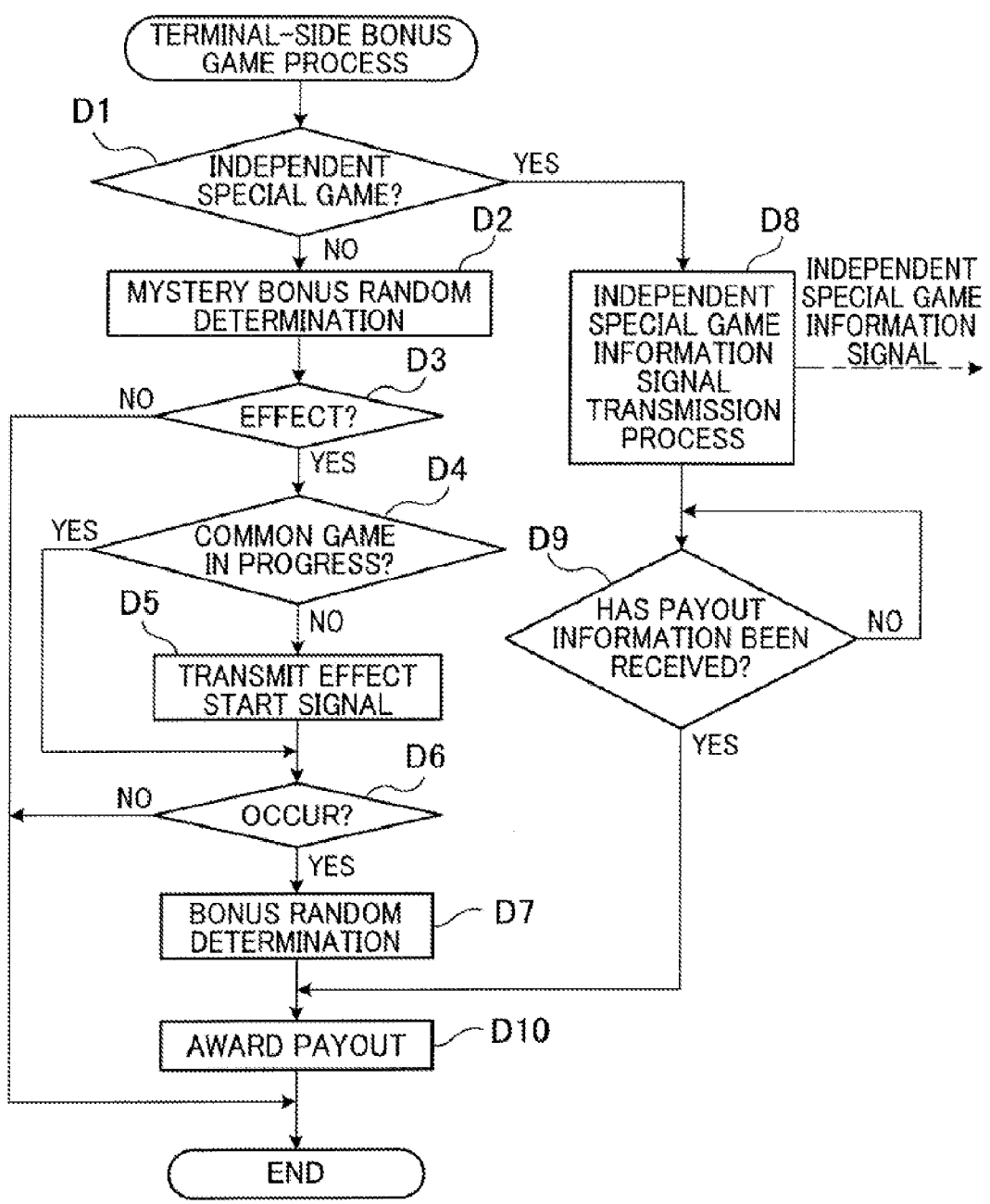
FIG. 51 is a flowchart of a terminal-side bonus game process.

The main CPU 41 of the gaming terminal 10 executes, in the terminal-side basic game process shown in FIG. 50, a terminal-side bonus game process routine (C10) shown in FIG. 51.

As shown in FIG. 51, the main CPU 41 determines whether the bonus game is an independent special game (D1). If the bonus game is not the independent special game (D1: NO), i.e., when the bonus game is a mystery bonus, the main CPU 41 executes a mystery bonus random determination (D2). More specifically, the main CPU 41 determines, with reference to the mystery bonus start random determination table shown in FIG. 32, to which one of the ranges, "occurrence", "effect only", and "non-occurrence" the determined random number corresponds.

Now, the main CPU 41 determines whether to conduct an effect (D3). More specifically, the main CPU 41 determines to conduct an effect when the result of the mystery bonus random determination is "occurrence" or "effect only". If no effect is conducted (D3: NO), i.e., when the result of the mystery bonus random determination is "non-occurrence", the routine finishes.

Figure 34:
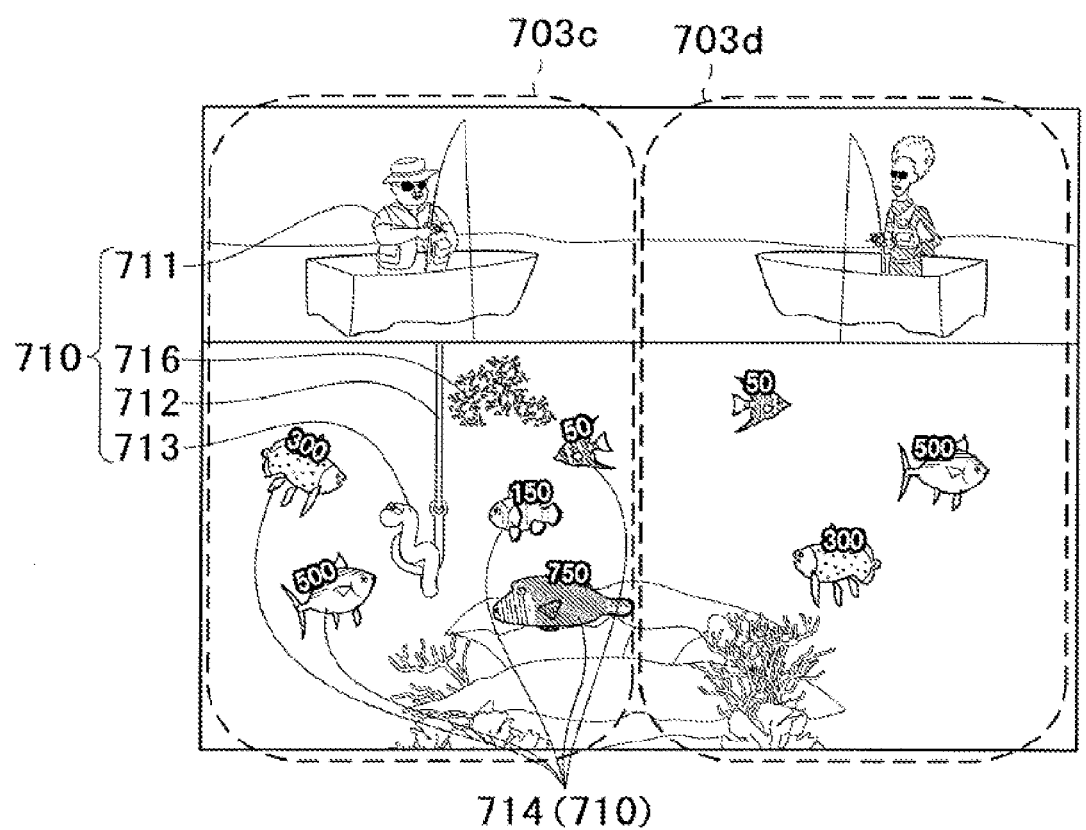
FIG. 34 shows an example of a display screen of a mystery bonus.

On the other hand, if an effect is conducted (D3: YES), the main CPU 41 determines whether a common game is being run (D4). If no common game is being run, an effect start signal is transmitted to the center controller 200 (D5). Note that, receiving the effect start signal transmitted in the step D5, the center controller 200 conducts the effect shown in FIG. 34. When it is determined in D3 not to perform the effect (D3) or after the effect start signal is transmitted, whether to generate a mystery bonus is determined (D6). More specifically, a mystery bonus is generated based on mystery bonus random determination.

If no mystery bonus is generated (D6: NO), the routine finishes. On the other hand, if the mystery bonus is generated (D6: YES), the main CPU 41 conducts a bonus random determination (D7). More specifically, with reference to the mystery bonus probability table shown in FIG. 33, to which of the winning bonus types the determined random number corresponds is determined. Thereafter, a payout according to the bonus that has been won is awarded (D10), and the routine finishes.

On the other hand, if it is determined in the step D1 that the bonus game is an independent special game, the main CPU 41 transmits an independent special game information signal indicating the start of an independent special game is transmitted to the center controller 200 (D8). In response to this, a lookup display unit 404 shown in FIG. 26 is displayed on the terminal image display panel 16. Though not illustrated, when the center controller 200 receives the independent special game information signal, whether a common game is being run is determined. If it is determined that no common game is being run, the center controller 200 conducts the effect shown in FIG. 28 and FIG. 31, turns on the LED unit 801 corresponding to the gaming terminal 10 that has transmitted the independent special game information signal, carries out a random determination to determine a payout based on the independent special game probability table shown in FIG. 30, and transmits payout information. On the other hand, when a common game is being run, the center controller 200 conducts only a random determination and transmits payout information.

Thereafter, whether payout information has been received from the center controller 200 is determined (D9). If no payout information has been received (D9: NO), the process is on standby and the step D9 is repeated. When the payout information has been received from the center controller 200 (D9: YES), a payout is awarded based on the payout information (D10) and the routine finishes.

(Operation of Gaming Terminal 10: Terminal-Side Common Game Process Routine)

Figure 52:
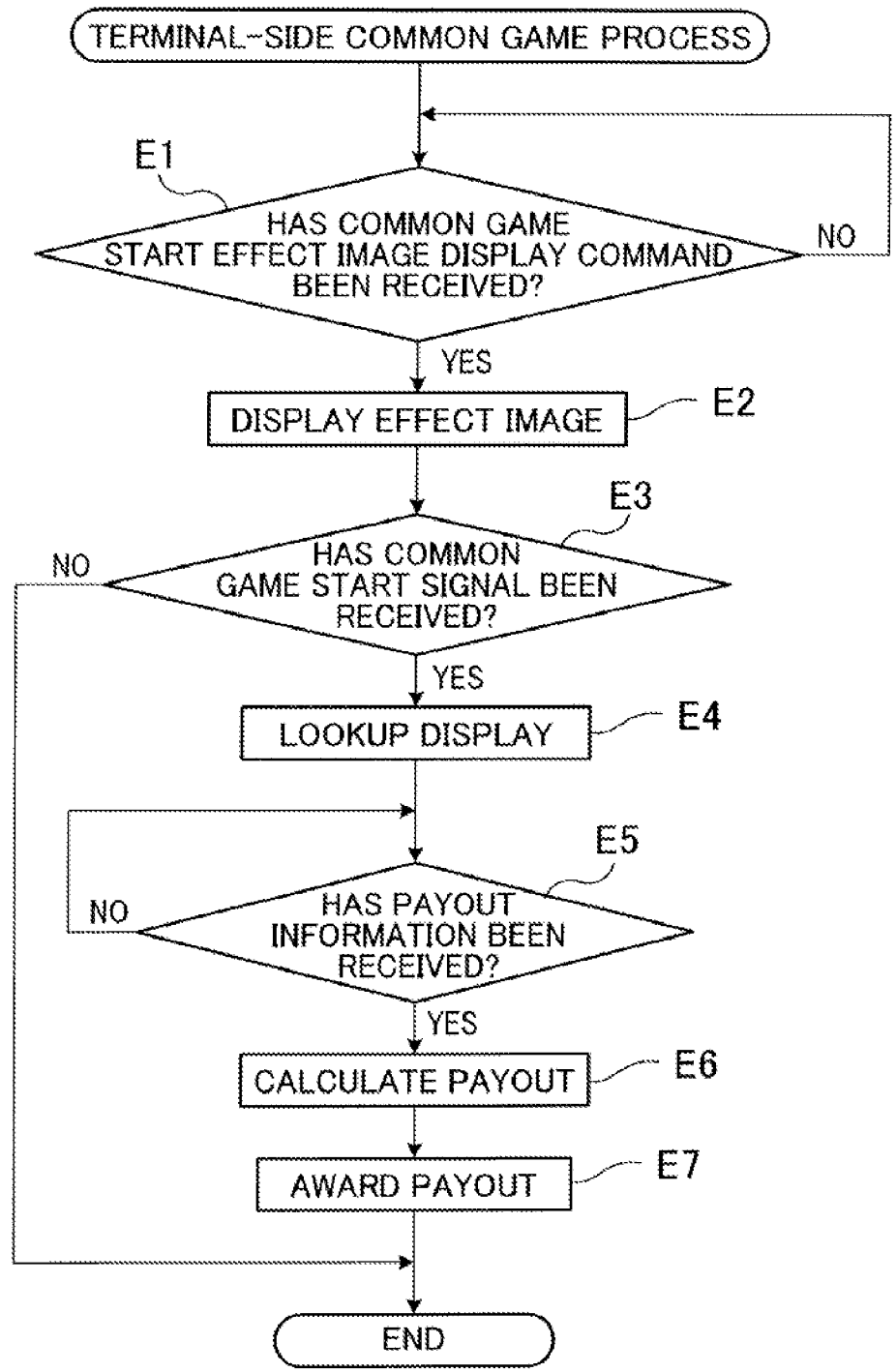
FIG. 52 is a flowchart or a terminal-side common game process.

The main CPU 41 of the gaming terminal 10 executes, in the terminal-side common game process (C12) shown in FIG. 50, a terminal-side common game process routine shown in FIG. 52.

As shown in FIG. 52, the main CPU 41 determines whether a common game start effect image display command has been received from the center controller 200 (E1). Thereafter, based on the received common game start effect image display command, a common game start effect image shown in FIG. 30 is displayed (E2). Then whether a common game start signal has been received is determined (E3). If no common game start signal has been received (E3: NO), the routine finishes.

On the other hand, if the common game start signal has been received (E3: YES), the lookup display shown in FIG. 26 is carried out (E4). Though not illustrated, when the common game start effect image display command includes an instruction to conduct only an effect, the routine finishes after the step E2.

Subsequently, the main CPU 41 determines whether payout information has been received from the center controller 200 (E5). If no payout information has been received, the routine is on standby (E5: NO). If the payout information has been received (E5: YES), the total sum of obtained unit payout amounts is multiplied by the payout rate, so as to calculate a payout to be awarded (E6). Then the calculated payout is awarded (E7) and the routine finishes.

(Operation of Center Controller 200: Common Game Process Routine)

Figure 53:
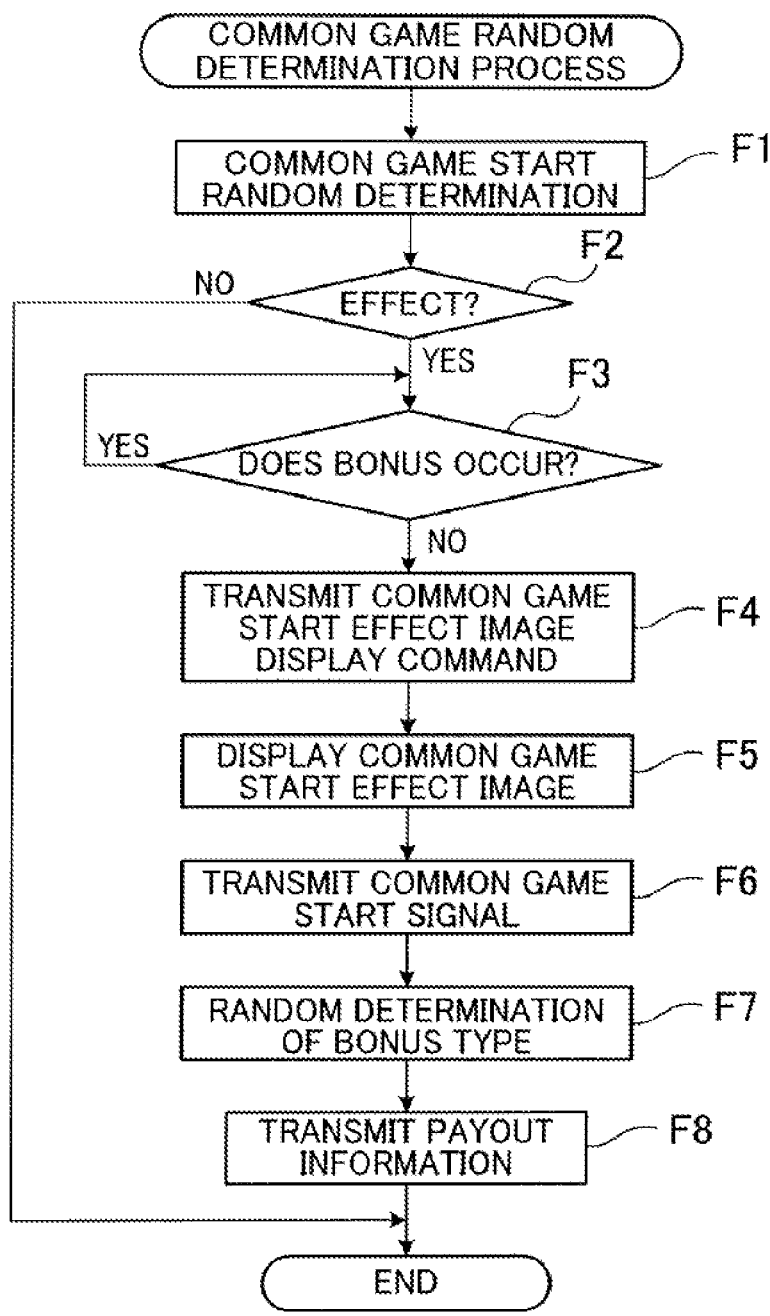
FIG. 53 is a flowchart of a common game random determination process.

The main CPU 241 of the center controller 200 executes, after the execution of the center-side initial setting routine shown in FIG. 49 is completed, a common game process routine shown in FIG. 53. Though not illustrated, the common game process routine is arranged to be executed at predetermined intervals (one second in the present embodiment).

As shown in FIG. 53, the main CPU 241 carries out a random determination of whether to start a common game (F1). More specifically, with reference to the common game start random determination table shown in FIG. 35, to which one of the ranges, "occurrence", "effect only", and "non-occurrence", the determined random number corresponds is determined. Note that, in addition to the above, which one of common games is generated by a determined random number is determined with reference to the common game type random determination table shown in FIG. 36.

Thereafter, the main CPU 241 determines whether to conduct an effect for the start of a common game (F2). More specifically, an effect is conducted when the result of the step F1 is "occurrence" or "effect only". If no effect for the start of a common game is conducted (F2: NO), the routine finishes.

On the other hand, if the effect for the start of a common game is conducted (F2: YES), the main CPU 241 determines whether a bonus game is being run on any one of the gaming terminal 10 (F3). If a bonus game is being run (F3: YES), the routine waits for the end of the bonus game. If no bonus game is being run (F3: NO), a common game start effect image display command corresponding to the selected type of the common game is transmitted to all the gaming terminals 10 (F4) and a common game start effect image is displayed on the upper display 700 (F5).

Thereafter, the main CPU 241 transmits a common game start signal to each gaming terminal 10 qualified to participate in the common game (F6). More specifically, with reference to the common game qualification time management table shown in FIG. 22, the common game start signal is transmitted to each gaming terminal 10 having a qualification time. It is noted that the common game start signal has information regarding the highest payout rate among the common game qualification times of the gaming terminals 10 in the common game qualification time management table. In other words, the main CPU 241 notifies the gaming terminals 10 of the highest payout rate of each terminal.

The main CPU 241 then determines the winning bonus type of each participating gaming terminal 10 with reference to tables such as the first common game probability table shown in FIG. 40 and the third common game probability table shown in FIG. 45 (F7). Thereafter, the payout for each participating gaming terminal 10 is determined based on the determined winning bonus type of each participating gaming terminal 10, payout information is transmitted to each gaming terminal 10 (F8), and the routine finishes.

Note that the common game random determination process is being executed while the common game is being run. When the start of a common game is awarded while a common game is being run, a fixed payout is awarded to a gaming terminal 10 which is not participating in the common game but has a qualification time. More specifically, the center controller 200 transmits fixed payout information including information of the fixed payout to a gaming terminal 10 which is not participating in the common game but has a qualification time. Receiving the fixed payout information, the gaming terminal 10 executes a process of awarding a payout based on the fixed payout information.

(Operation of Gaming Terminal 10: Initial Setting Process Routine)

In the gaming terminal 10, furthermore, a process setting process routine, a correction setting process routine, and a warning process routine are individually carried out in a parallel manner. With this, as shown in FIG. 1 and FIG. 2, the gaming terminal 10 updates the inclination angle table in response to a player's operation of the lever and issues a warning to the player. Furthermore, a game is invalidated (terminated) when the lever 6100 is operated in a predetermined operation condition. The following will detail these processes.

Figure 54:
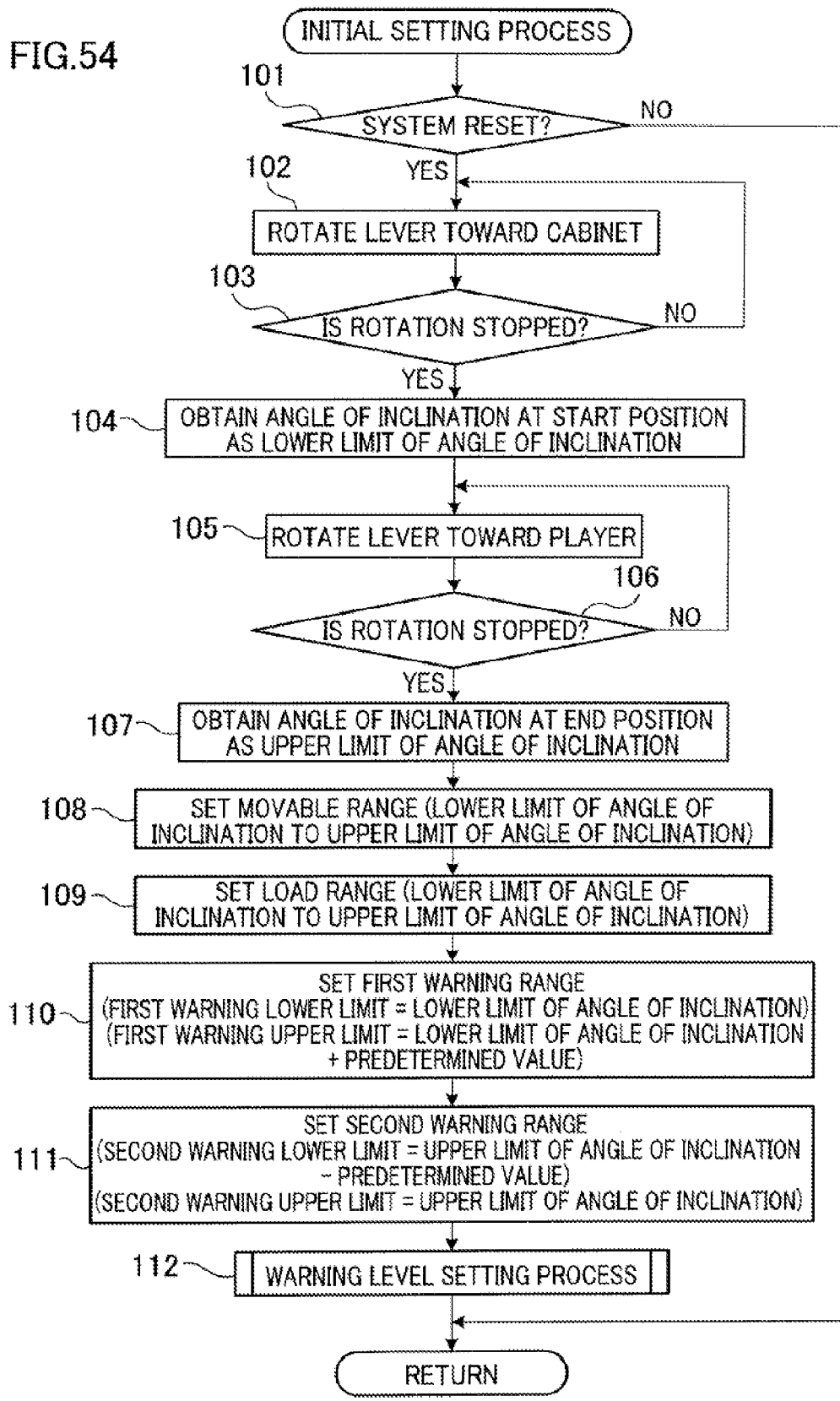
FIG. 54 is a flowchart of an initial setting process.

To begin with, as shown in FIG. 54, whether system reset has been done by powering on the gaming terminal 10 or inputting a system reset signal is determined (S101). If the system reset has not been done (S101: NO), the routine is terminated. On the other hand, when the system reset has been done (S101: YES), as shown in FIG. 1, the lever 6100 is automatically rotated to the cabinet side (S102). As the lever 6100 contacts the restriction member 6402b, whether the lever 6100 is stopped is determined (S103). When the rotation is not stopped (S103: NO), the routine is executed again from S102 and the rotation of the lever 6100 is continued. On the other hand, when the rotation of the lever 6100 is stopped (S103: YES), the angle of inclination at the start position is set as the lower limit of the angle of inclination (S104).

Subsequently, the lever 6100 is automatically rotated to the player side (S105). As the lever 6100 contacts the restriction member 6402a, whether the rotation of the lever 6100 is stopped is determined (S106). When the rotation is not stopped (S106: NO), the routine is conducted again from S105 and the rotation of the lever 6100 is continued. On the other hand, when the rotation of the lever 6100 is stopped (S106: YES), the angle of inclination at the start position is set as the upper limit of the angle of inclination (S107).

Thereafter, the movable range area in the inclination angle table of FIG. 2 is arranged so that the lower limit of the angle of inclination and the upper limit of the angle of inclination obtained as above are set as the movement upper limit and the movement lower limit of the movable range (S108). Furthermore, the load range area in the inclination angle table of FIG. 2 is set so that the lower limit of the angle of inclination and the upper limit of the angle of inclination are set as the load upper limit and the load lower limit of the load range (S109). Thereafter, the first warning range is set. More specifically, the lower limit of the angle of inclination is set as the first warning lower limit and the sum of the lower limit of the angle of inclination and a predetermined value is set as the first warning upper limit. By using the first warning upper limit and the first warning lower limit, the first warning range in the inclination angle table of FIG. 2 is set (S110).

Thereafter, the second warning range is set. More specifically, a value calculated by subtracting a predetermined value from the upper limit of the angle of inclination is set as the second warning lower limit and the upper limit of the angle of inclination is set as the second warning upper limit. By using the second warning upper limit and the second warning lower limit, the second warning range in the inclination angle table of FIG. 2 is set (S111). Subsequently, after the execution of the warning level setting process (S112), the routine is terminated.

(Operation of Gaming Terminal 10: Warning Level Process Routine)

Figure 56:
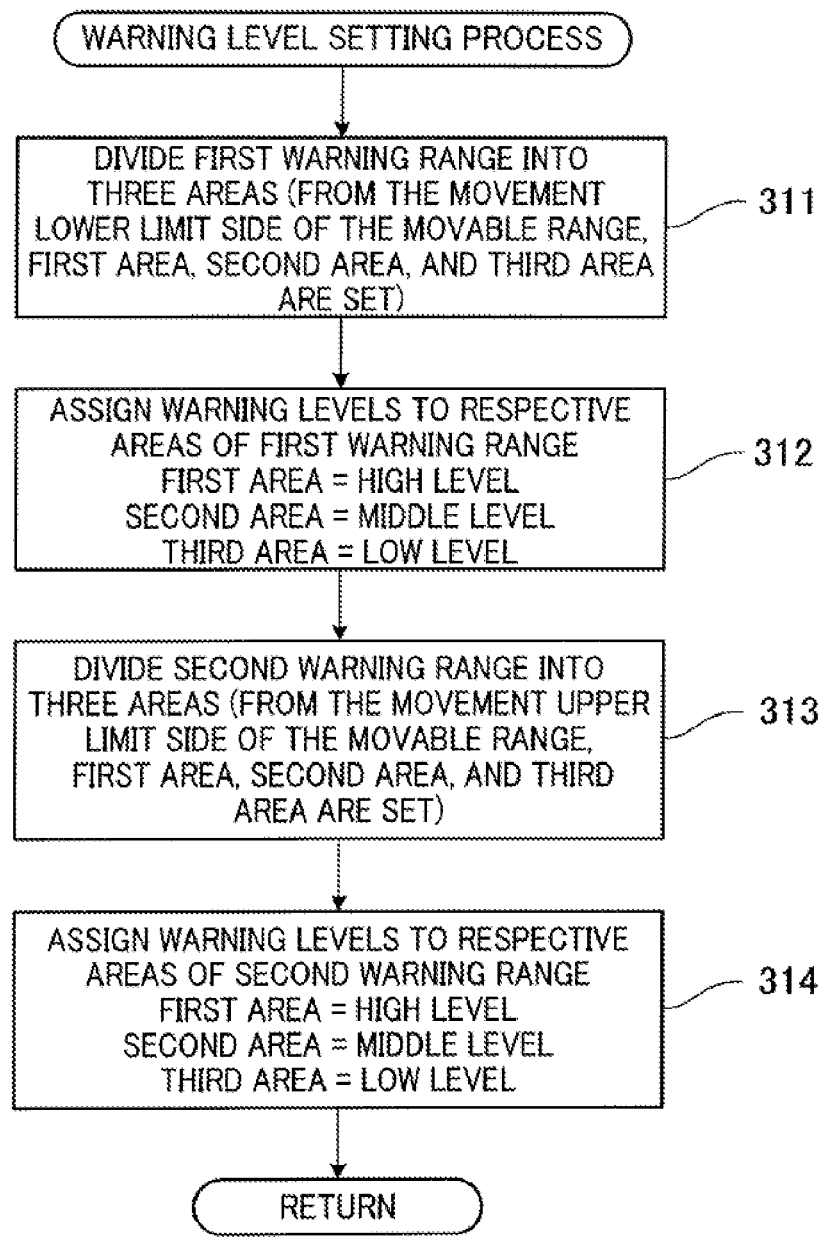
FIG. 56 is a flowchart of a warning level setting process.

In the warning level setting process, each of the first warning range and the second warning range is divided into three areas, and different warning levels are assigned to these areas. More specifically, as shown in FIG. 56, the first warning range is divided into three areas. More specifically, from the movement lower limit side of the movable range, a first area, a second area, and a third area are set (S311). Thereafter, a warning level is assigned to each area of the first warning range. That is to say, a high level is assigned to the first area, a middle level is assigned to the second area, and a low level is assigned to the third area (S312).

Thereafter, the second warning range is divided into three areas. More specifically, from the movement upper limit side of the movable range, a first area, a second area, and a third area are set (S313). Thereafter, a warning level is assigned to each area of the second warning range. That is to say, a high level is assigned to the first area, a middle level is assigned to the second area, and a low level is assigned to the third area (S314).

(Operation of Gaming Terminal 10: Correction Setting Process Routine)

Figure 55:
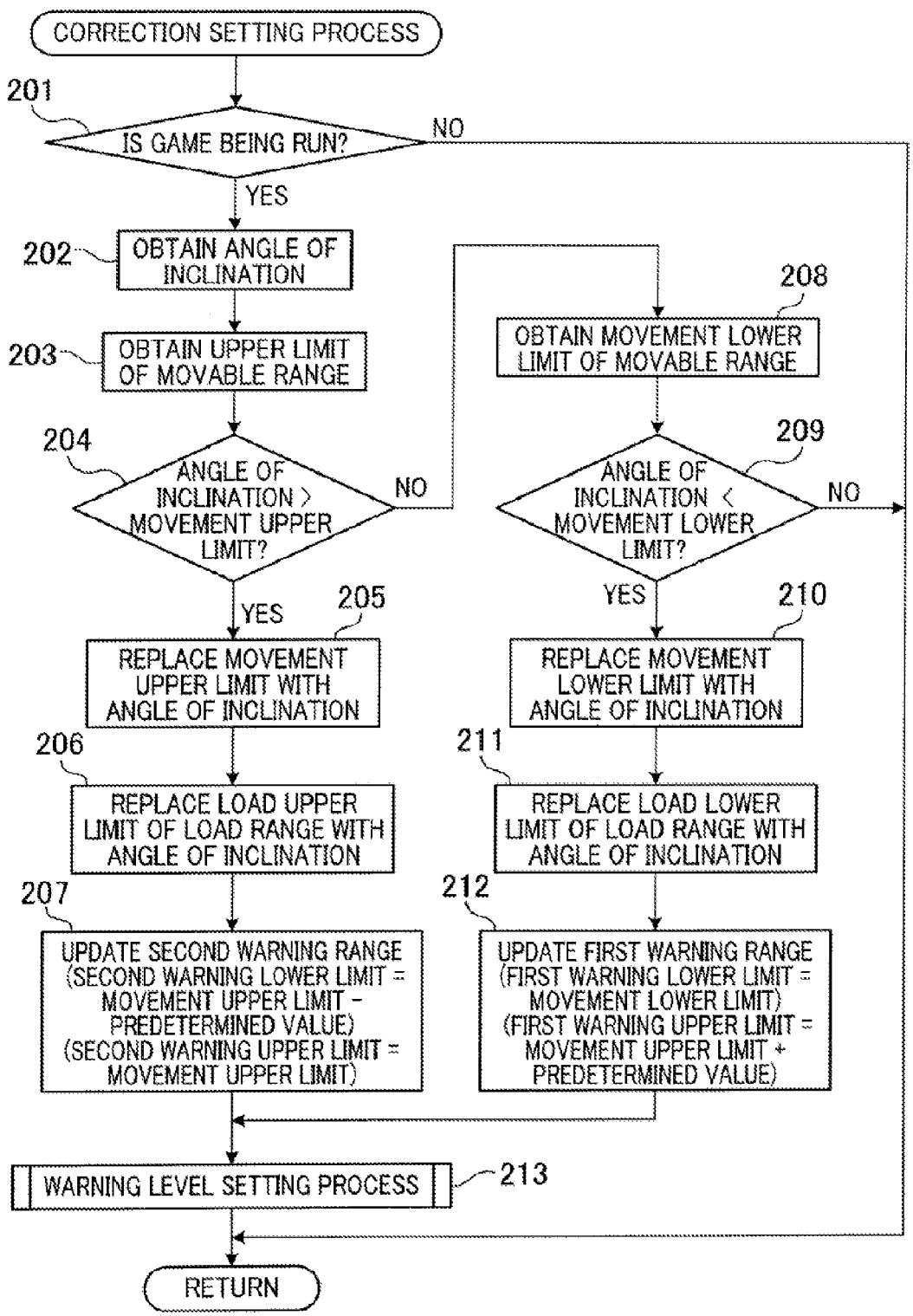
FIG. 55 is a flowchart of a correction setting process.

In the correction setting process, as shown in FIG. 55, whether a game is being run is determined (S201). When no game is being run (S201: NO), the routine is terminated. When a game is being run (S201: YES), the angle of inclination is obtained (S202). Furthermore, the movement upper limit of the movable range is obtained (S203). Furthermore, whether the angle of inclination is larger than the movement upper limit is determined (S204). When the angle of inclination is larger than the movement upper limit (S204: YES), the angle of inclination is set as the movement upper limit (S205). Furthermore, the load upper limit of the load range is replaced with the angle of inclination (S206). Thereafter, the second warning range is updated. That is to say, the second warning lower limit is replaced with a value calculated by subtracting a predetermined value from the movement upper limit and the second warning upper limit is replaced with the movement upper limit (S207). Thereafter, the above-described warning level setting process is executed and a predetermined warning level is assigned to each area (S213), and then the routine is terminated.

On the other hand, when in S204 the angle of inclination is not larger than the movement upper limit (S204: NO), the movement lower limit of the movable range is obtained (S208). Thereafter, whether the angle of inclination is smaller than the movement lower limit is determined (S209). When the angle of inclination is not smaller than the movement lower limit (S209: YES), the routine is terminated. On the other hand, when the angle of inclination is smaller than the movement lower limit (S209: YES), the movement lower limit is replaced with the angle of inclination (S210). Furthermore, the load lower limit of the load range is replaced with the angle of inclination (S211). Furthermore, the first warning range is updated. That is to say, the first warning lower limit is replaced with the movement lower limit and the second warning upper limit is replaced with a value calculated by adding a predetermined value to the movement upper limit (S212). Thereafter, the above-described warning level setting process is executed and a predetermined warning level is assigned to each area (S213), and then the routine is terminated.

(Operation of Gaming Terminal 10: Warning Process Routine)

Figure 57:
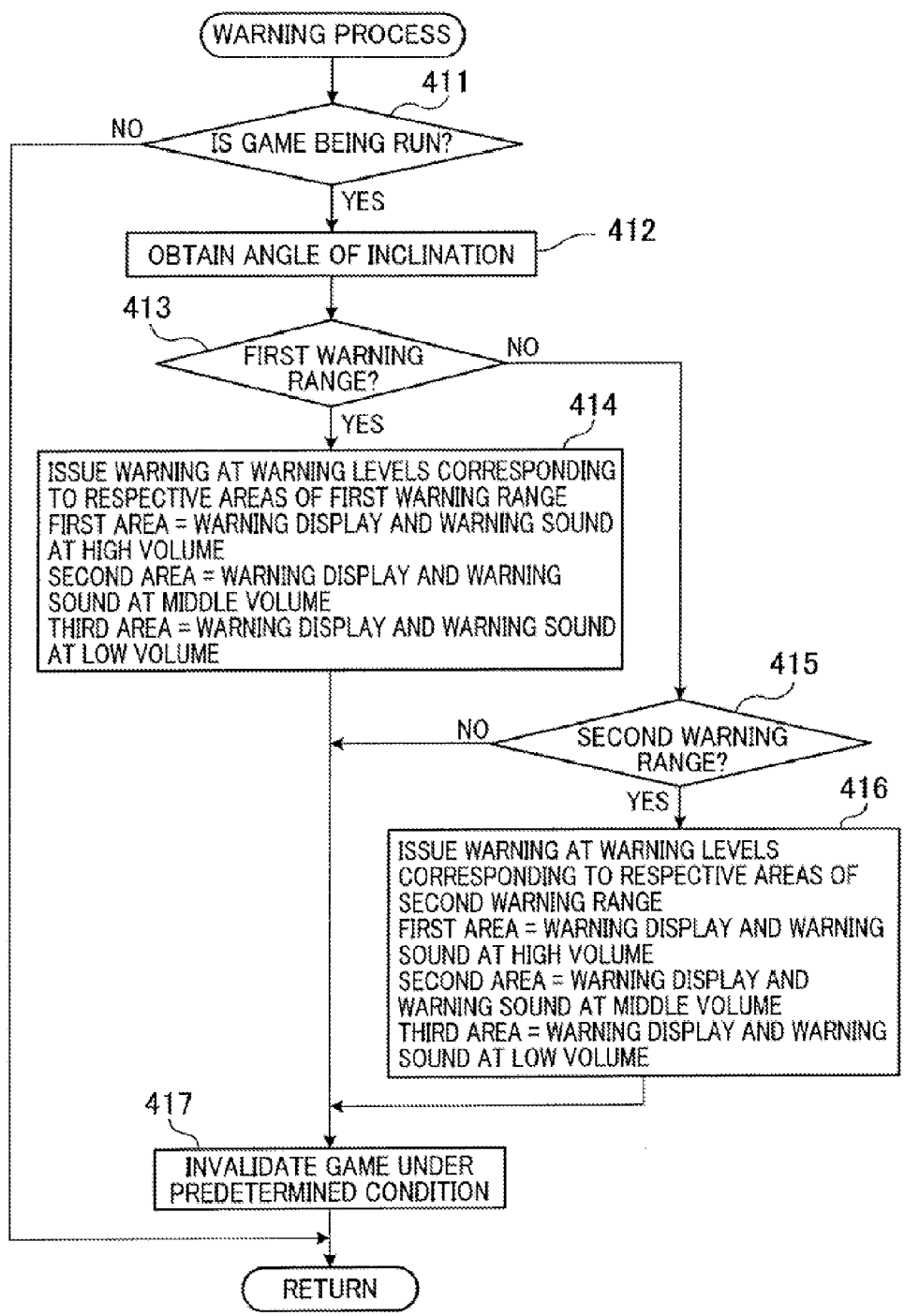
FIG. 57 is a flowchart of a warning process.

In the warning process, as shown in FIG. 57, whether a game is being run is determined (S411). When no game is being run (S411: NO), the routine is terminated. When a game is being run (S411: YES), the angle of inclination is obtained (S412). Furthermore, whether the angle of inclination falls within the first warning range is determined (S413). When the angle falls within the first warning range (S413: YES), a warning corresponding to the warning level of each area of the first warning range is issued. That is to say, as shown in FIG. 2 and FIG. 3, in the case of the first area, warning display of the first warning image 715*a* and the second warning image 715*b* and a sound warning at high volume are carried out. In the case of the second area, the warning display and a sound warning at middle volume are carried out. In the case of the third area, the warning display and a sound warning at a low volume is carried out (S414).

Thereafter, when the lever 6100 is operated at a predetermined operation condition, the game is invalidated (S417). When the predetermined operation condition is not satisfied, the routine is terminated while the game is continued. It is noted that the "predetermined operation condition" is cases where, for example, an excessive operation is continued for more than a predetermined time such as 16 seconds while a warning has been issued at the maximum warning level and where an excessive operation is repeated for a predetermined number of times such as twice during a predetermined time such as 20 seconds.

If in S413 the angle does not fall within the first warning range (S413: NO), then whether the angle of inclination falls within the second warning range (S415) is determined. When the angle does not fall within the second warning range (S415: NO), the routine is terminated. When the angle falls within the second warning range (S415: YES), a warning corresponding to the warning level of each area of the second warning range is issued. That is to say, in the case of the first area, the warning display and the sound warning at high volume are carried out. In the case of the second area, the warning display and the sound warning at middle volume are carried out. In the case of the third area, the warning display and the sound warning at low volume are carried out (S416). Thereafter when the lever 6100 is operated at a predetermined operation condition, the game is invalidated (S417). When the predetermined operation condition is not satisfied, the routine is terminated while the game is continued.

The above embodiment thus described solely serves as a specific example of the present invention, and the present invention is not limited to such an example. Specific structures of various means may be suitably designed or modified. Further, the effects of the present invention described in the above embodiment are not more than examples of most preferable effects achievable by the present invention. The effects of the present invention are not limited to those described in the embodiment described above.

For example, the aspects, values, or the like concerning the effects are not limited to those described in the embodiment above. Furthermore, the data or the like exchanged between the gaming terminals 10 and the center controller is not limited to the above. For example, the information of the number of paylines L activated in response to betting is transmitted in the present embodiment. Not limited to this, information indicating the bet amount may be transmitted. In this case, a table associated with the number of paylines may be associated with the bet amount or the range of the bet amount.

In addition to the above, while the present embodiment is arranged so that effects are conducted after the random determination of payouts of a base game, a bonus game, and a common game, the random determination may be carried out while the effect is being conducted. For example, as effects during a bonus game and a common game, a payout amount is indicated by using the fish image 714 and the fishing bait image 713. In this regard, the following effect may be carried out using the fishing bait image 713.

More specifically, when an effect of causing the fish image 714 to approach the fishing bait image 713 is conducted and when the probability of winning a bonus corresponding to that fish image 714 is high (e.g., 73% or higher), the fishing bait image 713 is displayed in red. When the probability of winning a bonus corresponding to that fish image 714 is middle (e.g., 54% or higher), the fishing bait image 713 is displayed in orange. When the probability of winning a bonus corresponding to that fish image 714 is low (e.g., less than 53%), the color of the fishing bait image 713 is maintained to be green. In addition to the above, the fish image 714 may be arranged to open the mouth to attack the fishing bait image 713 displayed in red, and the fish image 714 may also be arranged to peck at the fishing bait image 713 by the mouth when the fishing bait image 713 is displayed in orange.

In addition to the above, the base game qualification time awarding table shown in FIG. 21 is arranged so that a plurality of payout rates are awarded for each number of activated paylines, but the disclosure is not limited to this. For example, as shown in FIG. 58, a single payout rate is awarded for each number of activated paylines.

More specifically, in the case of FIG. 58, a qualification time of five seconds in which the payout rate is one is awarded when the number of activated paylines is one. When the number of activated paylines is two, a qualification time of five seconds in which the payout rate is two is awarded. When the number of activated paylines is three, a qualification time of five seconds in which the payout rate is three is awarded. When the number of activated paylines is five, a qualification time of five seconds in which the payout rate is five is awarded. When the number of activated paylines is ten, a qualification time of five seconds in which the payout rate is ten is awarded.

Because a payout rate is independently awarded for each number of activated paylines, for example, qualification times of the same payout rate are accumulated as the player repeatedly bets the same bet amount. In this case, because at least a qualification time in which the payout rate is smaller than the payout rate above is not accumulated, the payout rate is kept to be equal to or higher than a predetermined value, until the qualification time reaches zero.

In addition to the above, the present embodiment is arranged so that, when any one of the gaming terminals 10 wins an independent special game or a mystery bonus and the effect regarding the same is being conducted on any one of the gaming terminal areas 703 of the upper display 700, a common game starts after the end of the effect even if the start of a common game is determined. The disclosure, however, is not limited to this. For example, when the start of a common game is determined, the effect concerning the independent special game or mystery bonus may be canceled and the common game may be stared. This allows the gaming terminal 10 qualified to participate in the common game to start the common game without waiting for the end of the effect.

In addition to the above, when no game is run by the gaming machine 300 or no game is run by any one of the gaming terminals 10, the ranking of bonus types which have been awarded as payouts may be displayed on the upper display 700 as shown in FIG. 48.

Figure 59:
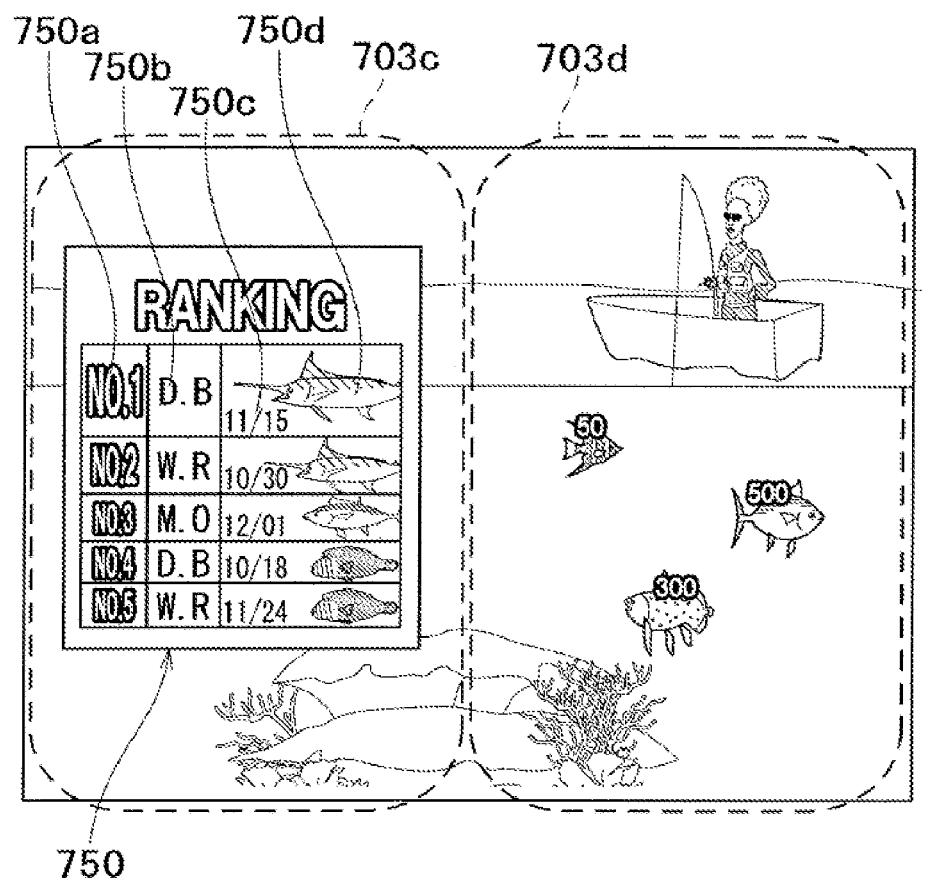
FIG. 59 shows an example of a display screen of a ranking.

In FIG. 59, no game is being run at the gaming terminal 10c. More specifically, at the central part of the gaming terminal area 703c corresponding to the gaming terminal 10c, a ranking image 750 is displayed. The ranking image 750 has a ranking area 750a, a name area 750b, a date area 750c, and a fish area 750d. The ranking area 750a shows the ranking of amounts of awarded bonuses. The name area 750b shows the names of players who have obtained bonuses. If the gaming terminals 10 can store information on a membership card or the like storing an identification name of each player and a member ship number, the name, the membership number, or the like may be displayed. The date area 750c displays dates of obtaining bonuses. The fish area 750d displays images of fishes corresponding to obtained bonuses. It is noted that the fish area 750d may display texts indicating obtained bonuses, unit payout amounts of obtained bonuses, or one of them including the images of the fishes. The ranking may be determined based on unit payout amounts of obtained bonuses or based on a calculation of multiplying a unit payout amount by a payout rate.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. A gaming terminal comprising:
    a notification unit arranged to give notification to a player;
    a lever-type operation device arranged to receive an operation by the player;
    a supporting mechanism arranged to rotatably support the lever-type operation device at one end portion of the lever-type operation device;
    an inclination detection mechanism arranged to detect an angle of inclination of the lever-type operation device;
    a storage unit arranged to store the angle of inclination; and
    a controller programmed to execute the processes of:
    (a1) detecting an upper limit of the angle of inclination and a lower limit of the angle of inclination of a movable range by the inclination detection mechanism by rotating the lever-type operation device by the supporting mechanism at a predetermined reset timing and storing, in the storage unit, the upper limit of the angle of inclination and the lower limit of the angle of inclination as the upper limit and the lower limit of the movable range;
    (a2) while a game is being run, detecting the angle of inclination of the lever-type operation device when the lever-type operation device is rotated by an operation by the player; and
    (a3) determining whether the angle of inclination detected in (a2) falls within the movable range stored in the storage unit, and (i) updating the upper limit of the angle of inclination with the angle of inclination when the angle of inclination is larger than the movable range, or (ii) updating the lower limit of the angle of inclination with the angle of inclination when the angle of inclination is smaller than the movable range.

2. The gaming terminal according to claim 1, wherein, the controller is programmed to execute the process of:
    (a4) issuing a warning to the player by giving the notification by the notification unit, when the angle of inclination detected in (a2) falls within a first warning range, the upper limit of which is the upper limit of the angle of inclination of the movable range stored in the storage unit, or when the angle of inclination detected in (a2) falls within a second warning range, the lower limit of which is the lower limit of the angle of inclination of the movable range stored in the storage unit.

3. The gaming terminal according to claim 2, wherein, in (a4), the controller divides at least one of the first warning range and the second warning range into a plurality of areas and differentiates warning contents of the warning to the player between the areas.

4. The gaming terminal according to claim 3, wherein, in (a4), the controller increases a warning level of the warning contents as the plurality of areas get close to the upper limit of the first warning range or the lower limit of the second warning range.

5. The gaming terminal according to claim 4, wherein, in (a4), the controller stops the running of the game when the warning level is at the highest and a predetermined operation condition is satisfied.

6. The gaming terminal according to claim 1, wherein, the supporting mechanism includes a load placing mechanism which is arranged to generate a load against the rotation of the lever-type operation device, and the controller is programmed to execute the process of:
(a5) while the game is being run, causing the load placing mechanism to generate the load against the rotation of the lever-type operation device.

7. The gaming terminal according to claim 1, wherein, the controller is programmed to execute the process of:
(a6) issuing the warning to the player by the notification by the notification unit, when (i) the angle of inclination detected in (a2) is, for a predetermined time, continuously at either the first warning range, the upper limit of which is the upper limit of the angle of inclination of the movable range stored in the storage unit, or the second warning range, the lower limit of which is the lower limit of the angle of inclination of the movable range stored in the storage unit, or (ii) the angle of inclination repeatedly enters the first warning range or the second warning range for a predetermined number of times within a predetermined time.

8. The gaming terminal according to claim 7, wherein, in (a6), the controller performs:
issuance of the warning to the player by causing the notification unit to display a warning image and produce a warning sound at low volume, when a predetermined time is a first predetermined time or a predetermined number of times is a first predetermined number of times;
issuance of the warning to the player by causing the notification unit to display the warning image and produce the warning sound at middle volume, when the predetermined time is a second predetermined time being greater than being greater the first predetermined time or the predetermined number of times is a second predetermined number of times being greater the first predetermined number of times; and
issuance of the warning to the player by causing the notification unit to display the warning image and produce the warning sound at high volume, when the predetermined time is a third predetermined time being greater the second predetermined time or the predetermined number of times is a third predetermined number of times being greater the second predetermined number of times.

9. The gaming terminal according to claim 2, wherein, the supporting mechanism includes a load placing mechanism which is arranged to generate a load against the rotation of the lever-type operation device, and the controller is programmed to execute the process of:
(a5) while the game is being run, causing the load placing mechanism to generate the load against the rotation of the lever-type operation device.

10. A method of operating a gaming terminal including a notification unit arranged to give notification to a player, a lever-type operation device arranged to receive an operation by the player, a supporting mechanism arranged to rotatably support the lever-type operation device at one end portion of the lever-type operation device, an inclination detection mechanism arranged to detect an angle of inclination of the lever-type operation device, a storage unit arranged to store the angle of inclination, and a controller, by the controller, the method comprising:
(a1) detecting an upper limit of the angle of inclination and a lower limit of the angle of inclination of a movable range by the inclination detection mechanism by rotating the lever-type operation device by the supporting mechanism at a predetermined reset timing and storing, in the storage unit, the upper limit of the angle of inclination and the lower limit of the angle of inclination as the upper limit and the lower limit of the movable range;
(a2) while a game is being run, detecting the angle of inclination of the lever-type operation device when the lever-type operation device is rotated by an operation by the player; and
(a3) determining whether the angle of inclination detected in (a2) falls within the movable range stored in the storage unit, and (i) updating the upper limit of the angle of inclination with the angle of inclination when the angle of inclination is larger than the movable range, or (ii) updating the lower limit of the angle of inclination with the angle of inclination when the angle of inclination is smaller than the movable range.

11. The method according to claim 10, further comprising (a4) issuing a warning to the player by giving the notification by the notification unit, when the angle of inclination detected in (a2) falls within a first warning range, the upper limit of which is the upper limit of the angle of inclination of the movable range stored in the storage unit, or when the angle of inclination detected in (a2) falls within a second warning range, the lower limit of which is the lower limit of the angle of inclination of the movable range stored in the storage unit.

12. The method according to claim 11, further comprising, in (a4), dividing at least one of the first warning range and the second warning range into a plurality of areas and differentiates warning contents of the warning to the player between the areas.

13. The method according to claim 12, further comprising, in (a4), increasing a warning level of the warning contents as the plurality of areas get close to the upper limit of the first warning range or the lower limit of the second warning range.

14. The method according to claim 13, further comprising, in (a4), stopping the running of the game when the warning level is at the highest and a predetermined operation condition is satisfied.

15. The method according to claim 10, further comprising, while the game is being run, causing a load placing mechanism of the supporting mechanism to generate a load against the rotation of the lever-type operation device.

16. The method according to claim 10, further comprising (a6) issuing the warning to the player by the notification by the notification unit, when (i) the angle of inclination detected in (a2) is, for a predetermined time, continuously at either the first warning range, the upper limit of which is the upper limit of the angle of inclination of the movable range stored in the storage unit, or the second warning range, the lower limit of which is the lower limit of the angle of inclination of the movable range stored in the storage unit, or (ii) the angle of inclination repeatedly enters the first warning range or the second warning range for a predetermined number of times within a predetermined time.

17. The method according to claim 16, further comprising, in (a6):

performing issuance of the warning to the player by causing the notification unit to display a warning image and produce a warning sound at low volume, when a predetermined time is a first predetermined time or a predetermined number of times is a first predetermined number of times;

performing issuance of the warning to the player by causing the notification unit to display the warning image and produce the warning sound at middle volume, when the predetermined time is a second predetermined time being greater than being greater the first predetermined time or the predetermined number of times is a second predetermined number of times being greater the first predetermined number of times; and performing issuance of the warning to the player by causing the notification unit to display the warning image and produce the warning sound at high volume, when the predetermined time is a third predetermined time being greater the second predetermined time or the predetermined number of times is a third predetermined number of times being greater the second predetermined number of times.

18. The method according to claim 11, further comprising (a5) while the game is being run, causing a load placing mechanism of the supporting mechanism to generate a load against the rotation of the lever-type operation device.

* * * * *